US011182733B2

(12) United States Patent
Robinson et al.

(10) Patent No.: US 11,182,733 B2
(45) Date of Patent: Nov. 23, 2021

(54) SYSTEMS AND METHODS FOR CONFIRMING AN IDENTITY OF AN INDIVIDUAL, FOR EXAMPLE, AT A LOCKER BANK

(71) Applicant: United Parcel Service of America, Inc., Atlanta, GA (US)

(72) Inventors: Kalin Robinson, John's Creek, GA (US); David Carder, Cumming, GA (US); Robert J. Gillen, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 353 days.

(21) Appl. No.: 16/267,915

(22) Filed: Feb. 5, 2019

(65) Prior Publication Data

US 2019/0172011 A1    Jun. 6, 2019

Related U.S. Application Data

(63) Continuation of application No. 14/514,276, filed on Oct. 14, 2014, now Pat. No. 10,210,474.

(Continued)

(51) Int. Cl.
*G06Q 10/08* (2012.01)
*G06F 21/62* (2013.01)

(52) U.S. Cl.
CPC ......... *G06Q 10/0836* (2013.01); *G06F 21/62* (2013.01); *G06Q 10/0838* (2013.01); *G06F 2221/2141* (2013.01)

(58) Field of Classification Search
USPC .......... 713/155; 340/5.22, 5.5, 5.2; 705/1.1, 705/7.11, 7.12
See application file for complete search history.

(56) References Cited

U.S. PATENT DOCUMENTS

| 3,712,468 A | 1/1973 | Wenner et al. |
| 4,688,678 A | 8/1987 | Zue et al. |

(Continued)

FOREIGN PATENT DOCUMENTS

| CA | 2893502 A1 | 11/2004 |
| CA | 2551885 A1 | 8/2005 |

(Continued)

OTHER PUBLICATIONS

"Locker Security Gets Smart." Security (Newton, Mass.) 47.8 (2010): 69-. Print. (Year: 2010).*

(Continued)

*Primary Examiner* — Akiba K Robinson
(74) *Attorney, Agent, or Firm* — Shook, Hardy & Bacon L.L.P.

(57) ABSTRACT

Systems, according to various embodiments, are adapted to use any of a variety of different techniques to identify an individual. In particular embodiments, the system is adapted to, at least partially in response to confirming the identity of a consignee of a parcel, provide the consignee with access to a parcel stored within a secured locker. In particular embodiments, the system may use the current or past location of the consignee, or information from one or more objects physically associated with the consignee (e.g., a portable computing device or an electronic or paper info notice) to verify the consignee's identity.

20 Claims, 19 Drawing Sheets

Related U.S. Application Data

(60) Provisional application No. 62/058,521, filed on Oct. 1, 2014, provisional application No. 61/890,685, filed on Oct. 14, 2013, provisional application No. 61/890,694, filed on Oct. 14, 2013, provisional application No. 61/890,705, filed on Oct. 14, 2013, provisional application No. 61/890,716, filed on Oct. 14, 2013.

(56) References Cited

U.S. PATENT DOCUMENTS

| | | | |
|---|---|---|---|
| 5,153,842 A | 10/1992 | Cukor et al. |
| 5,168,444 A | 12/1992 | Cukor et al. |
| 5,375,240 A | 12/1994 | Grundy |
| 5,400,020 A | 3/1995 | Jones et al. |
| 5,444,444 A | 8/1995 | Ross |
| 5,623,260 A | 4/1997 | Jones |
| 5,648,770 A | 7/1997 | Ross |
| 5,656,799 A | 8/1997 | Ramsden et al. |
| 5,657,010 A | 8/1997 | Jones |
| 5,668,543 A | 9/1997 | Jones |
| 5,726,435 A | 3/1998 | Hara et al. |
| 5,774,053 A | 6/1998 | Porter |
| 5,786,748 A | 7/1998 | Nikolic et al. |
| 5,831,220 A | 11/1998 | Ramsden et al. |
| 5,831,860 A | 11/1998 | Foladare et al. |
| 5,979,750 A | 11/1999 | Kindell |
| 6,010,064 A | 1/2000 | Umeda et al. |
| 6,026,375 A | 2/2000 | Hall et al. |
| 6,028,517 A | 2/2000 | Sansone et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,304,856 B1 | 10/2001 | Soga et al. |
| 6,313,760 B1 | 11/2001 | Jones |
| 6,317,060 B1 | 11/2001 | Jones |
| 6,323,254 B1 | 11/2001 | Weikard et al. |
| 6,323,782 B1 | 11/2001 | Stephens et al. |
| 6,343,275 B1 | 1/2002 | Wong |
| 6,344,796 B1 | 2/2002 | Ogilvie et al. |
| 6,356,196 B1 | 3/2002 | Wong et al. |
| 6,363,323 B1 | 3/2002 | Jones |
| 6,411,891 B1 | 6/2002 | Jones |
| 6,433,732 B1 | 8/2002 | Dutta et al. |
| 6,442,589 B1 | 8/2002 | Takahashi et al. |
| 6,456,900 B1 | 9/2002 | Kakuta |
| 6,463,420 B1 | 10/2002 | Guidice et al. |
| 6,480,758 B2 | 11/2002 | Stevens |
| 6,486,801 B1 | 11/2002 | Jones |
| 6,492,912 B1 | 12/2002 | Jones |
| 6,510,383 B1 | 1/2003 | Jones |
| 6,526,393 B1 | 2/2003 | Fredman |
| 6,536,659 B1 | 3/2003 | Hauser et al. |
| 6,539,360 B1 | 3/2003 | Kadaba |
| 6,570,488 B2 | 5/2003 | Kucharczyk et al. |
| 6,595,342 B1 | 7/2003 | Maritzen et al. |
| 6,606,604 B1 | 8/2003 | Dutta |
| 6,612,489 B2 | 9/2003 | McCormick et al. |
| 6,615,092 B2 | 9/2003 | Bickley et al. |
| 6,618,668 B1 | 9/2003 | Laird |
| 6,634,551 B2 | 10/2003 | Barta et al. |
| 6,683,542 B1 | 1/2004 | Jones |
| 6,688,435 B1 | 2/2004 | Will et al. |
| 6,690,997 B2 | 2/2004 | Rivalto |
| 6,694,217 B2 | 2/2004 | Bloom |
| 6,700,507 B2 | 3/2004 | Jones |
| 6,701,299 B2 | 3/2004 | Kraisser et al. |
| 6,714,859 B2 | 3/2004 | Jones |
| 6,725,127 B2 | 4/2004 | Stevens |
| 6,741,927 B2 | 5/2004 | Jones |
| 6,748,295 B2 | 6/2004 | Tilles et al. |
| 6,748,318 B1 | 6/2004 | Jones |
| 6,748,320 B2 | 6/2004 | Jones |
| 6,756,879 B2 | 6/2004 | Shuster |
| 6,763,299 B2 | 7/2004 | Jones |
| 6,763,300 B2 | 7/2004 | Jones |
| 6,772,130 B1 | 8/2004 | Karbowski et al. |
| 6,791,450 B2 | 9/2004 | Gokcebay et al. |
| 6,804,606 B2 | 10/2004 | Jones |
| 6,820,805 B2 | 11/2004 | Stevens |
| 6,845,909 B2 | 1/2005 | Bong et al. |
| 6,859,722 B2 | 2/2005 | Jones |
| 6,862,576 B1 | 3/2005 | Turner et al. |
| 6,882,269 B2 | 4/2005 | Moreno |
| 6,902,109 B2 | 6/2005 | Barta et al. |
| 6,904,359 B2 | 6/2005 | Jones |
| 6,933,832 B1 | 8/2005 | Simms et al. |
| 6,950,803 B2 | 9/2005 | Tiley et al. |
| 6,952,645 B1 | 10/2005 | Jones |
| 6,961,711 B1 | 11/2005 | Chee |
| 6,967,575 B1 | 11/2005 | Dohrmann et al. |
| 6,974,928 B2 | 12/2005 | Bloom |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,990,467 B1 | 1/2006 | Kwan |
| 6,994,253 B2 | 2/2006 | Miller et al. |
| 7,020,623 B1 | 3/2006 | Tiley et al. |
| 7,028,895 B2 | 4/2006 | Ashaari |
| 7,030,781 B2 | 4/2006 | Jones |
| 7,031,959 B2 | 4/2006 | Garner et al. |
| 7,055,741 B2 | 6/2006 | Bong et al. |
| 7,068,149 B2 | 6/2006 | Lee et al. |
| 7,075,451 B2 | 7/2006 | Kamada |
| 7,110,958 B2 | 9/2006 | Kang |
| 7,133,743 B2 | 11/2006 | Tilles et al. |
| 7,158,941 B1 | 1/2007 | Thompson |
| 7,158,948 B1 | 1/2007 | Rodriguez et al. |
| 7,176,782 B2 * | 2/2007 | Shitan ............. G07C 9/00309 |
| | | | 340/5.2 |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,254,549 B1 | 8/2007 | Bansal et al. |
| 7,257,552 B1 | 8/2007 | Franco |
| 7,267,920 B2 | 9/2007 | Nakazawa et al. |
| 7,312,702 B1 | 12/2007 | Willms et al. |
| 7,337,944 B2 | 3/2008 | Devar |
| 7,341,186 B2 | 3/2008 | Mrozik et al. |
| 7,353,181 B2 | 4/2008 | Nel |
| 7,358,857 B1 | 4/2008 | White |
| 7,376,598 B2 | 5/2008 | Estes et al. |
| 7,385,499 B2 | 6/2008 | Horton et al. |
| 7,422,149 B2 | 9/2008 | Aptekar |
| 7,426,484 B2 | 9/2008 | Joyce et al. |
| 7,479,899 B2 | 1/2009 | Horstemeyer |
| 7,501,946 B2 | 3/2009 | Lanigan et al. |
| 7,509,228 B2 | 3/2009 | Bielefeld et al. |
| 7,511,617 B2 | 3/2009 | Burman et al. |
| 7,528,722 B2 | 5/2009 | Nelson |
| 7,574,366 B2 | 8/2009 | Burman et al. |
| 7,580,845 B2 | 8/2009 | Burman et al. |
| 7,617,133 B1 | 11/2009 | Antony et al. |
| 7,624,024 B2 | 11/2009 | Levis et al. |
| 7,636,696 B1 | 12/2009 | Sigler, Jr. et al. |
| 7,647,231 B2 | 1/2010 | Kuebert et al. |
| 7,653,457 B2 | 1/2010 | Bloom |
| 7,653,603 B1 | 1/2010 | Holtkamp, Jr. et al. |
| 7,657,466 B2 | 2/2010 | Klingenberg et al. |
| 7,660,721 B2 | 2/2010 | Williams et al. |

(56) References Cited

U.S. PATENT DOCUMENTS

| | | |
|---|---|---|
| 7,693,723 B2 | 4/2010 | Wade |
| 7,711,654 B2 | 5/2010 | Schmidtberg et al. |
| 7,712,670 B2 | 5/2010 | Sauerwein, Jr. et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,815,112 B2 | 10/2010 | Volpe et al. |
| 7,822,618 B2 | 10/2010 | Kaneko |
| 7,831,439 B1 | 11/2010 | Bryar et al. |
| 7,848,961 B2 | 12/2010 | Estes et al. |
| 7,853,481 B1 | 12/2010 | Johnson |
| 7,868,753 B2 | 1/2011 | Jenkins et al. |
| 7,925,524 B2 | 4/2011 | Florence |
| 7,962,422 B1 | 6/2011 | Melechko et al. |
| 7,969,306 B2 | 6/2011 | Ebert et al. |
| 7,984,289 B2 | 7/2011 | Orbke et al. |
| 7,996,328 B1 | 8/2011 | Lundberg et al. |
| 8,010,430 B1 | 8/2011 | Chase et al. |
| 8,010,462 B2 | 8/2011 | Kinory et al. |
| 8,015,023 B1 | 9/2011 | Lee et al. |
| 8,027,933 B2 | 9/2011 | Lou et al. |
| 8,036,993 B2 | 10/2011 | Estes |
| 8,073,723 B1 | 12/2011 | Bilibin et al. |
| 8,086,546 B2 | 12/2011 | Spiegel et al. |
| 8,103,521 B2 | 1/2012 | Kuebert et al. |
| 8,103,716 B2 | 1/2012 | Boyce et al. |
| 8,108,265 B2 | 1/2012 | Bonner et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,156,007 B1 | 4/2012 | Anthony et al. |
| 8,204,799 B1 | 6/2012 | Murray et al. |
| 8,219,490 B2 | 7/2012 | Hammad et al. |
| 8,225,388 B2 | 7/2012 | Vogel et al. |
| 8,234,275 B2 | 7/2012 | Grant et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,280,824 B1 | 10/2012 | Vermeulen et al. |
| 8,291,234 B2 | 10/2012 | Snapp et al. |
| 8,306,923 B1 | 11/2012 | Roache et al. |
| 8,311,895 B1 | 11/2012 | Murugan et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,392,262 B2 | 3/2013 | Mallick et al. |
| 8,437,742 B2 | 5/2013 | Garskof |
| 8,468,062 B1 | 6/2013 | Kamdar |
| 8,489,520 B2 | 7/2013 | Kuebert et al. |
| 9,141,931 B2 | 9/2015 | Ackerman |
| 9,195,950 B2 | 11/2015 | Schenken |
| 9,670,694 B2 | 6/2017 | Larson et al. |
| 9,692,738 B1 | 6/2017 | Wenneman et al. |
| 9,798,999 B2 | 10/2017 | Schenken |
| 9,811,798 B2 | 11/2017 | Lievens et al. |
| 9,916,557 B1 | 3/2018 | Gillen et al. |
| 9,984,351 B1 | 5/2018 | Antony et al. |
| 10,007,712 B1 | 6/2018 | Williams et al. |
| 2001/0040422 A1 | 11/2001 | Gramlich |
| 2001/0042001 A1 | 11/2001 | Goto et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0007353 A1 | 1/2002 | Komacki |
| 2002/0010634 A1 | 1/2002 | Roman et al. |
| 2002/0013744 A1 | 1/2002 | Tsunenar et al. |
| 2002/0016726 A1 | 2/2002 | Ross |
| 2002/0019761 A1 | 2/2002 | Lidow |
| 2002/0019777 A1 | 2/2002 | Schwab et al. |
| 2002/0026380 A1 | 2/2002 | Su |
| 2002/0029194 A1 | 3/2002 | Lewis et al. |
| 2002/0032612 A1 | 3/2002 | Williams et al. |
| 2002/0032613 A1 | 3/2002 | Buettgenbach et al. |
| 2002/0035515 A1 | 3/2002 | Moreno |
| 2002/0038266 A1 | 3/2002 | Tuttrup et al. |
| 2002/0040350 A1 | 4/2002 | Shinzaki |
| 2002/0046056 A1 | 4/2002 | Demarco et al. |
| 2002/0070882 A1 | 6/2002 | Jones |
| 2002/0073039 A1 | 6/2002 | Ogg et al. |
| 2002/0080030 A1 | 6/2002 | Inomata |
| 2002/0082770 A1 | 6/2002 | Jones |
| 2002/0087371 A1 | 7/2002 | Abendroth |
| 2002/0099622 A1 | 7/2002 | Langhammer |
| 2002/0103653 A1 | 8/2002 | Huxter |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0128915 A1 | 9/2002 | Haseltine |
| 2002/0130065 A1 | 9/2002 | Bloom |
| 2002/0138173 A1 | 9/2002 | Barta et al. |
| 2002/0143670 A1 | 10/2002 | Cushing et al. |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0177922 A1 | 11/2002 | Bloom |
| 2002/0178016 A1 | 11/2002 | Mclellan |
| 2002/0178074 A1 | 11/2002 | Bloom |
| 2002/0184497 A1 | 12/2002 | Gage et al. |
| 2003/0003936 A1 | 1/2003 | Tighe |
| 2003/0023963 A1 | 1/2003 | Birkholz et al. |
| 2003/0025590 A1 | 2/2003 | Gokcebay et al. |
| 2003/0037009 A1 | 2/2003 | Tobin et al. |
| 2003/0040931 A1 | 2/2003 | De mol van otterloo et al. |
| 2003/0040980 A1 | 2/2003 | Nakajima et al. |
| 2003/0046173 A1 | 3/2003 | Benjier et al. |
| 2003/0093180 A1 | 5/2003 | Stevens |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0160097 A1 | 8/2003 | Steiner |
| 2003/0171996 A1 | 9/2003 | Chen et al. |
| 2003/0193414 A1 | 10/2003 | Jones |
| 2003/0195784 A1 | 10/2003 | Smith, Jr. |
| 2003/0225625 A1 | 12/2003 | Chew et al. |
| 2004/0015393 A1 | 1/2004 | Fong et al. |
| 2004/0030604 A1 | 2/2004 | Young |
| 2004/0039712 A1 | 2/2004 | Tartal et al. |
| 2004/0044582 A1 | 3/2004 | Chowdhary et al. |
| 2004/0073449 A1 | 4/2004 | Yang |
| 2004/0073499 A1 | 4/2004 | Martin et al. |
| 2004/0088225 A1 | 5/2004 | Foth et al. |
| 2004/0093312 A1 | 5/2004 | Cordery et al. |
| 2004/0117276 A1 | 6/2004 | Kettler |
| 2004/0117278 A1 | 6/2004 | Dutta et al. |
| 2004/0117326 A1 | 6/2004 | Amato |
| 2004/0133446 A1 | 7/2004 | Myrick et al. |
| 2004/0134690 A1 | 7/2004 | Norris et al. |
| 2004/0143518 A1 | 7/2004 | Siegel |
| 2004/0149822 A1 | 8/2004 | Stevens et al. |
| 2004/0149824 A1 | 8/2004 | Miller et al. |
| 2004/0153370 A1 | 8/2004 | Yang |
| 2004/0158351 A1 | 8/2004 | Rivalto |
| 2004/0172260 A1 | 9/2004 | Junger et al. |
| 2004/0181310 A1 | 9/2004 | Stashluk et al. |
| 2004/0199284 A1 | 10/2004 | Hara |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0215588 A1 | 10/2004 | Cornelius |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1 | 1/2005 | Mclellan et al. |
| 2005/0006470 A1 | 1/2005 | Mrozik et al. |
| 2005/0027607 A1 | 2/2005 | Pearson |
| 2005/0038758 A1 | 2/2005 | Hilbush et al. |
| 2005/0060164 A1 | 3/2005 | Eli Berl Illion |

(56) References Cited

U.S. PATENT DOCUMENTS

| | | |
|---|---|---|
| 2005/0060165 A1 | 3/2005 | Knight et al. |
| 2005/0060228 A1 | 3/2005 | Woo |
| 2005/0061877 A1 | 3/2005 | Stevens |
| 2005/0068178 A1 | 3/2005 | Lee et al. |
| 2005/0071258 A1 | 3/2005 | Kumakawa |
| 2005/0075989 A1 | 4/2005 | Biasi et al. |
| 2005/0080635 A1 | 4/2005 | Groff et al. |
| 2005/0080638 A1 | 4/2005 | Maseruka |
| 2005/0104716 A1 | 5/2005 | Simms et al. |
| 2005/0116033 A1* | 6/2005 | Moore ............... G07G 3/00 235/385 |
| 2005/0119786 A1 | 6/2005 | Kadaba |
| 2005/0120003 A1 | 6/2005 | Drury et al. |
| 2005/0131774 A1 | 6/2005 | Huxter |
| 2005/0137901 A1 | 6/2005 | Siegel |
| 2005/0138382 A1 | 6/2005 | Hougaard et al. |
| 2005/0149372 A1 | 7/2005 | Kite et al. |
| 2005/0216553 A1 | 9/2005 | Mallonee et al. |
| 2005/0218222 A1* | 10/2005 | Nark ............... G06Q 30/0601 235/384 |
| 2005/0222911 A1 | 10/2005 | Kerker et al. |
| 2005/0234911 A1 | 10/2005 | Hess et al. |
| 2005/0251402 A1 | 11/2005 | Olsen et al. |
| 2006/0010037 A1 | 1/2006 | Angert et al. |
| 2006/0010077 A1 | 1/2006 | Dohrmann et al. |
| 2006/0020366 A1 | 1/2006 | Bloom |
| 2006/0020489 A1 | 1/2006 | Rivalto |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0085273 A1 | 4/2006 | Mayer et al. |
| 2006/0097896 A1 | 5/2006 | Jones |
| 2006/0149577 A1 | 7/2006 | Stashluk et al. |
| 2006/0224512 A1 | 10/2006 | Kurakata |
| 2006/0229895 A1 | 10/2006 | Kodger, Jr. |
| 2006/0235739 A1 | 10/2006 | Levis et al. |
| 2006/0238334 A1 | 10/2006 | Mangan et al. |
| 2006/0282277 A1 | 12/2006 | Ng |
| 2006/0287870 A1 | 12/2006 | Mayer et al. |
| 2007/0005452 A1 | 1/2007 | Klingenberg et al. |
| 2007/0016538 A1 | 1/2007 | Bielefeld et al. |
| 2007/0036117 A1 | 2/2007 | Taube et al. |
| 2007/0047459 A1 | 3/2007 | Kadaba |
| 2007/0062851 A1 | 3/2007 | Schulz et al. |
| 2007/0078797 A1 | 4/2007 | Won et al. |
| 2007/0083410 A1 | 4/2007 | Hanna |
| 2007/0095904 A1 | 5/2007 | Barta et al. |
| 2007/0124295 A1 | 5/2007 | Forman et al. |
| 2007/0143281 A1 | 6/2007 | Smirin et al. |
| 2007/0150533 A1 | 6/2007 | Krause et al. |
| 2007/0156415 A1 | 7/2007 | Foth et al. |
| 2007/0185598 A1 | 8/2007 | Ortega |
| 2007/0192191 A1 | 8/2007 | Neal et al. |
| 2007/0198290 A1 | 8/2007 | Kinory et al. |
| 2007/0198357 A1 | 8/2007 | Ravazzolo |
| 2007/0205278 A1 | 9/2007 | Lovett |
| 2007/0266081 A1 | 11/2007 | Murchison et al. |
| 2008/0004928 A1 | 1/2008 | Trellevik et al. |
| 2008/0004957 A1 | 1/2008 | Hildreth et al. |
| 2008/0004967 A1 | 1/2008 | Gillen |
| 2008/0004995 A1 | 1/2008 | Klingenberg et al. |
| 2008/0040133 A1 | 2/2008 | Foth et al. |
| 2008/0040246 A1 | 2/2008 | Fukamachi |
| 2008/0051995 A1 | 2/2008 | Lokshin et al. |
| 2008/0061966 A1 | 3/2008 | Nelson |
| 2008/0082346 A1 | 4/2008 | Hoopes et al. |
| 2008/0109246 A1 | 5/2008 | Russell |
| 2008/0121682 A1 | 5/2008 | Grim et al. |
| 2008/0133261 A1 | 6/2008 | Ray |
| 2008/0154781 A1 | 6/2008 | Kumar |
| 2008/0172305 A1 | 7/2008 | Estes et al. |
| 2008/0210749 A1 | 9/2008 | Skaaksrud et al. |
| 2008/0221913 A1 | 9/2008 | Cook et al. |
| 2008/0249830 A1 | 10/2008 | Gilman et al. |
| 2008/0313018 A1 | 12/2008 | Kamm et al. |
| 2008/0319970 A1 | 12/2008 | Gamer et al. |
| 2008/0320092 A1 | 12/2008 | Campbell et al. |
| 2009/0001153 A1 | 1/2009 | Lim |
| 2009/0012802 A1 | 1/2009 | Pinney |
| 2009/0043552 A1 | 2/2009 | Tomlinson et al. |
| 2009/0046892 A1 | 2/2009 | Avant et al. |
| 2009/0063215 A1 | 3/2009 | Heise et al. |
| 2009/0076888 A1 | 3/2009 | Oster et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0173672 A1 | 7/2009 | Avant et al. |
| 2009/0187489 A1 | 7/2009 | Mallick et al. |
| 2009/0240597 A1 | 9/2009 | Oswald |
| 2009/0259509 A1 | 10/2009 | Landvater |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2010/0004960 A1 | 1/2010 | Frankenberg et al. |
| 2010/0011238 A1 | 1/2010 | Nakamura et al. |
| 2010/0012769 A1 | 1/2010 | Alber et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100497 A1 | 4/2010 | Kuebert et al. |
| 2010/0114678 A1 | 5/2010 | Axe et al. |
| 2010/0121689 A1 | 5/2010 | Wallace et al. |
| 2010/0138281 A1 | 6/2010 | Zhang et al. |
| 2010/0162149 A1 | 6/2010 | Sheleheda et al. |
| 2010/0185565 A1 | 7/2010 | Wade |
| 2010/0211444 A1 | 8/2010 | Spear |
| 2010/0223127 A1 | 9/2010 | Bettez et al. |
| 2010/0223134 A1 | 9/2010 | Lunenfeld |
| 2010/0235290 A1 | 9/2010 | Junger et al. |
| 2010/0250291 A1* | 9/2010 | Walker ............... G07F 9/026 705/5 |
| 2010/0280955 A1 | 11/2010 | Ross et al. |
| 2010/0324959 A1 | 12/2010 | Templeton et al. |
| 2011/0004562 A1 | 1/2011 | Hennessy et al. |
| 2011/0084162 A1 | 4/2011 | Goossen et al. |
| 2011/0093361 A1 | 4/2011 | Morales |
| 2011/0125665 A1 | 5/2011 | Kadaba |
| 2011/0153513 A1 | 6/2011 | Erie et al. |
| 2011/0191697 A1 | 8/2011 | Sumner et al. |
| 2011/0246323 A1 | 10/2011 | Mehta et al. |
| 2011/0270714 A1 | 11/2011 | Myrick et al. |
| 2011/0287748 A1 | 11/2011 | Angel et al. |
| 2011/0288896 A1 | 11/2011 | Dewey et al. |
| 2012/0016948 A1 | 1/2012 | Sinha |
| 2012/0030124 A1 | 2/2012 | Cronkright et al. |
| 2012/0030133 A1 | 2/2012 | Rademaker |
| 2012/0047084 A1 | 2/2012 | Naghshineh et al. |
| 2012/0047085 A1 | 2/2012 | Naghshineh et al. |
| 2012/0062362 A1 | 3/2012 | Rudduck et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0166320 A1 | 6/2012 | Junger |
| 2012/0179622 A1 | 7/2012 | Amato |
| 2012/0185363 A1 | 7/2012 | Gilbert |
| 2012/0235786 A1 | 9/2012 | Rudduck et al. |
| 2012/0246077 A1 | 9/2012 | Skaaksrud et al. |
| 2012/0303539 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2012/0330774 A1 | 12/2012 | Sadot et al. |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0018894 A1 | 1/2013 | Qiao |
| 2013/0018999 A1 | 1/2013 | Merrill et al. |

(56) References Cited

U.S. PATENT DOCUMENTS

| | | |
|---|---|---|
| 2013/0024307 A1 | 1/2013 | Fuerstenberg et al. |
| 2013/0054054 A1 | 2/2013 | Tollenaere et al. |
| 2013/0061337 A1 | 3/2013 | Zimberoff et al. |
| 2013/0073336 A1 | 3/2013 | Heath |
| 2013/0073605 A1 | 3/2013 | Fosburgh et al. |
| 2013/0088323 A1 | 4/2013 | Ryan |
| 2013/0144428 A1 | 6/2013 | Irwin et al. |
| 2013/0151419 A1 | 6/2013 | Hitchcock et al. |
| 2013/0166067 A1 | 6/2013 | Irwin et al. |
| 2013/0173484 A1 | 7/2013 | Wesby |
| 2013/0202185 A1 | 8/2013 | Irwin et al. |
| 2013/0238599 A1 | 9/2013 | Burris |
| 2013/0238658 A1 | 9/2013 | Burris |
| 2013/0246396 A1 | 9/2013 | Clare et al. |
| 2013/0261792 A1 | 10/2013 | Gupta et al. |
| 2013/0262311 A1 | 10/2013 | Buhrmann et al. |
| 2013/0262336 A1 | 10/2013 | Wan et al. |
| 2013/0268437 A1 | 10/2013 | Desai et al. |
| 2013/0284800 A1 | 10/2013 | Gillen et al. |
| 2013/0338822 A1 | 12/2013 | Gibson et al. |
| 2014/0034727 A1 | 2/2014 | Hancock et al. |
| 2014/0035721 A1 | 2/2014 | Heppe et al. |
| 2014/0052661 A1 | 2/2014 | Shakes et al. |
| 2014/0081677 A1 | 3/2014 | Craig et al. |
| 2014/0180959 A1 | 6/2014 | Gillen et al. |
| 2014/0214505 A1 | 7/2014 | Shuster-arechiga et al. |
| 2014/0222711 A1 | 8/2014 | Tibbs et al. |
| 2014/0236688 A1 | 8/2014 | Minter et al. |
| 2014/0258098 A1 | 9/2014 | Felix et al. |
| 2014/0278602 A1 | 9/2014 | Lievens et al. |
| 2014/0278603 A1 | 9/2014 | Lievens et al. |
| 2014/0278691 A1 | 9/2014 | Schenken |
| 2014/0278843 A1 | 9/2014 | Lievens et al. |
| 2014/0278898 A1 | 9/2014 | Lievens et al. |
| 2014/0279648 A1 | 9/2014 | Whitehouse |
| 2014/0279650 A1 | 9/2014 | Lievens et al. |
| 2014/0279654 A1 | 9/2014 | Lievens et al. |
| 2014/0279658 A1 | 9/2014 | Lievens et al. |
| 2014/0279663 A1 | 9/2014 | Lievens et al. |
| 2014/0279664 A1 | 9/2014 | Lievens et al. |
| 2014/0279665 A1 | 9/2014 | Lievens et al. |
| 2014/0279666 A1 | 9/2014 | Lievens et al. |
| 2014/0279667 A1* | 9/2014 | Gillen ............... G06Q 10/0836 705/339 |
| 2014/0279668 A1 | 9/2014 | Lievens et al. |
| 2014/0330407 A1 | 11/2014 | Corder et al. |
| 2014/0330603 A1 | 11/2014 | Corder et al. |
| 2014/0343724 A1 | 11/2014 | Hoganson et al. |
| 2015/0058163 A1 | 2/2015 | Lenahan et al. |
| 2015/0084750 A1 | 3/2015 | Fitzgibbon |
| 2015/0088694 A1 | 3/2015 | Ackerman |
| 2015/0088731 A1 | 3/2015 | Ackerman |
| 2015/0106294 A1 | 4/2015 | Robinson et al. |
| 2015/0120602 A1 | 4/2015 | Huffman et al. |
| 2015/0138382 A1 | 5/2015 | Xiao et al. |
| 2015/0186840 A1 | 7/2015 | Torres et al. |
| 2015/0193731 A1 | 7/2015 | Stevens et al. |
| 2015/0230055 A1 | 8/2015 | Smith et al. |
| 2015/0348173 A1 | 12/2015 | Gillen |
| 2015/0356801 A1 | 12/2015 | Nitu et al. |
| 2016/0027261 A1 | 1/2016 | Motoyama |
| 2016/0071051 A1 | 3/2016 | Tibbs et al. |
| 2016/0098680 A1 | 4/2016 | Schenken et al. |
| 2016/0140486 A1 | 5/2016 | Tibbs et al. |
| 2016/0140487 A1 | 5/2016 | Tibbs et al. |
| 2016/0148154 A1 | 5/2016 | Tibbs et al. |
| 2016/0189466 A1 | 6/2016 | Gibson et al. |
| 2016/0224773 A1* | 8/2016 | Ramaci ............... G16H 10/60 |
| 2017/0143145 A1 | 5/2017 | Peynet |
| 2017/0148059 A1 | 5/2017 | Minter et al. |
| 2017/0148243 A1 | 5/2017 | Shin et al. |
| 2017/0150304 A1 | 5/2017 | Baldasare et al. |
| 2017/0154483 A1 | 6/2017 | Cordiner et al. |
| 2017/0353943 A1 | 12/2017 | Skaaksrud |
| 2018/0005184 A1 | 1/2018 | Schenken |
| 2018/0025319 A1 | 1/2018 | Lievens et al. |
| 2018/0060800 A1 | 3/2018 | Robinson |
| 2018/0060812 A1 | 3/2018 | Robinson et al. |
| 2018/0253688 A1 | 9/2018 | Schenken et al. |
| 2019/0354918 A1 | 11/2019 | Tibbs et al. |
| 2020/0134559 A1 | 4/2020 | Lievens et al. |

FOREIGN PATENT DOCUMENTS

| | | |
|---|---|---|
| CN | 1317758 A | 10/2001 |
| CN | 1432946 A | 7/2003 |
| CN | 1571975 A | 1/2005 |
| CN | 1582447 A | 2/2005 |
| CN | 1666214 A | 9/2005 |
| CN | 1791475 A | 6/2006 |
| CN | 1795461 A | 6/2006 |
| CN | 101203873 A | 6/2008 |
| CN | 101329752 A | 12/2008 |
| CN | 101491051 A | 7/2009 |
| CN | 101971201 A | 2/2011 |
| CN | 102509199 A | 6/2012 |
| CN | 102609783 A | 7/2012 |
| CN | 102930655 A | 2/2013 |
| CN | 202720725 U | 2/2013 |
| CN | 103049855 A | 4/2013 |
| CN | 103310323 A | 9/2013 |
| CN | 103345791 A | 10/2013 |
| CN | 203232495 U | 10/2013 |
| EP | 1152356 A2 | 11/2001 |
| EP | 1365198 A1 | 11/2003 |
| EP | 2469291 A1 | 6/2012 |
| EP | 2973202 A1 | 1/2016 |
| GB | 2483474 A | 3/2012 |
| GB | 2528818 B | 3/2016 |
| JP | 62-121108 A | 6/1987 |
| JP | 5-211684 A | 8/1993 |
| JP | 6-40867 B2 | 6/1994 |
| JP | 10-207956 A | 8/1998 |
| JP | 11-18916 A | 1/1999 |
| JP | 11-139540 A | 5/1999 |
| JP | 11-151154 A | 6/1999 |
| JP | 20003-39373 A | 12/2000 |
| JP | 2001-014393 A | 1/2001 |
| JP | 2001-022678 A | 1/2001 |
| JP | 2001-282974 A | 10/2001 |
| JP | 2001-291027 A | 10/2001 |
| JP | 2001-338030 A | 12/2001 |
| JP | 2002-042008 A | 2/2002 |
| JP | 2002-056307 A | 2/2002 |
| JP | 2002-092505 A | 3/2002 |
| JP | 2002-109409 A | 4/2002 |
| JP | 2002-157541 A | 5/2002 |
| JP | 2002-245367 A | 8/2002 |
| JP | 2002-259553 A | 9/2002 |
| JP | 2002-288562 A | 10/2002 |
| JP | 2003-196354 A | 7/2003 |
| JP | 2003-263599 A | 9/2003 |
| JP | 2003-321124 A | 11/2003 |
| JP | 2004-030159 A | 1/2004 |
| JP | 2004-234275 A | 8/2004 |
| JP | 20042-80468 A | 10/2004 |
| JP | 2004-338824 A | 12/2004 |
| JP | 2005-043974 A | 2/2005 |
| JP | 2006-512635 A | 4/2006 |
| JP | 2006-277199 A | 10/2006 |
| JP | 2007-016423 A | 1/2007 |
| JP | 2007-153618 A | 6/2007 |
| JP | 2008-542886 A | 11/2008 |
| JP | 2008-303069 A | 12/2008 |
| JP | 2009-029631 A | 2/2009 |
| JP | 2010-128535 A | 6/2010 |
| JP | 2011-118611 A | 6/2011 |
| JP | 2012-071912 A | 4/2012 |
| JP | 2012-138000 A | 7/2012 |
| JP | 6151430 B2 | 6/2017 |
| JP | 6268273 B2 | 1/2018 |
| JP | 6449396 B2 | 1/2019 |
| KR | 2001-0093768 A | 10/2001 |
| KR | 2001-0098070 A | 11/2001 |

(56) References Cited

FOREIGN PATENT DOCUMENTS

| | | | |
|---|---|---|---|
| KR | 2002-0063776 A | 8/2002 | |
| KR | 10-2009-0001453 A | 1/2009 | |
| WO | 00/19170 A1 | 4/2000 | |
| WO | 00/19171 A1 | 4/2000 | |
| WO | 00/30014 A1 | 4/2000 | |
| WO | 00/46726 A2 | 8/2000 | |
| WO | 00/46728 A2 | 8/2000 | |
| WO | 00/52422 A1 | 9/2000 | |
| WO | 01/08071 A1 | 2/2001 | |
| WO | 01/16889 A10 | 3/2001 | |
| WO | 01/20423 A2 | 3/2001 | |
| WO | 01/29778 A1 | 4/2001 | |
| WO | 01/35344 A2 | 5/2001 | |
| WO | 01/39031 A2 | 5/2001 | |
| WO | 01/65451 A1 | 9/2001 | |
| WO | 01/65454 A2 | 9/2001 | |
| WO | 01/65523 A1 | 9/2001 | |
| WO | 01/65524 A1 | 9/2001 | |
| WO | 01/67344 A1 | 9/2001 | |
| WO | 01/72109 A2 | 10/2001 | |
| WO | 01/84359 A2 | 11/2001 | |
| WO | 01/88831 A2 | 11/2001 | |
| WO | 01/97101 A2 | 12/2001 | |
| WO | 02/07104 A1 | 1/2002 | |
| WO | 02/17045 A2 | 2/2002 | |
| WO | 02/052378 A2 | 7/2002 | |
| WO | 02/073369 A2 | 9/2002 | |
| WO | 02/080436 A2 | 10/2002 | |
| WO | 03/023688 A2 | 3/2003 | |
| WO | 03/040979 A1 | 5/2003 | |
| WO | 2004/015518 A2 | 2/2004 | |
| WO | 2004/042523 A2 | 5/2004 | |
| WO | 2005/072328 A2 | 8/2005 | |
| WO | 2007/055769 A2 | 5/2007 | |
| WO | 2010/123611 A1 | 10/2010 | |
| WO | 2011/074500 A1 | 6/2011 | |
| WO | 2012/129529 A1 | 9/2012 | |
| WO | 2013/106940 A1 | 7/2013 | |
| WO | 2014/031691 A2 | 2/2014 | |
| WO | 2014/142951 A1 | 9/2014 | |
| WO | 2014/164853 A2 | 10/2014 | |
| WO | 2016/027178 A1 | 2/2016 | |

OTHER PUBLICATIONS

Non-Final Office Action received for U.S. Appl. No. 14/200,724, dated Oct. 18, 2019, 17 pages.
Office Action received for Chinese Patent Application No. 201480067815.X, dated Aug. 21, 2019, 11 pages(6 pages of English Translation and 5 pages of Official copy).
Otto et al., "A Framework for Cyber-Enhanced Retailing: Integrating e-Commerce Retailing with Brick-and-Mortar Retailing", Electronic Markets, vol. 10, No. 3, 2000, pp. 1-7.
Final Office Action received for U.S. Appl. No. 15/253,473, dated Jul. 25, 2019, 33 pages.
Non-Final Office Action received for U.S. Appl. No. 15/252,629, dated Jul. 23, 2019, 21 pages.
Non-Final Office Action received for U.S. Appl. No. 15/706,442, dated Jul. 29, 2019, 9 pages.
Notice of Allowance received for U.S. Appl. No. 15/974,291, dated Aug. 22, 2019, 11 pages.
Office Action received for Australian Patent Application No. 2014248927, dated Aug. 13, 2019, 6 pages.
Chung et al., "Optimal Replenishment Policies for EOQ Inventory Model with Limited Storage Capacity Under Permissible Delay in Payments", Opsearch 41.1, 2004, 23 pages.
Fedex, "Mobile Shipping Label", Available online at: <www.mobilesolutions.fedex.com/shipping-label.html>. Retrieved on Sep. 25, 2013, pp. 1-2.
Notice of Allowance received for U.S. Appl. No. 14/170,298, dated May 22, 2019, 10 pages.
Notice of Allowance received for U.S. Appl. No. 14/942,697, dated Apr. 24, 2019, 18 pages.
Non-Final Office Action received for U.S. Appl. No. 15/711,127, dated Jan. 6, 2020, 10 pages.
Office Action received for UAE Patent Application No. 1223/2015, dated Nov. 20, 2019, 11 pages.
Final Office Action received for U.S. Appl. No. 14/514,155, dated Jun. 21, 2019, 28 pages.
Guler, N., "Containerization and Terminal Area Requirements", Istanbul Technical University, Maritime Faculty, Jul. 2002, Available online at <URL:https://hrcak.srce.hr/file/82785>, 20 pages.
Office Action received for Canadian Patent Application No. 2,905,763, dated Jun. 18, 2019, 7 pages.
Office Action received for European Patent Application No. 14714534.6, dated May 26, 2017, 5 pages.
Office Action received for Japanese Patent Application No. 2016-501276, dated Jun. 27, 2017, 5 pages.
Office Action received for Japanese Patent Application No. 2016-501276, dated Nov. 1, 2016, 8 pages.
Office Action received for Japanese Patent Application No. 2016-501288, dated Nov. 1, 2016, 7 pages.
Office Action received for Japanese Patent Application No. 2016-501304, dated Aug. 29, 2017, 4 pages.
Office Action received for Japanese Patent Application No. 2017-174116, dated Aug. 14, 2018, 3 pages.
Office Action received for U.S. Appl. No. 14/210,689, dated Nov. 18, 2015, 21 Pages.
"Outlook 2000 Handbook First Edition", last 9 lines, 2000, p. 95.
Pender, Lee, Hard Times are the Best Times, Magazine, Cio, Available at: <www.cio.com/archive/081501/besttimes_content.html>, Aug. 15, 2001, pp. 3-7.
Raco Industries, "Increase Delivery Visibility and Simplify Your Process", Available at: <http://www.racointeractive.com/media/834/raco_interactive-pd.pdf>, Retrieved on Sep. 25, 2013, 2 pages.
Robinson, et al., U.S. Unpublished U.S. Appl. No. 14/514,000, filed Oct. 14, 2014, titled "Systems and Methods for Conveying a Parcel to a Consignee, For Example, After an Unsuccessful Delivery Attempt".
Robinson, et al., U.S. Unpublished U.S. Appl. No. 14/514,155, filed Oct. 14, 2014, titled "Systems and Methods for Establishing an Account of a User at a Locker Bank".
Robinson, et al., U.S. Unpublished U.S. Appl. No. 14/561,062, filed Dec. 4, 2014, titled "Systems and Methods for Conveying a Parcel to a Consignee, For Example, After an Unsuccessful Delivery Attempt".
Schenken, et al., U.S. Unpublished U.S. Appl. No. 14/201,241, filed Mar. 7, 2014, titled "Systems and Methods for Defining Attributes of Attended Delivery/Pickup Locations".
Schenken, U.S. Unpublished U.S. Appl. No. 14/201,354, filed Mar. 7, 2014, titled "Systems and Methods for Ranking Potential Attended Delivery/Pickup Locations".
Search Report and Written Opinion received for Singapore Patent Application No. 11201507531R, dated Jun. 27, 2016, 11 pages.
Search Report and Written Opinion received for Singapore Patent Application No. 11201507549S, dated May 31, 2016, 11 pages.
"SEP leads €26 million funding round for Kiala", SEP Scottish Equity Partners, Available at: <http://www.sep.co.uk/news/story/sep-leads-e26-million-funding-round-for-kiala-2/>, Nov. 30, 2007, 2 Pages.
Summons to Attend Oral Proceedings received for European Patent Application No. 14854011.5, dated Apr. 3, 2018, 13 pages.
Tibbs, et al., U.S. Unpublished U.S. Appl. No. 14/170,298, filed Jan. 31, 2014, titled "Systems and Methods for Parcel Delivery to Alternate Delivery Locations".
U.S. Unpublished U.S. Appl. No. 14/514,228, filed Oct. 14, 2014, titled "Systems and Methods for Establishing an Account of a User at a Locker Bank".
U.S. Unpublished U.S. Appl. No. 14/561,041, filed Dec. 4, 2014, titled "Systems and Methods for Confirming an Identity of an Individual, For Example, at a Locker Bank".

(56) References Cited

OTHER PUBLICATIONS

Van Huzien, Gordon, "Messaging: The Transport Part of The XML Puzzle", IBM Developer Works, Article, Retrieved from:<URL:http://www-106.ibm.com/developerworks/library/xml-messaging/>, Jul. 2000, 8 pages.
"ASP V16-System Walker List Works Manual", line 5, 3.4 Start up and termination of ListWORKS writer, p. 88.
Brewin, et al., "Follow that Package!", Article, Computer World, Available at: <www.computervvorld.com/?printthis/2001//0,4814,58696,00.html>, Mar. 19, 2001, pp. 1-5.
Caminiti, et al., United Parcel Service Introduces Advanced Label Imaging System, Business Wire, Section 1, Nov. 29, 1989, pp. 1-3.
DeMarco, Donna, E-tail Presents Can be Tougher to Send Back than Order, Journal, Knight-Ridder/Tribune Business News, The Dialog Corporation, US, Dec. 28, 1999, 2 Pages.
El Portal Del Transporte, Fedex "Insight Empowers Customers with Enhanced Shipment Visibility and Control", Article, Retrieved from: <http://www.transportando.net/newsabri1_completa.htm>, Apr. 11, 2001, pp. 9-10.
FedEx, "FedEx Mobile Ship", Available at: <http://www.fedex.com/US/mobile/label.html, redirected to http://mobilesolutions.fedex.com/shipping-label.html>, Retrieved on Sep. 25, 2013, 2 pages.
FedEx, "RPS Adds Automated Package Pick-up to Redesigned Web Site", Available at: <www.fedex.com/us/about/ground/pressreleases/pressrelease111198.html?link=4>, Retrieved on Sep. 10, 2003. 1 page.
Final Office Action received for U.S. Appl. No. 14/199,830, dated Nov. 27, 2015, 30 pages.
Final Office Action received for U.S. Appl. No. 14/200,301, dated Oct. 22, 2015, 27 pages.
Final Office Action received for U.S. Appl. No. 14/514,000, dated Feb. 12, 2018, 43 pages.
Final Office Action received for U.S. Appl. No. 14/514,155, dated Oct. 20, 2016, 18 pages.
Final Office Action received for U.S. Appl. No. 14/514,276, dated Feb. 26, 2018, 51 pages.
Final Office Action received for U.S. Appl. No. 14/561,041, dated Sep. 15, 2015, 63 pages.
Final Office Action received for U.S. Appl. No. 14/561,062, dated Sep. 10, 2015, 45 pages.
Final Office Action received for U.S. Appl. No. 14/170,298, dated Oct. 23, 2015, 24 pages.
Final Office Action received for U.S. Appl. No. 14/200,432, dated Oct. 22, 2015, 20 pages.
Final Office Action received for U.S. Appl. No. 14/201,354, dated Oct. 29, 2015, 19 pages.
Frontline Solutions, Fed Ex "Improves Internal, External Operations", Article, Fairfax, Virginia and Memphis, Tennessee, Available at: <http://www.frintlinemagazine.com/art_th/04052001.htx>, Apr. 5, 2001, pp. 1-2.
Gao, et al., "Cyber-Physical-Social Systems: Harnessing the Crowd sourcing Power of Social Media for Disaster Relief", IEEE Intelligent Systems, IEEE Computer Society., 2011, pp. 10-14.
Harrington, Lisa, "The US Postal Service Gets Serious about Serving Business in the New Economy", Transportation & Distribution, vol. 41, No. 5, Penton Publishing, Inc., United States of America, May 2000, p. 2.
Henderson, Timothy P., "Scheduling Software Helps Webvan Meet 30-Minute Delivery Window, Descartes", Available at: <www.stores.org>, Jul. 2000, 2 pages.
Henderson, Timothy P, "Buy.com Boosts Returns Process Efficiency with New Solution", ProQuest Info & Learning, vol. 82, No. 11, Nov. 2000, pp. 72-76.
International Preliminary Report on Patentability received for PCT Patent Application No. PCT/US2014/014280, dated May 14, 2015, 23 pages.
International Preliminary Report on Patentability received for PCT Patent Application No. PCT/US2014/023538, dated Oct. 8, 2015, 7 pages.
International Preliminary Report on Patentability received for PCT Patent Application No. PCT/US2014/023554, dated Sep. 24, 2015, 10 pages.
International Preliminary Report on Patentability received for PCT Patent Application No. PCT/US2014/023575, completed on Jun. 12, 2015, 11 pages.
International Preliminary Report on Patentability received for PCT Patent Application No. PCT/US2014/023583, completed on Apr. 30, 2015, 8 pages.
International Preliminary Report on Patentability received for PCT Patent Application No. PCT/US2014/023610, completed on Jun. 4, 2015, 7 pages.
International Preliminary Report on Patentability received for PCT Patent Application No. PCT/US2014/023629, completed on May 21, 2015, 8 pages.
International Preliminary Report on Patentability received for PCT Patent Application No. PCT/US2014/023638, completed on May 20, 2015, 7 pages.
International Preliminary Report on Patentability received for PCT Patent Application No. PCT/US2014/023643, dated Sep. 24, 2015, 9 pages.
International Preliminary Report on Patentability received for PCT Patent Application No. PCT/US2014/023649, completed on Apr. 16, 2015, 10 pages.
International Preliminary Report on Patentability received for PCT Patent Application No. PCT/US2014/023658, completed on May 31, 2015, 6 pages.
International Preliminary Report on Patentability received for PCT Patent Application No. PCT/US2014/023665, completed on Apr. 17, 2015, 9 pages.
International Preliminary Report on Patentability received for PCT Patent Application No. PCT/US2014/060482, dated Apr. 28, 2016, 7 pages.
International Preliminary Report on Patentability received for PCT Patent Application No. PCT/US2014/060503, completed on Dec. 7, 2015, 11 pages.
International Preliminary Report on Patentability received for PCT Patent Application No. PCT/US2014/060517, completed on Nov. 5, 2015, 7 pages.
International Preliminary Report on Patentability received for PCT Patent Application No. PCT/US2014/060525, completed on Dec. 10, 2015, 12 pages.
International Search Report and Written Opinion received for PCT Patent Application No. PCT/US2014/014280, dated Nov. 17, 2014, 8 pages.
International Search Report and Written Opinion received for PCT Patent Application No. PCT/US2014/023538, dated Apr. 22, 2015, 8 pages.
International Search Report and Written Opinion received for PCT Patent Application No. PCT/US2014/023554, dated Jun. 10, 2015, 15 pages.
International Search Report and Written Opinion received for PCT Patent Application No. PCT/US2014/023575, dated Nov. 25, 2014, 11 pages.
International Search Report and Written Opinion received for PCT Patent Application No. PCT/US2014/023583, dated Dec. 9, 2014, 8 pages.
International Search Report and Written Opinion received for PCT Patent Application No. PCT/US2014/023597, dated Jun. 9, 2015, 9 pages.
International Search Report and Written Opinion received for PCT Patent Application No. PCT/US2014/023610, dated Jan. 6, 2015, 13 pages.
International Search Report and Written Opinion received for PCT Patent Application No. PCT/US2014/023629, dated Dec. 8, 2014, 8 pages.
International Search Report and Written Opinion received for PCT Patent Application No. PCT/US2014/023638, dated Dec. 4, 2014, 11 pages.
International Search Report and Written Opinion received for PCT Patent Application No. PCT/US2014/023649, dated Dec. 22, 2014, 12 pages.

(56) References Cited

OTHER PUBLICATIONS

International Search Report and Written Opinion received for PCT Patent Application No. PCT/US2014/023658, dated Dec. 31, 2014, 10 pages.
International Search Report and Written Opinion received for PCT Patent Application No. PCT/US2014/023665, dated Nov. 25, 2014, 9 pages.
Non-Final Office Action received for U.S. Appl. No. 14/200,724, dated Dec. 1, 2020, 13 pages.
Non-Final Office Action received for U.S. Appl. No. 15/252,629, dated Nov. 13, 2020, 28 pages.
Notice of Allowance received for U.S. Appl. No. 14/200,432, dated Feb. 7, 2019, 22 pages.
Final Office Action received for U.S. Appl. No. 14/942,757, dated Mar. 21, 2019, 26 pages.
Office Action received for Chinese Patent Application No. 201480067863.9, dated Dec. 24, 2018, 39 pages (15 pages of English Translation and 24 pages of Official Copy).
Office Action received for Malaysian Patent Application No. PI2015002350, dated Sep. 22, 2020, 2 pages.
International Search Report and Written Opinion received for PCT Patent Application No. PCT/US2014/060482, dated Feb. 3, 2015, 8 pages.
International Search Report and Written Opinion received for PCT Patent Application No. PCT/US2014/060503, dated Feb. 3, 2015, 9 pages.
International Search Report and Written Opinion received for PCT Patent Application No. PCT/US2014/060517, dated Feb. 4, 2015, 10 pages.
International Search Report and Written Opinion received for PCT Patent Application No. PCT/US2014/060525, dated Feb. 17, 2015, 16 pages.
International Search Report and Written Opinion received for PCT Patent Application No. PCT/US2015/0060757, dated May 2, 2016, 11 pages.
International Search Report and Written Opinion received for PCT Patent Application No. PCT/US2014/023643, dated Jun. 15, 2015, 10 pages.
International Search Report and Written Opinion received for PCT Patent Application No. PCT/US2014/030518, dated Jul. 8, 2015. 7 pages.
International Search Report and Written Opinion received for PCT Patent Application No. PCT/US2014/030530 , dated Jul. 8, 2015. 8 pages.
iPventure, "Schedule Distribution Routes and Timeslots", Available online at: <https://www.ipventure.com/onlineorder/distribution.php>. Retrieved on Apr. 16, 2008, 1 page.
Kihon, Kara Jissen., "Made Business Seikou No Tameno Kanpeki Guide—How to E-Commerce", p. 60.
Lievens, et al., U.S. Unpublished U.S. Appl. No. 14/199,787, filed Mar. 6, 2014, titled "Systems and Methods of Delivering Parcels Using Attended Delivery/Pickup Locations".
Lievens, et al., U.S. Unpublished U.S. Appl. No. 14/199,830, filed Mar. 6, 2014 titled "Systems and Methods of Suggesting Attended Delivery/Pickup Locations".
Lievens, et al., U.S. Unpublished U.S. Appl. No. 14/200,267, filed Mar. 7, 2014, titled "Systems and Methods of Reserving Space Attended Delivery/Pickup Locations".
Lievens et al., U.S. Unpublished U.S. Appl. No. 14/200,301, filed Mar. 7, 2014, titled "Systems and Methods of Managing the Capacity of Attended Delivery/Pickup Locations".
Lievens, et al., U.S. Unpublished U.S. Appl. No. 14/200,328, filed Mar. 7, 2014, titled "Systems and Methods of Flexibly Activating Temporary Attended Delivery/Pickup Locations".
Lievens, et al., U.S. Unpublished U.S. Appl. No. 14/200,432, filed Mar. 7, 2014, titled "Systems and Methods of Re-Routing Parcels Intended for Delivery to Attended Delivery/Pickup Locations".
Lievens, et al., U.S. Unpublished U.S. Appl. No. 14/200,528, filed Mar. 7, 2014, titled "Systems and Methods of Managing Item Pickup at Attended Delivery/Pickup Locations".
Lievens, et al., U.S. Unpublished U.S. Appl. No. 14/200,681, filed Mar. 7, 2014, titled "Systems and Methods of Managing Signatures of Documents".
Lievens, et al., U.S. Unpublished U.S. Appl. No. 14/200,724, filed Mar. 7, 2014, titled "Systems and Methods for Returning Items to Attended Delivery/Pickup Locations".
Lievens, et al., U.S. Unpublished U.S. Appl. No. 14/201,029, filed Mar. 7, 2014, titled "Systems and Methods of Managing Item Pickup at Attended Delivery/Pickup Locations".
Lievens, et al., U.S. Unpublished U.S. Appl. No. 14/201,114, filed Mar. 7, 2014, titled "Systems and Methods of Locating and Selling Items at Attended Delivery/Pickup Locations".
Lievens, et al., U.S. Unpublished U.S. Appl. No. 14/201,306, filed Mar. 7, 2014, titled "Systems and Methods for Determining Charges Related to the Delivery of a Parcel".
Lindsay, Bruce R., "Congressional Research Service, Social Media and Disasters: Current Uses, Future Options, and Policy Considerations", CRS Report for Congress, Congressional Research Service., Sep. 6, 2011, 10 pages.
"Many Happy Returns—UPS Unveils Advanced Outline Returns Solution", Accession No. 12921102, Business Wire, Sep. 20, 2000.
McNamara, Paul, "'Doorman' kiosk accepts package deliveries when you're not home", Networkworld, Available at <https://www.networkworld.com/article/2348365/data-center/-doorman--kiosk-accepts-package-deliveries-when-you-re-not-home.html>, Aug. 8, 2007, 4 pages.
Non-Final Office Action received for U.S. Appl. No. 14/170,298, dated May 4, 2015, 18 pages.
Non-Final Office Action received for U.S. Appl. No. 14/199,830, dated Jun. 24, 2015, 29 pages.
Non-Final Office Action received for U.S. Appl. No. 14/200,301, dated Jun. 17, 2015, 25 pages.
Non-Final Office Action received for U.S. Appl. No. 14/200,432, dated May 6, 2015, 19 pages.
Non-Final Office Action received for U.S. Appl. No. 14/210,813, dated Aug. 20, 2015, 10 pages.
Non-Final Office Action received for U.S. Appl. No. 14/514,155, dated Dec. 7, 2017, 19 pages.
Non-Final Office Action received for U.S. Appl. No. 14/514,155, dated Jun. 11, 2018, 23 pages.
Non-Final Office Action received for U.S. Appl. No. 14/514,155, dated Sep. 28, 2018, 29 pages.
Non-Final Office Action received for U.S. Appl. No. 14/514,228, dated Nov. 30, 2018, 45 pages.
Non-Final Office Action received for U.S. Appl. No. 14/514,276, dated Jul. 18, 2017, 61 pages.
Non-Final Office Action received for U.S. Appl. No. 14/561,041, dated Feb. 23, 2015, 55 pages.
Non-Final Office Action received for U.S. Appl. No. 14/561,041, dated Mar. 30, 2018, 57 pages.
Non-Final Office Action received for U.S. Appl. No. 14/561,062, dated Mar. 11, 2015, 33 pages.
Non-Final Office Action received for U.S. Appl. No. 14/935,257, dated Apr. 20, 2017, 16 pages.
Non-Final Office Action received for U.S. Appl. No. 14/942,757, dated Jul. 19, 2018, 25 pages.
Non-Final Office Action received for U.S. Appl. No. 14/200,528 , dated Oct. 16, 2015, 14 pages.
Non-Final Office Action received for U.S. Appl. No. 14/200,681, dated Jul. 25, 2016, 17 pages.
Non-Final Office Action received for U.S. Appl. No. 14/201,241 , dated Jan. 28, 2015, 10 pages.
Non-Final Office Action received for U.S. Appl. No. 14/201,354 , dated Apr. 24, 2015, 17 pages.
Notice of Allowance received for Singapore Patent Application No. 11201507531R, dated Jul. 19, 2018, 7 pages.
Notice of Allowance received for Singapore Patent Application No. 11201507536Q, dated Jul. 27, 2017, 6 pages.
Notice of Allowance received for U.S. Appl. No. 14/514,276, dated Oct. 3, 2018, 11 pages.
Office Action received for Canadian Patent Application No. 2,905,338, dated Oct. 2, 2018, 8 pages.

(56) References Cited

OTHER PUBLICATIONS

Office Action received for Chinese Patent Application No. 201480026776.9, dated Jul. 4, 2017, 9 pages.
Office Action received for Chinese Patent Application No. 201480026789.6, dated Jul. 23, 2018, 17 pages.
Final Office Action received for U.S. Appl. No. 15/252,629, dated Mar. 5, 2020, 30 pages.
Non-Final Office Action received for U.S. Appl. No. 14/561,062, dated Jan. 22, 2020, 44 pages.
Non-Final Office Action received for U.S. Appl. No. 14/514,000, dated Mar. 11, 2021, 34 pages.
Final Office Action received for U.S. Appl. No. 14/200,724, dated Jun. 2, 2020, 13 pages.
Final Office Action received for U.S. Appl. No. 14/942,757, dated Jun. 18, 2020, 26 pages.
Office Action received for Canadian Patent Application No. 2,905,833, dated Jun. 8, 2020, 6 pages.
Office Action received for Chinese Patent Application No. 201580067558.4, dated Apr. 28, 2020, 42 pages (27 pages of English Translation and 15 pages of Official copy).
Office Action received for Malaysian Patent Application No. PI2015002355, dated Jun. 30, 2020, 6 pages.
Final Office Action received for U.S. Appl. No. 14/514,000, dated Mar. 30, 2020, 34 pages.
Office Action received for Indian Patent Application No. 6228/CHENP/2015, dated Mar. 14, 2020, 6 pages.
Final Office Action received for U.S. Appl. No. 14/514,228, dated Jul. 27, 2020, 38 pages.
Final Office Action received for U.S. Appl. No. 14/561,062, dated Aug. 25, 2020, 49 pages.
Office Action received for Chinese Patent Application No. 201480026787.7, dated Jul. 21, 2020, 13 pages (8 pages of English Translation and 5 pages of Official copy).
Office Action received for Malaysian Patent Application No. PI2015002353, dated Jul. 30, 2020, 3 pages.
Final Office Action received for U.S. Appl. No. 14/200,724, dated May 19, 2021, 12 pages.
Final Office Action received for U.S. Appl. No. 14/942,731, dated Jul. 28, 2021, 36 pages.
Final Office Action received for U.S. Appl. No. 14/514,000, dated Sep. 20, 2021, 37 pages.
Notice of Allowance received for Chinese Patent Application No. 201580067558.4, dated Sep. 15, 2021, 7 pages (3 pages of English Translation and 4 pages of Official copy).
Non-Final Office Action received for U.S. Appl. No. 15/252,629, dated Oct. 5, 2021, 24 pages.

\* cited by examiner

SYSTEMS AND METHODS FOR CONFIRMING AN IDENTITY OF AN INDIVIDUAL, FOR EXAMPLE, AT A LOCKER BANK

CROSS REFERENCE TO RELATED APPLICATIONS

This application, entitled "Systems and Methods for Confirming an Identity of an Individual, For Example, at a Locker Bank," is a continuation of prior U.S. application Ser. No. 14/514,276, filed Oct. 14, 2014, and entitled "Systems and Methods for Confirming an Identity of an Individual, For Example, at a Locker Bank", which claims priority to each of the following applications, each of which is incorporated in their entirety herein by reference: U.S. Patent Application No. 62/058,521, filed Oct. 1, 2014, and entitled "Systems and Methods For Package Delivery to Alternate Delivery Locations"; U.S. Provisional Patent Application No. 61/890,685, filed Oct. 14, 2013, and entitled "Systems and Methods For Package Delivery to Alternate Delivery Locations"; U.S. Provisional Patent Application No. 61/890,694, filed Oct. 14, 2013, and entitled "Systems and Methods For Package Delivery to Alternate Delivery Locations"; U.S. Application No. 61/890,705, filed Oct. 14, 2013, and entitled "Systems and Methods For Package Delivery to Alternate Delivery Locations"; and U.S. Application No. 61/890,716, filed Oct. 14, 2013, and entitled "Systems and Methods For Package Delivery to Alternate Delivery Locations".

BACKGROUND

In the past, when a carrier was unable to deliver a parcel to a particular address (e.g., because the recipient was not at home and it was not possible to leave the parcel unattended at the particular address), the carrier would often attempt to redeliver the parcel on another day. Such redelivery attempts could occur multiple times for a particular parcel, which would result in increased transaction costs for the carrier and delays in receiving the parcel for the consignee. Accordingly, there is a need for improved systems and processes for facilitating the delivery of parcels to consignees when an initial delivery attempt is unsuccessful.

BRIEF DESCRIPTION OF THE DRAWINGS

Various embodiments of a system and method for delivering parcels to alternate delivery locations are described below. In the course of this description, reference will be made to the accompanying drawings, which are not necessarily drawn to scale, and wherein.

DETAILED DESCRIPTION OF THE VARIOUS EMBODIMENTS

Figure 1:
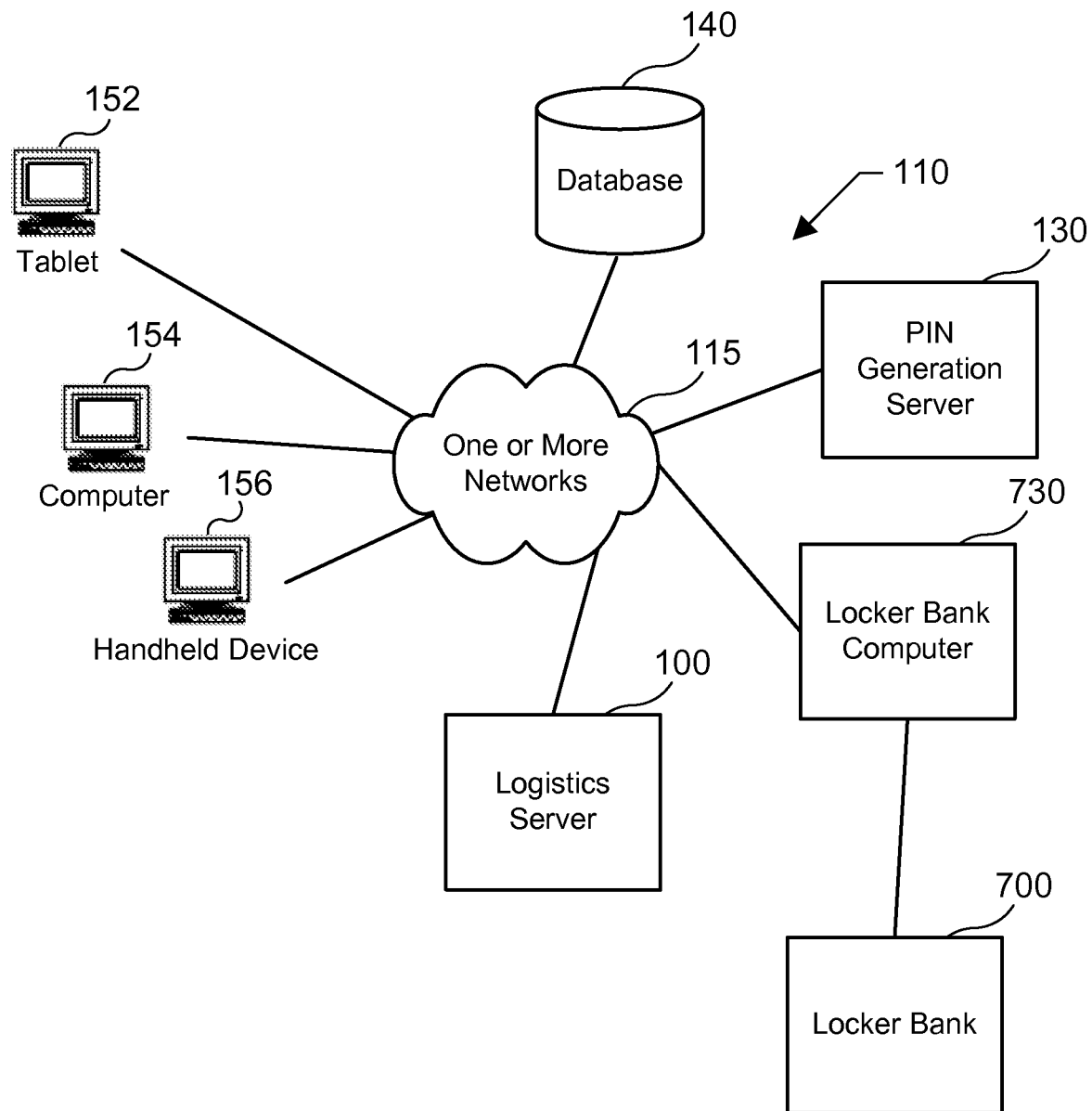
FIG. 1 is a block diagram of an alternate delivery location delivery system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In particular embodiments, a system for delivering items (e.g. parcels, packages, freight, mail, etc.) to alternate delivery locations is configured to facilitate the delivery of items to alternate delivery locations via a carrier (e.g., common carrier, freight company, logistics company, courier, authorized agent, government agency, etc.) in response to one or many unsuccessful delivery attempt(s) to a primary, alternate, or virtual delivery address. In particular embodiments, an unsuccessful delivery attempt may include an attempt to deliver one or more items (e.g., parcels, mail, freight, etc.) that could not be completed due to one or more policies of a carrier that had attempted to make the delivery.

In various embodiments, an alternate delivery location may include a location other than the physical address and/or virtual address of the parcel's intended recipient. Such alternate delivery locations may comprise, for example: (1) one or more locker banks comprising a plurality of secure lockers; (2) one or more other secure storage areas for holding items for later pickup; or (3) one or more 'mobile' (e.g., not fixed in place, on a mobile platform or vehicle) locker banks comprising a plurality of secure lockers. The one or more locker banks may, for example, be located in any suitable location, such as at a standalone facility and/or outside or within a facility designated for a primary purpose other than item delivery. Such facilities may include, for example, retail stores, gas stations, grocery stores, pharmacies, or any other suitable location.

In particular embodiments, when a representative of a carrier (e.g., a common carrier, a freight carrier, a less-than-truckload carrier, an air carrier, an ocean carrier, and/or a rail carrier, etc.) arrives at a locker bank to deliver a parcel to the locker bank: (1) the driver indicates via a system directly accessed at the locker location and/or via a portable computing device (e.g., a mobile device, a wearable device, etc.) that an item (e.g., package, freight, etc.) is to be delivered and/or picked up; (2) the system then either indicates or the driver (service provider) selects an appropriate locker (e.g., based on a size of the parcel or other criteria (e.g., time of day, type of package, special handling instructions for the parcel)); (3) the driver places or picks up the parcel in the locker chosen by the driver or the system; (4) a computer system associated with the locker bank sends an electronic notification to the parcel's shipper, consignee, carrier, and/or third party that the parcel is in the locker bank or has been picked up from the locker bank; the notification may also include an identifier for the locker containing the parcel, an address of the locker bank, and any other suitable information needed to retrieve the parcel from the locker bank; and (5) in the case of a delivery, the locker bank holds the parcel until it is retrieved from the locker, or until a predetermined amount of time passes (e.g., a predetermined number of days, weeks, months). If the parcel is not retrieved within a certain amount of the time, the system may coordinate pickup and rerouting of the parcel (e.g., back to the shipper of the parcel, to the home of the parcel's intended recipient, etc.).

In various embodiments, the system may be configured to determine a suitable locker in which to place a parcel, for example, based at least in part on a size of the parcel (e.g., a specified relative size of the parcel, such as small, medium, or large; the physical dimensions of the parcel; the parcel's dimensional weight, cube, etc.). Parcel size information may be received by the system, in various embodiments, from: (1) the shipper; (2) the carrier that is coordinating delivery of the parcel; (3) the consignee, and/or (4) any other party with knowledge of the item being shipped.

In particular embodiments, the system is further configured to facilitate a release of one or more parcels from the locker bank to a consignee or another person on behalf of the consignee. In such embodiments, the system is configured to: (1) receive a request to retrieve the one or more parcels; (2) confirm the identity of the person requesting to retrieve the one or more parcels; and (3) at least partially in response to confirming the person's identity, facilitate release of the one or more parcels from the locker bank. In some embodiments, the system is configured to prompt the consignee to register for a consignee account (e.g., associated with a particular common carrier) following retrieval of the one or more parcels from the locker bank by the consignee. The system may, for example, utilize information obtained in confirming the consignee's identity (e.g., name, address, phone number) in order to facilitate the creation of the consignee account.

Exemplary Technical Platforms

As will be appreciated by one skilled in the relevant field, a system for redirecting one or more parcels to alternate delivery locations may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products.

It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a System 110 according to a particular embodiment. As may be understood from this figure, the System 110 includes one or more computer networks 115, a Logistics Server 100, a PIN Generation Server 130, a Database 140, a Locker Bank Computer 730, a Locker Bank 700, and one or more remote computing devices such as a tablet computer 152, a desktop or laptop computer 154, or a handheld computing device 156, such as a cellular phone. In particular embodiments, the one or more computer networks facilitate communication between the Logistics Server 100, PIN Generation Server 130, Database 140, Locker Bank Computer 730, Locker Bank 700, and one or more remote computing devices 152, 154, 156.

The one or more computer networks 115 may include any of a variety of types of wired or wireless computer networks such as the Internet, a private intranet, a public switch telephone network (PSTN), or any other type of network. The communication link between the Logistics Server 100, Pin Generation Server 130, Database 140, Locker Bank Computer 730, and Locker Bank 700 may be, for example, implemented via a Local Area Network (LAN) or via the Internet.

In a particular embodiment, the Locker Bank 700 comprises one or more secure lockers, bins, receptacles, and/or designated areas made of a sufficiently strong material to prevent unwanted access to the lockers (e.g., a suitable metal such as steel, steel cage). In a particular embodiment, the locker bank comprises a plurality of secure lockers that each comprise an enclosure (e.g., a substantially rectangular enclosure) defining at least one opening. In various embodiments, the one or more lockers each comprise at least one door adjacent the opening for selectively restricting access to the interior of the one or more lockers. In particular embodiments, the at least one door is positioned to selectively prevent access to the interior of the locker enclosure through the at least one opening when the at least one door is in a closed position. In various embodiments, the at least one door is configured, when in an open position, to provide access to the interior of the locker enclosure through the at least one opening.

The one or more lockers further comprise at least one locking mechanism for maintaining the at least one door in a closed position. In particular embodiments, the locking mechanism is controlled by one or more Locker Bank Computers 730, which may, for example, require a PIN number in order to unlock any particular locker within the Locker Bank 700. The Locker Bank Computer 730 may control access to each of the one or more lockers within the Locker Bank 700. In particular embodiments, each particular locker within the Locker Bank 700 is controlled by a particular associated Locker Bank Computer 730. In particular embodiments, the PIN Generation Server 130 is configured to generate one or more PIN numbers for unlocking one or more lockers within the Locker Bank 700. The PIN Generation Server 130 may communicate a generated PIN to the Locker Bank Computer 730, and the Locker Bank Computer 730 may be configured to allow access to a particular locker in response to entry of the PIN.

Figure 2:
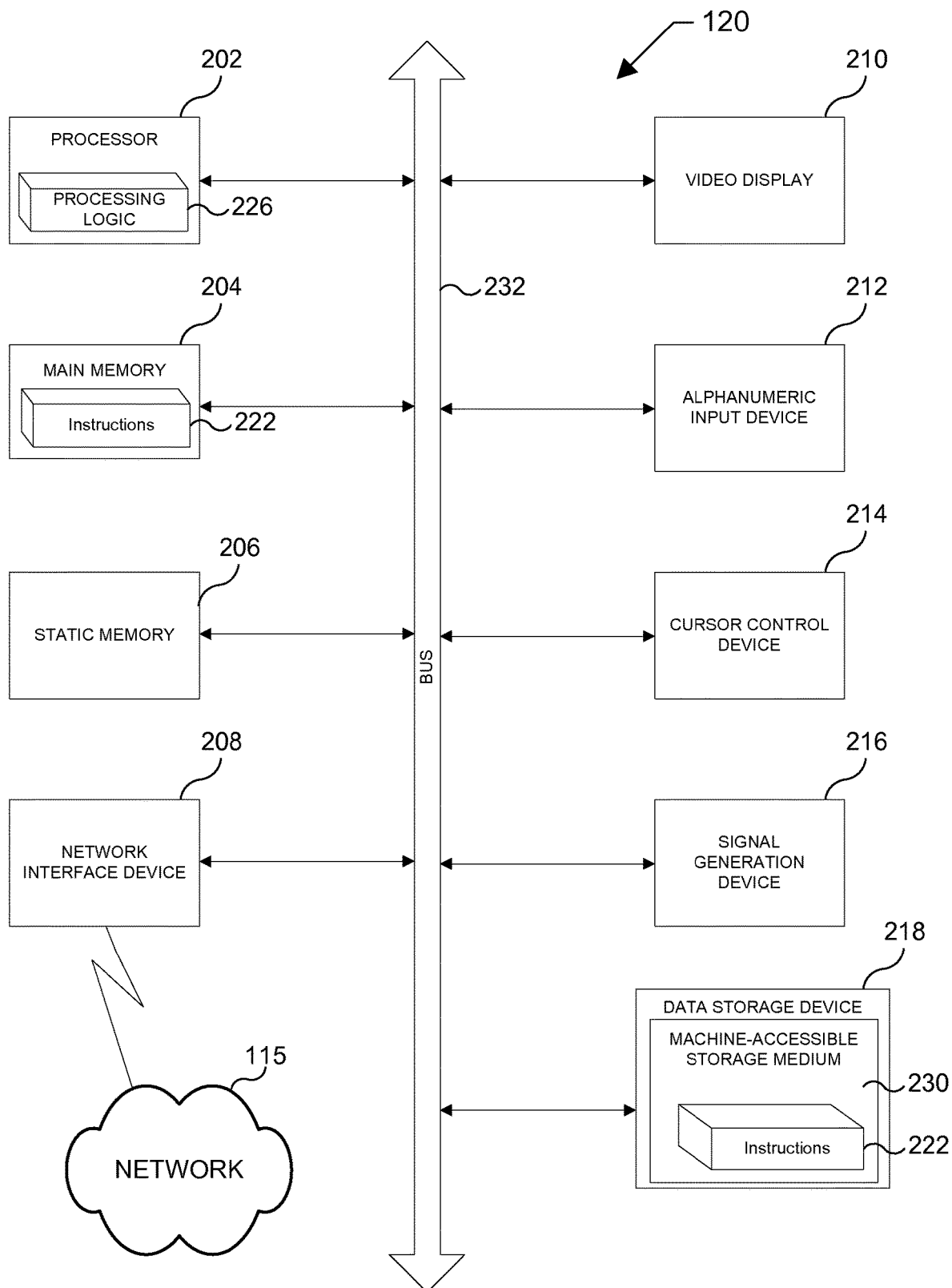
FIG. 2 is a schematic diagram of a computer, such as the logistics server of FIG. 1, that is suitable for use in various embodiments.

FIG. 2 illustrates a diagrammatic representation of a computer architecture 120 that can be used within the System 110, for example, as a client computer (e.g., one of client computers 152, 154, 156 shown in FIG. 1), or as a server computer (e.g., Logistics Server 100 shown in FIG. 1). In particular embodiments, the computer 120 may be suitable for use as a computer within the context of the System 110 that is configured to facilitate the delivery of parcels to alternate delivery locations or facilitate the receipt and/or processing of parcels once they are delivered to the alternate delivery locations.

In particular embodiments, the computer 120 may be connected (e.g., networked) to other computers in a LAN, an intranet, an extranet, and/or the Internet. As noted above, the computer 120 may operate in the capacity of a server or a client computer in a client-server network environment, or as a peer computer in a peer-to-peer (or distributed) network environment. The computer 120 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-readable storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within main memory 204 and/or within processing device 202 during execution thereof by computer 120, main memory 204 and processing device 202 also constituting computer-accessible storage media. The software 222 may further be transmitted or received over a network 220 via network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Exemplary System Platform

Various embodiments of a system for delivering items (e.g., parcels) to alternate delivery locations may be implemented within the context of any suitable service. For example, particular embodiments may be implemented within the context of any logistics service (e.g., such as those provided by United Parcel Service of America, Inc. of Atlanta, Ga.). Various aspects of the system's functionality may be executed by certain system modules, including a Parcel Redirection Module 300; Delivery Driver Locker Bank Management Module 400; Consignee Parcel Release Module 500; and/or Consignee Account Creation Module 600. These modules are discussed in greater detail below.

A. Parcel Redirection Module

Figure 3:
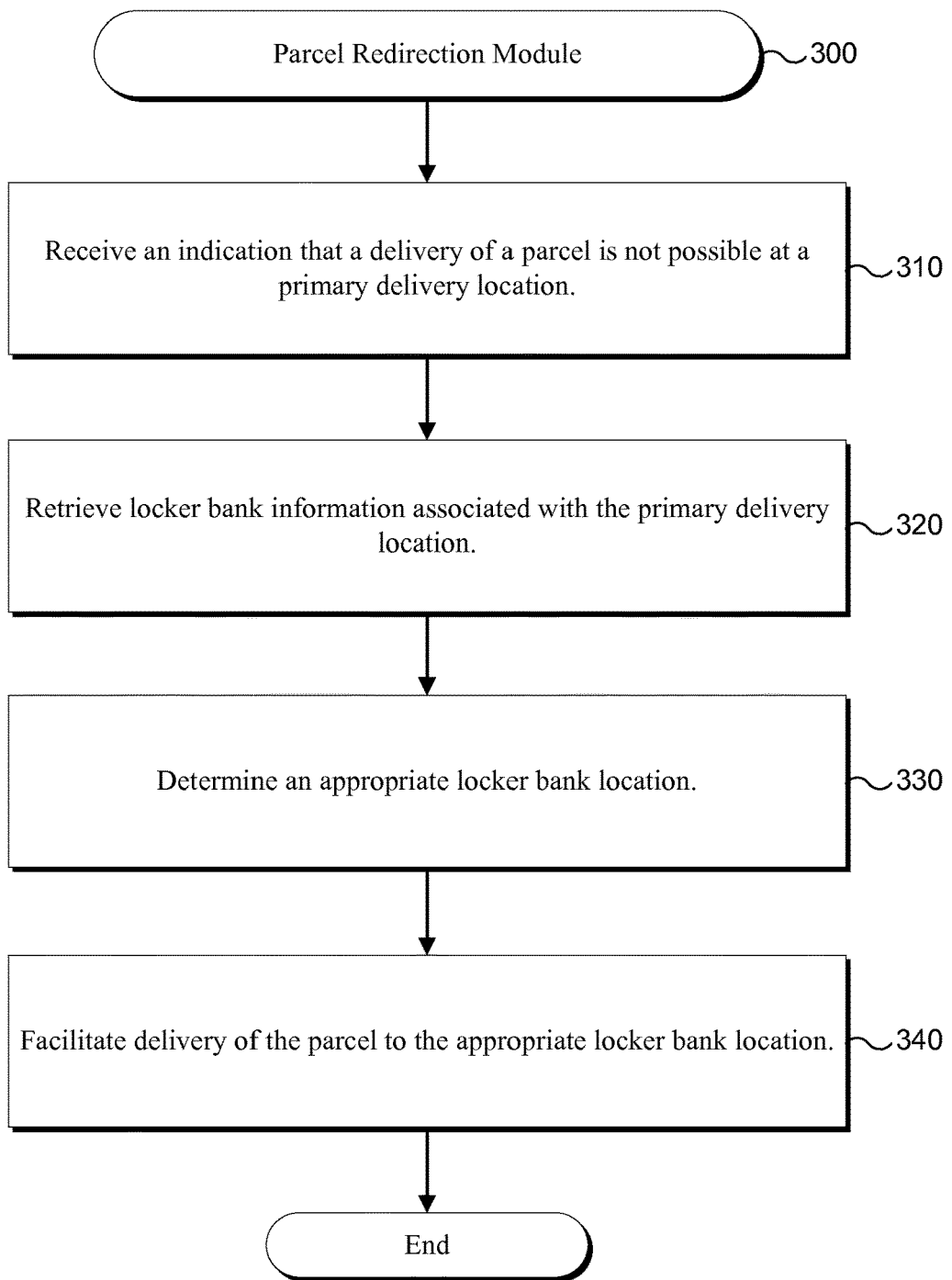
FIG. 3 depicts a flow chart that generally illustrates various steps executed by a parcel redirection module that, for example, may be executed by the logistics server of FIG. 1.

FIG. 3 is a flow chart of operations performed by an exemplary Parcel Redirection Module 300. In particular embodiments, the Parcel Redirection Module 300 may facilitate the redirection of one or more parcels from a primary delivery location (e.g., the original intended delivery location of a parcel, such as the intended parcel recipient's residence) to an alternate delivery location (e.g., such as a suitable locker bank or attended access point). Although the Parcel Redirection Module 300 below particularly describes parcel redirection to a locker bank, it should be understood in the context of this disclosure that the Parcel Redirection Module 300 may be utilized in the context of the system to redirect one or more parcels to any other suitable alternate delivery location or other location.

1. Receipt of an Indication of Non-Delivery of a Parcel at a Primary Delivery Location When executing the Parcel Redirection Module 300, the system begins, at Step 310, by receiving an indication that delivery of a parcel is not possible at a primary delivery location. In various embodiments, the system receives the indication that the parcel is undeliverable from a delivery driver who was unable to perform the delivery. In particular embodiments, the system is configured to receive the indication in any suitable manner (e.g., via input on a wireless device such as a smart phone or UPS' DIAD device). A delivery of a parcel may not be possible, for example: (1) because the parcel recipient is not "physically" home to receive the parcel; (2) because no one is physically present at the primary delivery location to sign for or authorize the delivery of the parcel if the parcel requires signature confirmation or other identification system; and (3) because the delivery driver has determined or the carrier system has determined or the consignee has indicated (e.g., based on one or more carrier policies, carrier systems, carrier system interaction with a consignees's system) that the item should not be left outside at the primary delivery location.

In various embodiments, the system is configured to facilitate placement (e.g., by the delivery driver) of an "information notice" at the primary delivery location (e.g., on the door of the primary delivery location, or in any other suitable location from which a consignee living or working at the primary delivery location may access, retrieve, or otherwise obtain the information contained within the information notice). In various embodiments, the system is configured to associate (e.g., in the system's memory) the parcel (e.g., and any tracking or other information associated with the parcel) with a pre-printed machine-readable indicia (and/or alphanumeric code associated with the indicia) on the "information notice." In particular embodiments, the system is configured to associate the parcel with the pre-printed "paper" machine-readable indicia at least partially in response to the delivery driver scanning the pre-printed machine-readable indicia (e.g., using a suitable machine-readable indicia-scanner such as a barcode scanner or camera). In various embodiments, the system may use the machine-readable indicia or related code as a key within a database that may be used to retrieve additional information regarding the parcel (e.g., the parcel's current location, status, and pickup instructions for the parcel).

In various embodiments, the "information notice" may comprise a sheet of paper that includes printed text and/or an embedded or attached physical device (e.g., a computer chip) to indicate to the consignee that an attempt was made to deliver a parcel to the primary delivery location. The information notice may further indicate how the consignee can determine when, where, and how to obtain additional information regarding the current physical location of the item (e.g., parcel) to complete delivery of the item.

The "information notice" left at the physical location of the primary delivery location may have information printed, encoded, or otherwise indicated on or programmed in by the delivery person using mechanical or electronic means. The system may receive such information, for example, from the delivery driver or other carrier representative, or from any other suitable source. In various embodiments, the information the system receives may include but is not limited to, the time and/or location of the attempted delivery, other GPS information (e.g., altitude), the parcel's tracking number, an information notice reference number(s), and/or any other designated information.

In various embodiments, the information notice may instruct the consignee to view tracking information for the parcel (e.g., using a tracking number printed on the information notice, by scanning a suitable machine-readable indicia printed on the information notice, etc.) in order to ascertain a substantially current location or status of their parcel. In various embodiments, tracking the parcel may enable the consignee to wait until the parcel has been delivered to an alternate delivery location (e.g., a particular locker bank) before attempting to retrieve the parcel. For example, in various embodiments, the system may redirect the parcel to an alternate delivery location that ultimately does not have capacity to accept the parcel, and then redirect the parcel to a second alternate delivery location. In such embodiments, it may be beneficial to provide the consignee with a tracking number or other tracking information rather than a destination to which the parcel has been redirected, in case the initial redirection location cannot ultimately accept delivery of the parcel.

II. Retrieval of Locker Bank Information for Use in Determining a Suitable Locker Bank to which the System will Redirect the Parcel Next, at Step 320, the system continues by retrieving locker bank information associated with the primary delivery location, which the system may later use to determine which locker bank to reroute the parcel to. It should be understood that the types of information described below may be used in any suitable way, and that, in certain cases, certain types of information may not be available, and/or may not be used in determining which locker bank should receive the parcel. As a particular example, in various embodiments, the system may be configured to reroute any suitable parcels that were the subject of an unsuccessful delivery attempt to a particular address, to be re-directed to a particular, designated locker bank for the particular address.

With the above in mind, in various embodiments, the locker bank information may include, for example, the following: (1) carrier locker bank availability information; (2) parcel recipient locker bank location preferences; (3) parcel shipper locker bank location preferences; and/or (4) other third-party (e.g., fulfillment house, logistics provider, etc.) information. Each of these types of information is described below.

A. Locker Bank Availability Information

In particular embodiments, the locker bank information retrieved by the system includes the location of one or more locker banks (e.g., attended or unattended delivery locations) as well as information relating to the ability of those locker banks to receive parcels. As may be understood in the context of this disclosure, a particular carrier may own, lease, control, or otherwise have access to a plurality of locker banks in a particular geographic area. In various embodiments, these may include third party locker banks as well as locker banks owned and/or operated by the carrier. In various embodiments, the system is configured to retrieve location information regarding locker banks that may be within a particular distance of the primary delivery location to which delivery of a parcel was not possible. In particular embodiments, the particular distance from the primary delivery location for which the system retrieves locker bank location information depends at least in part on one or more attributes of the primary delivery location, or the area in which the primarily delivery location is situated.

As a particular example, when a primary delivery location is in an urban or more densely populated area, the system may be configured to retrieve information for locker banks that are no more than a short distance from the primary delivery location (e.g., within walking distance of the primary delivery location, within a predetermined distance (e.g., within one mile of) the primary delivery location, within a particular number of stops on a public transportation system from the primary delivery location, etc.). As a different example, when a primary delivery location is in a rural area, the system may be configured to retrieve information for alternate delivery locations that are farther from the primary delivery location (e.g., up to ten miles from the primary delivery location, within a fifteen minute drive of the primary delivery location, etc.).

In various embodiments, the system is configured to determine locker bank location information based at least in part on a location of a delivery driver, which may, for example, be determined based on a location of a mobile computing device (e.g., such as a smart phone or DIAD) associated with the delivery driver (e.g., based on GPS coordinates of the mobile computing device, etc.) and/or location of the delivery vehicle (e.g., telematics) In such embodiments, the system may locate one or more locker banks that are no more than a particular distance from the delivery driver, delivery driver's route, delivery vehicle, delivery recipient (e.g., based on consignees', carriers', and/or shippers' social network information, mobile GPS information, stored recipient preferences, etc.), and/or original shipper of the goods (e.g., high value or perishable goods that may have special handling requirements) as discussed above.

In particular embodiments, the system may retrieve information associated with alternate delivery locations other than locker banks. For example, the system may retrieve information associated with alternate delivery locations that may include retail stores (e.g., gas stations, grocery stores, and pharmacies), stand-alone kiosks, or any other suitable location for receiving and holding parcels for pickup by recipients.

In various embodiments, each alternate delivery location may have limited capacity for receiving and holding parcels (e.g., redirected parcels) until the parcels are picked up by the intended recipients. For example, a particular locker bank may comprise sixteen individual lockers. Such a locker bank may only have capacity to store sixteen items or groups of items (e.g., parcels) at any particular time. As another example, an alternate delivery location that is part of a grocery store may have limited physical storage space (e.g., shelf space) for storing parcels. Other alternate delivery locations may be unable to store particular parcels that require special handling (e.g., refrigeration or other temperature storing requirements). In particular embodiments, a particular locker bank may include one or more lockers that have special handling capabilities (e.g., climate control, refrigeration, etc.). In various embodiments, alternate locker bank information includes information relating to the ability of a particular locker bank location to receive and properly store a parcel. In particular embodiments, the system may substantially continuously (e.g., continuously) update capacity information in real time for a particular locker bank. In other embodiments, the system may update capacity information for a particular locker bank other than substantially continuously (e.g., once per day, two times per day, etc.).

B. Carrier Locker Bank Location Preference Information

In particular embodiments, the system is configured to allow a logistics provider (e.g., a carrier, such as a common carrier) to designate a preferred or established locker bank for parcels that were unable to be delivered to a particular location. The carrier may, for example: (1) assign a designated locker bank location (e.g., locker bank) to each individual primary delivery location (e.g., physical address); or (2) associate a particular locker bank location with a particular group of delivery addresses (e.g., all addresses within a particular subdivision). In other embodiments, the system is configured to enable a carrier to determine a suitable locker bank location based at least in part on an attribute of the one or more parcels that were unable to be delivered. Such attributes may include, for example, the size of the parcel(s), special handling instructions associated with the parcel(s), etc. In various other embodiments, the system is configured to determine a suitable locker bank location based on any other suitable carrier preference (e.g., volume of parcels, distance, time, service level guarantees, etc.).

C. Parcel Recipient Locker Bank Location Preference Information

In particular embodiments, the system is configured to retrieve locker bank location information that includes one or more parcel recipient preferences related to a locker bank (or other alternate delivery locations). These one or more parcel recipient preferences may be provided to the system by one or more parcel recipients, for example, and may include one or more preferences related to a particular locker bank location to which the recipients would like their parcels to be redirected following an unsuccessful delivery. In particular embodiments, the system is configured to allow each potential parcel recipient to provide a list of preferred locker bank locations in a ranking from most preferred to least preferred. In various embodiments, the system is configured to redirect one or more parcels to the intended parcel recipient's most preferred locker bank location that is able to accept the parcel. A parcel recipient may, for example, provide a most preferred locker bank location that is situated between the recipient's home and place of work, so that the recipient can pick up the parcel from the locker bank on the way home from work. In various embodiments, the system is configured to enable a particular consignee to provide locker bank location and other preferences via an account the consignee has with a particular carrier.

In various embodiments, the system is configured to allow parcel recipients to provide preferred locker bank locations for any parcel that the recipients may be scheduled to receive (e.g., for all parcels scheduled for shipment to the parcel recipient, regardless of the source of the parcel). In other embodiments, the system is configured to allow a parcel recipient to select or otherwise provide preferred locker bank locations for specific parcels (e.g., in response to the parcel recipient receiving a notification that the parcel recipient is currently scheduled to receive a particular parcel). In particular embodiments, following an unsuccessful delivery attempt, the system may be configured to notify the parcel recipient (via a mobile device, on a private or public social network, and/or the use of a physical "information notice" placed at the location of the primary delivery attempt) that the carrier was unable to deliver the parcel to the primary delivery location and is further configured to provide the parcel recipient with a selection of locker bank locations or other alternate delivery locations to which the parcel can be directed. In various embodiments, the system is configured to provide alternate delivery locations from which the parcel recipient may choose that have substantially current (e.g., current) availability to accept the parcel.

In still other embodiments, the system is configured to enable a parcel recipient to select a particular locker bank for delivery of all parcels for which the parcel recipient is the intended recipient. For example, the parcel recipient may select to have all future deliveries delivered to the particular locker bank directly (e.g., rather than having the carrier attempt delivery first at the primary delivery location).

D. Parcel Shipper Locker Bank Location Preference Information

In various embodiments, the system is configured to allow a shipper to select whether parcels that the shipper sends to recipients can be redirected to locker bank locations following unsuccessful delivery attempts of parcels. For example, when sending a parcel, the shipper may indicate that the particular parcel should not be rerouted to any locker bank location in the event of an unsuccessful delivery attempt. In particular embodiments, shippers may, for any suitable reason, opt out of allowing parcels that the shipper sends to be rerouted to locker bank locations (e.g., because of the nature of the item being shipped, etc.). In various embodiments, the system may be configured to allow shippers to set global preferences as to how their packages may be handled. For example, the shippers may indicate that none of their parcels should be rerouted to a locker bank, or that only items of a certain type, size or cost may be rerouted to locker bank. Similarly, the system may be configured to allow a parcel shipper to specify the types of locker bank locations to which their parcels may be rerouted. For example, an online electronics retailer may wish to prevent parcels that they ship to customers from being redirected to a locker bank that is located adjacent to, outside of, or within a store location that is a competitor to the online electronics retailer.

E. Social Media Locker Bank Location Determination Information

In particular embodiments, the system is configured to retrieve potential locker bank location information based at least in part on social media data associated with the consignee. The system, in various embodiments, may be configured to retrieve the user's current location and other data from one or more social network accounts associated with the consignee. The system may, for example, determine that the consignee was not home to accept the parcel when the parcel was unsuccessfully delivered, but that the consignee but had "checked in" at a movie theater in their home city on a social network (e.g., Facebook, foursquare, twitter, etc.). In another example, the system may determine that the consignee is currently in a different city or state (e.g., for business, pleasure, etc.) based at least in part on social networking data (e.g., such as one or more photos uploaded by the consignee, social media posts by the consignee, the consignee's calendar information, travel itinerary, vacation schedule, etc.). The system may then retrieve locker bank locations that are near the location of the consignee determined by the social media data. For example, after an unsuccessful delivery attempt to the consignee's home, the system may be configured to reroute a parcel to a locker bank location near or adjacent to a hotel where the consignee is currently staying for business.

The system may be further configured to enable consignees or other customers to provide a current location via an account of the consignee associated with a carrier (e.g., such as UPS' MyChoice service). The system may be further configured to determine a current location of the consignee based at least in part on GPS data retrieved from a mobile computing device (e.g., a smartphone, tablet computer, and/or vehicle) associated with the consignee and/or the consignee's account.

III. Determination of a Suitable Locker Bank Using the Received Locker Bank Information Returning to Step 330, the system continues by determining an appropriate locker bank location based at least in part on the locker bank location information retrieved at Step 320. The system may, for example, determine that the appropriate locker bank location is a particular locker bank that has been associated with the delivery address of the parcel by the carrier. In another example, the system may determine that the appropriate locker bank location is the locker bank that is highest on the parcel recipient's list of preferred locker bank locations that has (or that is predicted to have) sufficient capacity to receive the parcel in terms of space and special handling requirements. As another example, the system may determine that no locker bank location is suitable to receive a parcel (e.g., because the shipper indicated a preference for the parcel not to be redirected to a locker bank). In this example, the parcel may be returned to a local distribution center instead of a locker bank and delivery may be attempted on the following day or at any other suitable time.

In particular embodiments, the system is configured to determine an appropriate locker bank location based at least in part on a size and/or weight of the parcel. For example, parcels of a particular size may be too large to leave at the primary delivery location when no one is available to accept the delivery of the parcel (e.g., because the size of the parcel may render the parcel more susceptible to theft if left outside of the primary delivery location). As a different example, parcels that are particularly large in size and/or weight may be unsuitable for redirection to a locker bank location due to the difficulty that a parcel recipient may face in transporting a parcel picked up at a locker bank location to the parcel recipient's residence. For example, parcels of a certain size or weight may be difficult for a parcel recipient to fit in the parcel recipient's vehicle or may be too heavy for the parcel recipient to carry. For such parcels, the system may be configured to direct a carrier delivery driver to release the parcel at the primary delivery address (e.g., by leaving the parcel at the primary delivery address) rather than redirecting the parcel to a locker bank location.

A. Determination of a Suitable Locker Bank Location Based on Locker Availability and Parcel Size In particular embodiments, the system is configured to determine an appropriate locker bank location based at least in part on: (1) a capacity (or predicted capacity) of a particular locker bank location to take delivery of the parcel (e.g., at a predicted time of delivery of the parcel to the locker bank, or any other suitable time); (2) a number of available lockers and a size of available lockers at the locker bank location; (3) a capacity of one or more available lockers at the locker bank to satisfy any special handling criteria associated with the parcel (e.g., special environmental conditions such as no light or temperature control; noise limitations; protection from excessive vibrations; high security, etc.); (4) the availability of a locker within a particular location in a locker bank (e.g., the middle of the locker bank); and/or (5) a size of the parcel. In various embodiments, the system may, when determining whether the locker bank is an appropriate alternate delivery location: (1)

determine whether there are (or are predicted to be) any available lockers in which to store the parcel upon delivery to the locker bank; (2) determine the size of any available lockers within the locker bank; (3) determine a size of the parcel; and (4) determine whether any available lockers are sufficiently sized (e.g., sufficiently large) to physically accommodate the parcel (e.g., securely store the parcel within the locker while the locker's door is closed and locked). In particular embodiments, the system may be configured to track locker availability at a particular locker bank (e.g., in real time or in substantially real time) in order to determine locker availability at a time when a particular parcel is predicted to be delivered to the particular locker bank. In other embodiments, the system is configured to receive input from a delivery driver regarding a current availability of lockers at a particular locker bank, which the delivery driver may have gleaned, for example, while making prior deliveries to or pickups from the particular locker bank (e.g., on a previous day).

The system may, in various embodiments, store, in memory, size (e.g., dimension) information for each particular locker at a particular locker bank. In particular embodiments, the system is configured to receive parcel size information for a particular parcel from a shipper of the particular parcel (e.g., from a retailer that is shipping the parcel to an intended parcel recipient), a carrier computer system, a computer associated with a consignee, and/or from a computer associated with a third party, such as a customs agency.

In certain embodiments, the system is configured to receive parcel measurements taken during handling of the parcel by a carrier. For example, the carrier may measure the parcel during any suitable phase of shipping using any suitable measurement technique. Such techniques may include, for example, manually measuring the parcel (e.g., by the delivery driver following an unsuccessful delivery attempt), using a light curtain to measure the parcel, taking an image of the parcel and using a suitable computer algorithm to estimate the size of the parcel from the image, or using any other suitable automated measuring device to measure the parcel's dimensions.

In particular embodiments, the system is configured to predict a size of a particular parcel based in part on historical shipping data. Such data, may include, for example, information regarding the typical size of parcels handled by a carrier in a particular shipping lane. As a particular example, the data may include information related to an average or otherwise typical size of parcels shipped: (1) from a particular shipper (e.g., a particular retail store, e-commerce site, etc.) to a particular destination (e.g., city, state, individual, distribution center, etc.); (2) from a particular shipper (e.g., a particular retail store, e-commerce site, etc.) within a particular shipping lane; (3) from a first particular geographic region to a second particular geographic region; and/or (3) from any particular shipper, type of shipper, or geographic location to a particular consignee, type of consignee, or geographic location.

As a particular example, a particular company may sell coffee over the Internet. In this example, the company may typically sell five pounds of coffee per order and ship each order for five pounds of coffee in substantially similar one foot square boxes. When determining a suitable alternate delivery location for parcels shipped by the particular company, the system may be configured to predict that the parcel is of the typical size shipped by the particular company (e.g., one foot square).

In another example, an e-commerce website may offer a wide variety of items for sale and ship those items in parcels of varying sizes. In particular embodiments, the system is configured to determine a typical (e.g., average, mean) parcel size for parcels shipped by the e-commerce site and predict that a parcel shipped by the site will be of that typical size. Similarly, the system may be configured to determine a typical parcel size for parcels shipped within a particular shipping lane and predict that a parcel shipped within the particular shipping lane will be of that typical size. In various embodiments, the system may determine an average size for parcels shipped from the e-commerce site to a particular place. For example, parcels shipped from the e-commerce site to a first city may have a first average size that differs from a second average size of parcels shipped from the e-commerce site to a second city. In this example, the system may be configured to predict a size of a parcel shipped from the e-commerce site to the first city based on the first average size and predict a size of a parcel shipped from the e-commerce site to the second city based at least in part on the second average size.

In yet another example, a carrier who moves millions of packages per day of varying sizes and weight from many physical points to other physical points can use advanced data analytics and big data storage (e.g., cloud computing) to examine and understand delivery patterns and package parameters enabling the carrier to predict with high confidence the size, shape and weight of parcels designated to be moved to alternate delivery locations.

B. Receipt of Delivery Driver Override of System-Determined Suitable Locker Bank In various embodiments, the system is configured to enable a delivery driver to override a selection of a particular locker bank by the system for redirection of the parcel. The driver may, for example, determine that the parcel would not fit in any of the lockers at the particular locker bank, for example, because the driver is familiar with the particular locker bank from having made deliveries there previously. The system may be further configured to enable the driver to provide the system with alternate instructions regarding the parcel such as, for example: (1) re-attempting delivery of the parcel at a later time; (2) redirecting the parcel to a different alternate delivery location (e.g., such as a different locker bank, a staffed alternate delivery location, etc.); and/or (3) take any other suitable action for the parcel.

IV. Facilitation of Delivery of the Parcel to the Determined Suitable Locker Bank Continuing with FIG. 3, the system continues, at Step 340, by facilitating delivery of the parcel to the appropriate locker bank location determined at Step 330. In particular embodiments, redirecting the parcel to the appropriate locker bank location comprises substantially automatically (e.g., automatically) reserving space at that locker bank location for the parcel (e.g., to ensure that there will be room and/or capacity for the parcel once the parcel arrives at the alternate delivery location). For example, the system may be configured to substantially automatically reserve a locker for the parcel within a particular locker bank. In still other embodiments, the system is configured to facilitate delivery of the parcel to the smallest locker at the locker bank that is sufficiently sized (e.g., is sufficiently wide, tall, and deep) to accommodate the parcel.

In various embodiments, directing the parcel to the locker bank location further comprises delivering the parcel to the locker bank location and confirming that the parcel has been deposited into a locker at the locker bank location. In various embodiments, confirming that the parcel has been deposited at the locker bank may include receiving an indication from the locker banks computer indicating that the parcel has been successfully deposited in one of the locker banks lockers. In various embodiments, in response to receiving this indication, the system is configured to associate the parcel with that locker location or particular locker (e.g., for the purposes of tracking the parcel, notifying the intended parcel recipient of the location of the parcel, etc.). In other embodiments, the system is configured to confirm delivery of a parcel at an alternate delivery location using any other suitable technique (e.g., GPS tracking, geocoding, etc.).

In various embodiments, when a locker is used as an alternate delivery location, the delivery driver or other individual may use a portable electronic device (e.g., a handheld computing device) to save the location of the locker and the particular locker in which the parcel is stored for later use by the system. In particular embodiments, the system is configured to notify the parcel recipient that the parcel has been delivered to the alternate delivery location (e.g., via e-mail, SMS, text message, or any other suitable method of communication). The system may further provide a particular locker number to the consignee in which the consignee's one or more parcels are stored.

In various embodiments, the system may be configured to facilitate delivery of a plurality of parcels to a particular locker bank and storage of each individual parcel in a separate locker. In other embodiments, the system is configured to facilitate delivery of a plurality of parcels having two or more intended recipients to a particular locker bank and further facilitate placement of each of the plurality of parcels having the same intended recipient into a particular locker. For example, following an unsuccessful delivery of three parcels to a particular address that is shared by two roommates, the systems may facilitate delivery of those parcels to a suitable locker bank. If one of the three parcels is addressed to a first roommate, and two of the three parcels are addressed to a second roommate, the system may be configured to facilitate placement of the parcel addressed to the first roommate in a first locker and the parcels addressed to the second roommate in a second locker. In such an embodiment, when the first roommate comes to the locker bank to retrieve their parcel, the system may be configured to only release the particular parcel addressed to the first roommate. As will be understood more fully in the context of the Consignee Parcel Release Module described below, the system may be configured to generate separate PIN numbers for parcels having different consignees, even where those consignees share a primary address and even when those parcels were directed to a locker bank following an unsuccessful delivery attempt to the same address on the same day.

In particular embodiments, the system is configured to manage redirection of parcels to an alternate delivery location (e.g., such as a suitable locker bank) where the parcels are intended for delivery to a delivery group. In various embodiments, delivery groups may be, for example, groups of businesses or individuals that agree to accept deliveries at a designated common location. In various embodiments, once a delivery group is created, the computer system (which may, for example, be implemented by a logistics company or retailer) is adapted to automatically coordinate the delivery of one or more parcels to a common location and to coordinate pickup of the one or more parcels by any member of the group at the designated common location. In situations in which delivery of one or more parcels to the designated common location is not possible, the system may be configured to redirect the one or more parcels to a suitable locker bank and facilitate storage of parcels intended for different recipients in different lockers. Systems and methods related to implementation of delivery groups are described more fully in U.S. Provisional Application No. 61/793,307, filed Mar. 15, 2013, by United Parcel Service of America, Inc., and entitled: "Group Delivery Systems and Related Methods," which is hereby incorporated herein by reference.

B. Delivery Driver Locker Bank Management Module

Various embodiments of a system of delivery one or more parcels to alternate delivery location may further include systems for managing the placement of parcels in and retrieval of parcels from particular lockers in a particular locker bank, for example, by representatives of carriers such as delivery drivers, employees at staffed locker banks, etc. Various aspects of the system's functionality may be executed by certain system modules, including a Delivery Driver Locker Bank Management Module 400. This module is discussed in greater detail below. It should be understood that, while this module is described within the context of interaction with a delivery driver, the module may similarly interact with any other suitable user.

1. Receipt of Request to Access a Locker

When executing the Delivery Driver Locker Bank Management Module 400, the system begins, at Step 410, by receiving a request, from a delivery driver (other representative associated with a carrier), to access the locker bank. In various embodiments, the request to access the locker bank may include an access of a locker bank computer by the delivery driver. The delivery driver may, for example, access the locker bank computer by logging into the locker bank computer using credentials provided by a carrier. In other embodiments, the system is configured to receive the request in response to receiving a scan of a machine-readable indicia associated with the delivery driver (e.g., a machine-readable indicia located on an identification card associated with the delivery driver, located on a hand-held computing device associated with the delivery driver such as a DIAD, etc.). In other embodiments, the system may receive the request in any other suitable manner such as, for example, in response to input on a touchscreen, wireless, NFC, Bluetooth, iBeacons, etc. associated with the locker bank computer.

II. Enabling the Delivery Driver to Deliver or Pick Up One or More Parcels to or from the Locker Bank Continuing at Step 420, the system, at least partially in response to receiving the request, enables the delivery driver to select to: (1) deliver one or more parcels to the locker bank; and/or (2) pick up one or more parcels from the delivery bank. In various embodiments, the system enables the delivery driver to make the selection via the locker bank computer. In other embodiments, the system enables the delivery driver to make the selection in any other suitable manner, such as via a mobile computing device associated with the delivery driver. In particular embodiments, in addition to enabling the delivery driver to make the selection, the system is configured to display suitable information associated with the locker bank to the delivery driver, such as, for example, a number of available lockers (e.g., a particular number of available lockers or any particular size), or any other suitable information associated with the locker bank.

In particular embodiments, the system is configured to enable the delivery driver to deliver or pickup one or more parcels from the locker bank in any particular order. For example, in various embodiments, a delivery driver may need to pick up a particular number of parcels from the locker bank and deliver a particular number of parcels to the locker bank. The parcels for pickup may include, for example, one or more parcels that have "aged out" (e.g., one or more parcels that have been stored at the locker bank past a pickup deadline for the one or more parcels), one or more parcels that have been requested by a consignee to be delivered to a different location, etc. The delivery driver may, for example, elect to pick up any parcels from the locker bank before placing newly delivered parcels into the locker bank, so that there will be enough available lockers in which to place the newly delivered parcels. In various embodiments, the system is determined to receive input from the delivery driver of a number of parcels that the delivery driver is delivering to the locker bank, as well as information associated with a number of parcels that need to be picked up from the locker bank. The system may then determine whether the delivery driver should deliver the parcels first or pick up the parcels first and provide instructions to the delivery driver accordingly.

A. Delivery Driver Parcel Delivery Facilitation

In particular embodiments, the system is configured to enable the delivery driver to deliver one or more parcels to the locker bank, for example, by facilitating placement of the one or more parcels into one or more particular lockers within the locker bank. The system may, for example, at Step 430, receive a request to deliver one or more parcels to the locker bank. In various embodiments, the system is configured to receive the request in response to selection of an indicia on a locker bank computer touchscreen, pressing of a delivery button on the locker bank computer, or in any other suitable manner.

In particular embodiments, the request from a delivery driver may be initiated by the delivery driver entering at least a portion of a tracking number (e.g., 1Z number) that is associated with the one or more parcels into a computer associated with the locker bank. The delivery driver may, for example, enter the at least a portion of the tracking number on a suitable alphanumeric entry device associated with the locker bank computer (e.g., such as a keyboard, touchscreen, etc.). In various embodiments, the at least a portion of the tracking number may include any suitable portion of the tracking number. For example, the suitable portion of the tracking number may include: (1) the first or last three digits and/or letters of the tracking number; (2) the first or last four digits and/or letters of the tracking number; (3) the first or last five digits and/or letters of the tracking number; (4) the first or last six digits and/or letters of the tracking number; and/or (5) any suitable number of letters or digits that make up any suitable portion of the tracking number (e.g., first three and last three, etc.).

In other embodiments, the system is configured to receive the request to deliver the one or more parcels to the locker bank at least partially in response to receiving input of a machine-readable indicia, which may, for example, be printed on the one or more parcels and associated with tracking information for the one or more parcels. In various embodiments, the locker bank computer may comprise one or more machine-readable indicia scanners (e.g., such as a barcode scanner) configured to enable the delivery driver (e.g., or another individual) to scan a machine-readable indicia on a particular parcel (e.g., affixed to the particular parcel, printed on the particular parcel, etc.). In particular embodiments, the system may retrieve information associated with the machine-readable information, such as, for example, tracking information for the particular parcel. In particular embodiments, the system is configured to interpret a scanning of a machine-readable indicia associated with a particular parcel as a request to deliver that particular parcel to the locker bank.

Figure 4:
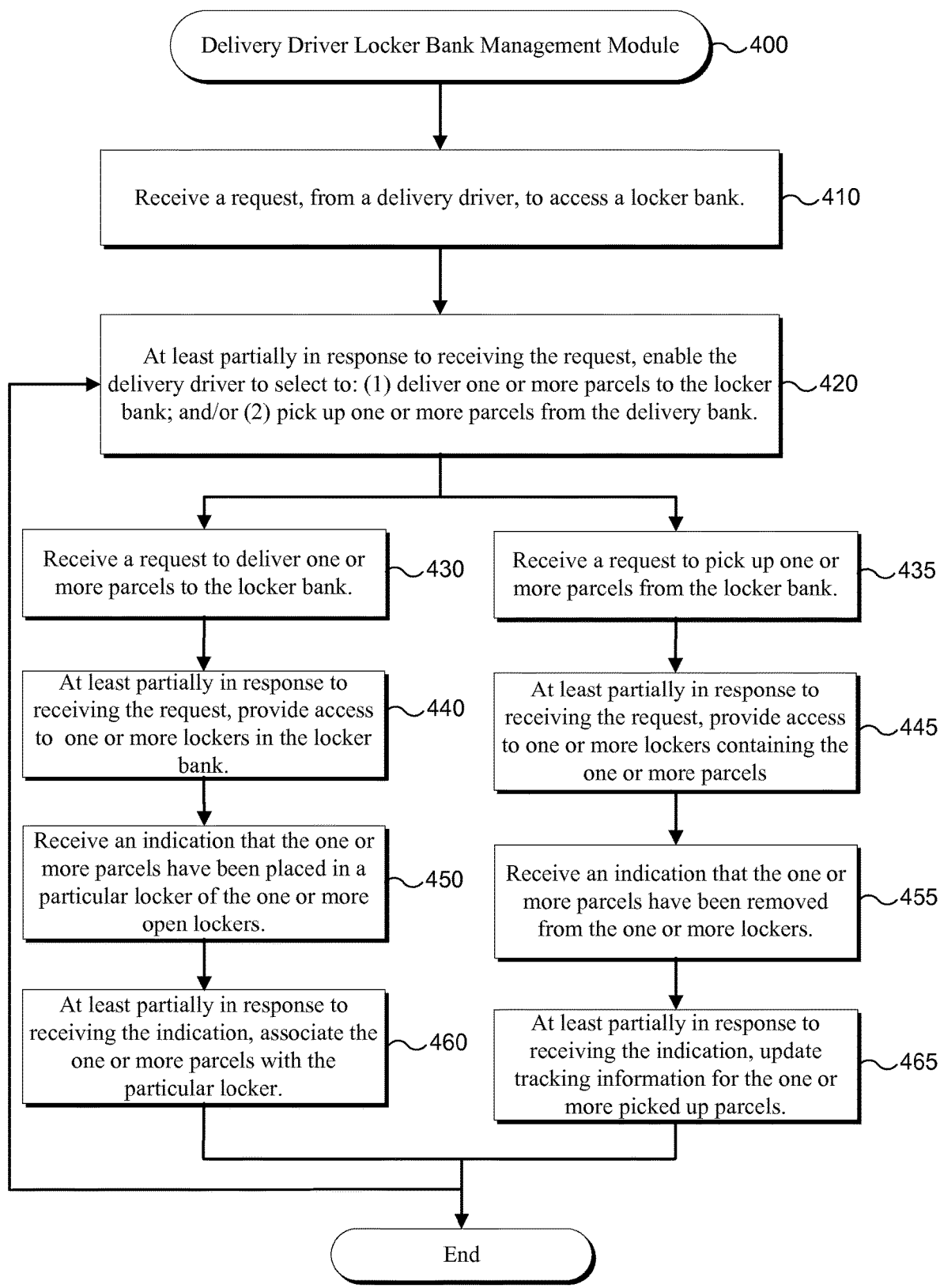
FIG. 4 depicts a flow chart that generally illustrates various steps executed by a Delivery Driver Locker Bank Management Module that, for example, may be executed by the logistics server of FIG. 1.

Returning to FIG. 4, the system continues, at Step 440, by at least partially in response to receiving the request to deliver the one or more parcels to the locker bank, providing access to one or more lockers in the locker bank to the delivery driver. In various embodiments, the locker bank computer is configured to control access to each particular locker in the locker bank, for example, via one or more locking mechanisms associated with each particular locker. In particular embodiments, the system is configured to provide access to the one or more lockers in the locker bank by unlocking each locking mechanism associated with the one or more lockers. In various embodiments, each locker may be equipped with one or more indicators (e.g., one or more indicators for each particular locker) that are configured to indicate when a particular locker in the locker bank is unlocked. For example, each particular locker may have an associated indicator light adjacent the particular locker that the system is configured to turn on when the locker is unlocked.

In still other embodiments, the system is configured to at least partially open the one or more lockers to which the system is providing access, for example, in order to facilitate placement, by the delivery driver, of the one or more parcels in the one or more lockers. In particular embodiments, the one or more lockers are one or more lockers of varying sizes from which the delivery driver may select for the one or more parcels. In a particular embodiment, the system is configured to open three lockers whereby: (1) the first locker is a small sized locker; (2) the second locker is a medium sized locker; and (3) the third locker is a large sized locker. In various embodiments, the medium sized locker may include any locker that is relatively larger than the small sized locker and relatively smaller that the large sized locker. In particular embodiments, a small sized locker may be sized to snuggly fit a parcel that is substantially the same size as a shoebox.

Continuing at Step 450, the system receives an indication that the one or more parcels have been placed in a particular locker of the one or more open lockers. In various embodiments, the system is configured to receive the indication at least partially in response to the delivery driver closing the locker (e.g., after placing the one or more parcels in the locker). In other embodiments, the system is configured to receive the indication from the delivery driver (e.g., via a suitable input device associated with the locker bank computer). Each locker in the locker bank, may, for example, have a unique identifier (e.g., an identifier that corresponds to a column and row in which the locker is located, a unique alphanumeric identifier, etc.). The system may then be configured to receive input of the unique identifier associated with the particular locker in which the delivery driver placed the one or more parcels.

In various embodiments, the system may be configured to receive the indication that the one or more parcels have been placed in a particular locker at least partially in response to one or more sensor readings. In particular embodiments, each particular locker in a locker bank may be equipped with one or more sensors configured to determine whether one or more parcels have been placed within the particular locker. For example, in various embodiments, each particular locker in a locker bank may include one or more weight sensors (e.g., one or more scales), one or more pressure sensors (e.g., one or more piezoelectric sensors), one or more infrared sensors, or any other suitable sensor configured to determine that one or more parcels are substantially currently present within a particular locker.

In particular embodiments, such as embodiments in which the system is configured to substantially automatically determine that the one or more parcels have been placed in a particular locker, the system is configured to prompt the delivery driver to confirm that the delivery driver in fact placed the one or more parcels in the particular locker. The system may, for example, at least partially in response to determining that the one or more parcels have been placed in a particular locker (e.g., Locker 2B) based on determining that the door to the particular locker has been closed, prompt the delivery driver to confirm that the delivery driver had placed the one or more parcels in that particular locker. In various embodiments, the system may display a message (e.g., on a display screen associated with the locker bank computer) stating that the one or more parcels have been placed in the particular locker and request that the delivery driver select among: (1) confirming the veracity of the system determined placement; (2) overriding the system-determined placement and providing the proper locker identification manually; and (3) restarting the delivery process and re-attempting to deliver the one or more parcels to a particular locker.

Continuing at Step 460, the system, at least partially in response to receiving the indication at Step 450, associates the one or more parcels with the particular locker. In various embodiments, the system may update tracking information associated with the one or more parcels to indicate the location of the locker bank and an identification of the particular locker in which the one or more parcels are stored.

B. Delivery Driver Parcel Pickup Facilitation

In particular embodiments, the system is configured to enable the delivery driver to pick up one or more parcels from the locker bank. The system may do this, for example, by notifying the delivery driver of one or more parcels available for pickup from the locker bank and providing access to the particular lockers in which the one or more parcels are available for pickup to the delivery driver. The system may begin this process, for example, at Step 435, where it receives a request to pick up one or more parcels from the locker bank. In various embodiments, the system may receive this request from the delivery driver in response to notifying the delivery driver that one or more parcels are available for pickup from the locker bank. The one or more parcels available for pickup may, for example, include: (1) one or more parcels that the consignee has requested the carrier deliver to a different location (e.g., a residential location, a different locker bank, a different alternate delivery location, etc.); (2) one or more parcels that have been stored at the locker bank for longer than a predetermined length of time (e.g., one week, five days, etc.); or (3) any other parcel that may require pick up for any other suitable reason.

In particular embodiments, the system is configured to receive the request following delivery, by the delivery driver, of one or more parcels to one or more particular lockers within the locker bank. In other embodiments, the system may receive the request to pick up one or more parcels prior to delivery of any parcels, by the delivery driver, to the locker bank. In still other embodiments, the system may receive the request to pick up one or more parcels from a delivery driver while the delivery driver is in the midst of delivering one or more parcels to the locker bank (e.g., after the delivery driver has delivered at least some of the one or more parcels the delivery driver needs to deliver to the locker bank, but before the delivery driver has delivered all of the parcels). As a particular example, the delivery driver may deliver a portion of the one or more parcels the delivery driver needs to deliver to the locker bank before picking up one or more parcels from the locker bank to make room for one or more additional parcels that the delivery driver needs to deliver.

Continuing at Step 445, the system, at least partially in response to receiving the request, provides access to one or more particular lockers containing the one or more parcels for pick up. In particular embodiments, the locker bank computer is configured to control access to each particular locker in the locker bank, for example, via one or more locking mechanisms associated with each particular locker. In particular embodiments, the system is configured to provide access to the one or more particular lockers that contain the one or more parcels for pickup in the locker bank by unlocking each locking mechanism associated with the one or more particular lockers. In various embodiments, the locker may be equipped with one or more indicators (e.g., one or more indicators for each particular locker) that are configured to indicate when a particular locker in the locker bank is unlocked and contains one or more parcels for pickup. For example, each particular locker may have an associated indicator light adjacent the particular locker that the system is configured to turn on when the locker is unlocked to enable the delivery driver to retrieve the one or more parcels for pickup within. In still other embodiments, the system is configured to at least partially open the one or more lockers to which the system is providing access, for example, in order to facilitate retrieval, by the delivery driver, of the one or more parcels for pickup in the one or more particular lockers.

Continuing at Step 455, the system is configured to receive an indication that the one or more parcels have been removed from the one or more lockers. In various embodiments, the system receives the indication at least partially in response to closing, by the delivery driver, of the one or more lockers to which the system had provided access at Step 445 (e.g., following removal of the one or more parcels for pickup from the one or more particular lockers by the delivery driver). In other embodiments, the system is configured to receive an indication from the delivery driver that the delivery driver has completed his or her pickup of the one or more parcels for pickup from the one or more particular lockers. For example, the delivery driver may select an indicia on a touchscreen associated with the locker bank computer that indicates the completion. In still other embodiments, the system may determine that the delivery driver has completed his or her pickup of the one or more parcels for pickup in any other suitable manner.

Next, at Step 465, at least partially in response to receiving the indication at Step 455, the system updates tracking information for the one or more picked up parcels. In various embodiments, updating the tracking information may include updating the tracking information for a particular parcel to: (1) indicate that the parcel is being returned to a sender of the particular parcel; (2) otherwise indicate that the parcel is en route to a location to which a consignee has requested the particular parcel be redirected; and/or (3) indicate any other substantially current tracking status of the particular parcel.

In various embodiments, the system is configured to allow the delivery driver to select to deliver or pickup one or more parcels during a particular visit to a locker bank in any suitable order. In various embodiments, the system is configured to instruct the delivery driver as to an order in which to deliver and/or pickup parcels (e.g., based at least in part on a number of parcels for pickup and a number of parcels the delivery driver needs to deliver to the locker bank). In other embodiments, the system is configured to enable the delivery driver to select to deliver one or more parcels prior to picking up any parcels for pickup, to pick up any parcels for pickup prior to delivering any of the one or more parcels to the locker bank, and/or alternate delivery and pickup parcels to/from the locker bank in any suitable order.

C. Consignee Parcel Release Module

Various embodiments of a system for delivering one or more parcels to one or more locker bank locations may further include systems for releasing parcels delivered to the one or more locker bank locations to consignees. In particular, such systems may include systems for releasing parcels delivered to attended or unattended lockers such as those discussed above. Such systems may be configured for releasing items (e.g., parcels) to either subscribed consignees (e.g., known to the carrier through enrollment in a consignee program such as a UPS' MyChoice service) or unsubscribed consignees (e.g., consignees who have not signed up for a consignee account with a carrier, or otherwise unknown to the carrier). Various aspects of the system's functionality may be executed by certain system modules, including a Consignee Parcel Release Module 500. This module is discussed in greater detail below.

I. Receipt of Request from Individual to Retrieve One or More Parcels from the Locker Bank When executing the Consignee Parcel Release Module 500, the system begins, at Step 510, by receiving a request from an individual (e.g., the consignee of one or more parcels) to retrieve the one or more parcels from a locker bank. In various embodiments, the consignee may be aware that one or more parcels belonging to them are currently being stored at the locker bank based on: (1) one or more info notices left at their place of residence indicating that the one or more parcels have been redirected to the locker bank; (2) tracking information associated with the one or more parcels; (3) one or more notifications from a consignee program in which they are enrolled; and/or (4) any other suitable mechanism for informing an individual, consignee, shipper, or third party of a delivery. The system may receive the request to retrieve the one or more parcels, for example, when the system receives a code or other suitable identifier from either a "subscribed" or an "unsubscribed" consignee. Unsubscribed consignees may be "unknown" to the carrier in that the carrier does not have detailed information (e.g., contact and/or address information) for the consignee. In particular embodiments, a consignee may receive a notice (e.g., an Information Notice) from a carrier informing the consignee that an unsuccessful parcel delivery attempt has been made to the consignee's residence or other primary delivery address. The notice (e.g., Information Notice) may comprise, for example: (1) a slip of paper, cardboard, plastic, and/or electronic device left at the consignee's physical address (e.g., the delivery address of the package); (2) a message to a mobile computing device or account associated with the consignee; and/or (3) any other suitable form of notice (e.g., live voice call, automated call, text, picture, video, e-mail, emoji's, automated assistant message (e.g., from Apple's Siri)).

In particular embodiments, the notice may include a parcel identifier (e.g., a tracking number such as a 1Z number, and/or other suitable parcel identifier) for the consignee to provide at a locker bank in order to access the one or more parcels. In other embodiments, the parcel identifier may be associated with a tracking number for the parcel. In particular embodiments, the parcel identifier (or the tracking number with which is it associated) may be associated with Package Level Detail (PLD) information associated with the parcel (e.g., a name of the consignee, delivery address, name of shipper, package weight, dimensions, etc.) and/or tracking information indicating status of package disposition and/or physical location. In particular embodiments, the Information Notice may comprise one or more machine-readable indicia (e.g., such as a linear barcode, QR code, or other suitable indicia), which may be associated with tracking information for the parcel.

In particular embodiments, the system is configured to provide the parcel identifier to the consignee in any other suitable manner other than via a notice left at the primary delivery location. For example, the system may be configured to enable the consignee to retrieve the parcel identifier by: (1) retrieving the parcel identifier from a web site or mobile application associated with the carrier that is delivering the parcel (e.g., using a tracking number associated with the parcel); (2) retrieving the parcel identifier from a retailer or other person/entity that shipped the parcel (e.g., via suitable web site); and/or (3) retrieve the parcel identifier from any other suitable source.

In particular embodiments, the system is configured to receive the request to retrieve the one or more parcels from the locker bank at least partially in response to the consignee (e.g., or an authorized person associated with the consignee who has gone to the locker to retrieve the one or more parcels on behalf of the consignee) scanning a machine-readable indicia (e.g., a barcode, or other suitable indicia) provided to the consignee as part of the notice of the unsuccessful delivery attempt.

In other embodiments, the system may receive the request in response to input (e.g., by the consignee or another on behalf of the consignee) of the parcel identifier via a suitable input device at the locker bank. In particular embodiments, the system is configured to receive the request in response to input (e.g., by the consignee or another on behalf of the consignee) of any suitable portion of the parcel identifier such as, for example: (1) the first or last three digits and/or letters of the parcel identifier; (2) the first or last four digits and/or letters of the parcel identifier; (3) the first or last five digits and/or letters of the parcel identifier; (4) the first or last six digits and/or letters of the parcel identifier; and/or (5) any suitable number of letters or digits that make up any suitable portion of the parcel identifier (e.g., first three and last three, etc.) that may enable the system to identify the parcel based on the at least a portion of the parcel identifier entered by the consignee or another on behalf of the consignee.

In particular embodiments, the system is configured to receive the request in response to input, by the consignee or another on behalf of the consignee, of an original delivery address of the one or more parcels. For example, following an unsuccessful delivery attempt to a consignee's home address, a carrier may provide instructions to the consignee that one or more parcels are being stored in a locker at a particular locker bank for their retrieval. At the locker bank, the consignee may provide their home address in order to request any parcels that may have been stored at the locker bank in one or more lockers following an unsuccessful delivery attempt to that home address.

In various embodiments, the system may be configured to receive the request based at least in part on one or more communications with a mobile computing device, home security system, home Wi-Fi system and/or vehicle communication system associated with the consignee. For example, the system may be configured to communicate (e.g., via Bluetooth, Low Energy Bluetooth (LEB), Near-Field Communication (NFC), WI-FI, iBeacon, etc.) with the consignee's mobile computing device when the consignee is at the locker bank or other alternate delivery location to retrieve the parcel. The consignee may, for example, send the request using an application on the consignee's mobile computing device. In other embodiments, the system may receive the request by receiving a confirmation that the consignee is physically present at the locker bank (e.g., by comparing a GPS location of the consignee determined from a GPS location of the consignee's mobile computing device with a GPS location of the locker bank).

In particular embodiments, the system is configured to receive the request to retrieve the one or more parcels at least partially in response to the consignee logging into a consignee account associated with a carrier. The system may, for example, interpret the consignee logging into their consignee account at a locker bank computer, or on a mobile computing device associated with the consignee while the consignee is physically present at the locker bank, as a request to retrieve any parcels associated with the consignee that are currently stored at the locker bank.

II. Confirmation of Identity of Individual Requesting Retrieval of Parcel

Returning to Step 420, the system continues by, at least partially in response to receiving the request, confirming an identity of the individual making the request. In various embodiments, the system is configured to confirm the identity of the individual based, at least in part, on any suitable information such as, for example, information determined from an identification card associated with the individual or a telephone number provided by the individual. In various embodiments, the system may confirm the individual's identity substantially automatically based on the nature of the request received at Step 510 (e.g., because the request came from a consignee account). These various manners of confirming an individual's identity are discussed in greater detail below.

A. Identity Confirmation Based on an Identification Card

In particular embodiments, the system is configured to confirm the identity of the individual as a "subscribed" or "unsubscribed" (e.g., individual who hasn't previously signed up for an account with a particular delivery service) consignee, shipper or third party requesting retrieval of the one or more parcels based at least in part on an identification card associated with the individual (e.g., a government-issued identification card such as a passport or driver's license, a credit card, etc.). In various embodiments, the system is configured to: (1) receive input of the identification card from the individual; (2) confirm an authenticity of the identification card; (3) at least partially in response to confirming the authenticity of the identification card, obtain one or more pieces of identifying information from the identification card; (4) retrieve one or more pieces of PLD information associated with the one or more parcels and/or other information; (5) compare the one or more pieces of identifying information with the one or more pieces of PLD information; (6) determine a number of the one or more pieces of identifying information that at least partially match the one or more pieces of PLD information; (7) at least partially in response to determining that at least a threshold number of the one or more pieces of identifying information at least partially match the one or more pieces of PLD information, confirm the identity of the individual.

The system may receive input of the identification card, for example, by: (1) receiving an image of the consignee's identification card (e.g., using any suitable imaging device); (2) receiving a confirmation that the consignee has scanned their identification card using any suitable card reader (e.g., a barcode scanner, magnetic reading head, camera etc.); and/or (3) in any other suitable manner (e.g., electronic transfer from a computing device).

In particular embodiments, the system is further configured to confirm an authenticity of the identification card. In various embodiments, the system may be configured to identify one or more authenticating marks on the identification card (e.g., security features such as one or more holograms, one or more ultraviolet ink printed features, etc.). In particular embodiments, the system is configured to confirm the authenticity of the identification card based at least in part on the type of identification card (e.g., the state that issued the identification card, etc.). In various embodiments, the system is configured to identify one or more known security features on the identification card or other form of identification in order to confirm the authenticity of the card.

In particular embodiments, the system is configured to determine, based at least in part on information gathered from the identification card, at least one or more of the following pieces of identifying information: (1) a first name and/or middle name of the person requesting retrieval of the one or more parcels; (2) a last name and/or suffix (e.g., Jr., Sr., III, IV, etc.) of the person requesting retrieval of the one or more parcels; (3) a zip code of the person requesting retrieval of the one or more parcels; (4) a house number of the person requesting retrieval of the one or more parcels; (5) a street name of the person requesting retrieval of the one or more parcels; (6) a city of residence of the person requesting retrieval of the one or more parcels; (7) a state of residence of the person requesting retrieval of the one or more parcels; (8) a driver's license number of the person requesting retrieval of the one or more parcels; (9) a date of birth of the person requesting retrieval of the one or more parcels; (10) a height of the person requesting retrieval of the one or more parcels; (11) an approximate weight of the person requesting retrieval of the one or more parcels; (12) an eye color of the person requesting retrieval of the one or more parcels; (13) a gender of the person requesting retrieval of the one or more parcels; (14) a hair color of the person requesting retrieval of the one or more parcels; and/or (15) any other suitable identifying information that the system may determine from the identification card. The system may determine this identifying information from the identification card in any suitable manner such as, for example, using one or more Optical Character Recognition (OCR) techniques, magnetic strip reading techniques, or other card reading techniques to read and confirm the consignee's name, address, and/or any other identifying information that may be contained on the identification card.

In particular embodiments, the system may then confirm the identity of the person requesting retrieval of the one or more parcels by comparing any suitable combination of the above identifying information with known information associated with the one or more parcels that the person has requested retrieval of. The system may for, for example, retrieve Package Level Detail (PLD) information associated with the one or more parcels (e.g., a name of the consignee including first name, last name, middle name, and suffix; a delivery address including house number, street name, zip code, state, etc.; a name of the shipper; a parcel weight; and/or one or more parcel dimensions).

In particular embodiments, the system may confirm the identity of the person requesting retrieval of the parcel based at least in part on matching at least a particular number of the pieces of identifying information described above with the respective PLD information associated with the one or more parcels. For example, the system may confirm an identity in response to determining that the identifying information matches at least three pieces of PLD information (e.g., street name, zip code, and last name) In various embodiments, the system is configured to confirm the individual's identity in response to determining that any suitable number of pieces of information among the identifying information and PLD information at least substantially match (e.g., two corresponding pieces of information, three corresponding pieces of information, four corresponding pieces of information, five corresponding pieces of information, six corresponding pieces of information, seven corresponding pieces of information, etc.).

In particular embodiments, when comparing PLD information and identifying information, the system is configured to determine matches that are not completely identical in order to confirm a person's identity. For example, the system, in various embodiments, is configured to match PLD information with identifying information based at least in part on one or more phonetic matches. For example, a parcel may be addressed to 'Stephen' and the system may determine from a person's identification card that their name is 'Steven'. In this example, the system may be configured to determine that the PLD information for the first name matches the identifying information for first name despite the difference in spelling. The system may make this determination based at least in part on 'Stephen' being at least phonetically similar to (e.g., phonetically the same as) 'Steven'. The system may make this determination by, for example, accessing a database of phonetic equivalents of common names. The system may also use similar techniques to properly identify individuals who have hyphenated last names.

In other embodiments, the system may be configured to confirm an identity of an individual based, at least in part, on matching one or more misspelled pieces of information determined from an identification card or from PLD information. For example, a parcel may be misaddressed to '101 Peechtree Street' rather than '101 Peachtree Street'. In such an instance, the system may be configured to confirm a match of PLD information for street name with identifying information for street name determined from a person's identification card despite the misspelling. The system may do this, for example, by using any suitable spell checking software to identify spelling errors in the PLD information and then using the software to autocorrect the misspelling of the word before the comparing the word with its counterpart from the individual's identification card.

In another particular example, the system may determine, from an identification card of a an individual attempting to retrieve a parcel addressed to Allan Jones, that the individual has a first name of Christopher, a middle name of Allan, and a last name of Jones. In such an example, the system may determine that the PLD information for name matches the identifying information for name because the system, in various embodiments, is configured to match any portion of the person's name (e.g., because some people may go by their legal middle name so that parcel's addressed to them may list only their middle name and not their first name) In still other embodiments, the system may be configured to determine that a first name is a match for a second name based at least in part on the second name being a nickname or abbreviated version of the first name (e.g., such as in the case of Steven and Steve, Christopher and Chris, Elizabeth and Liz, Jacob and Jake, etc.).

In a particular example, a parcel addressed to Susan Smith may have been delivered to a locker bank following an unsuccessful delivery attempt to 123 Sunrise Lane, Atlanta, Ga., 30309. In this example, when Susan Smith arrives at the locker bank to retrieve her parcel, she would need to insert an identification card (e.g., her driver's license) so that the system can confirm her identity before releasing the parcel to her. The system may determine, from Susan's driver's license, that her first name is Susan, her last name is Smith, her house number is 123, her street name is Sunrise Lane, her city of residence is Atlanta, her state of residence is Georgia, and her zip code is 30309. In this example, Susan's identifying information matches at least seven corresponding pieces of PLD information, so the system would confirm Susan's identity and release the parcel to her.

In an alternate example involving Susan Smith's parcel above, Susan may ask her husband Gary to retrieve the parcel for her from the locker bank. In this example, when Gary Smith arrived at the locker bank to retrieve Susan's parcel, he would need to insert an identification card (e.g., his driver's license) so that the system can confirm his identity before releasing the parcel to him. The system may determine, from Gary driver's license, that his first name is Gary, his last name is Smith, his house number is 123, his street name is Sunrise Lane, his city of residence is Atlanta, his state of residence is Georgia, and his zip code is 30309. In this example, the system would confirm Gary's identity (and ability to retrieve the parcel) based at least in part on Gary's identifying information matching corresponding six pieces of PLD information (last name, house number, street name, city of residence, state of residence, and zip code).

In various embodiments, the system may be configured to confirm the identity of a consignee using an identification card other than a driver's license. For example, in a particular embodiment, the system is configured to confirm the identity of the consignee based at least in part on receiving credit card information associated with a credit card of the consignee. The system may, for example, (1) receive credit card information in response to scanning (e.g., or swiping) of the credit card at a credit card reader associated with the system; (2) determine, based at least in part on the credit card information, a name and/or billing address associated with the credit card; and/or (3) confirm that the credit card information at least partially matches information associated with the consignee or the one or more parcels (e.g., an address, delivery address, etc.). For example, the system may ensure that a billing address associated with a credit card of the consignee is the same as the delivery address of the one or more parcels that the consignee is attempting to retrieve.

In still other embodiments, the system is configured to confirm the identity of the person requesting retrieval of the parcel by comparing identifying information determined from the person's identification card to information other than PLD information (e.g., one or more physical characteristics of the individual as determined by the system). For example, the locker bank may comprise one or more cameras configured to determine a height of the person requesting retrieval of the parcel. In various embodiments, the system may be configured to compare the person's determined height to a height determined from their identification card. In still other embodiments, the locker bank may comprise one or more cameras configured to determine an eye color of the person, a hair color of the person, etc. The system may then compare this determined information with information listed on the person's identification card. In various embodiments, confirming the identity of the person requesting retrieval of the parcel using this additional information may at least partially prevent an unauthorized person from retrieving a parcel using an identification card of another person.

B. Identity Confirmation Based on Telephone Number

In various embodiments, the system is configured to confirm the identity of the consignee based at least in part on receipt, by the system, of a telephone number (e.g., a mobile phone number) associated with the person requesting retrieval of the one or more parcels (e.g., the consignee). The system may, for example, be configured to confirm the person's identity substantially only based on the consignee's mobile telephone number. In various embodiments, confirmation of a consignee based substantially only on a mobile telephone number may enable some consignees who may, for example, not have a government issued or other identification card suitable for use in confirming the consignee's identity to utilize the locker bank to retrieve parcels. In still other embodiments, confirming the consignee's identity based at least in part on their mobile telephone number may enable consignees that arrived at the locker bank without an identification card (e.g., because they misplaced or forgot to bring the identification card to the locker bank) to still retrieve one or more parcels from the locker bank.

The system, in various embodiments, is configured to: (1) receive input of the person's telephone number (e.g., mobile telephone number); (2) determine identifying information associated with the telephone number (e.g., billing address, account holder name, etc.); (3) compare identifying information with PLD information associated with the one or more parcels; (4) at least partially in response to determining that the identifying information at least partially matches the PLD information, provide a PIN number to the person (e.g., via text message, SMS, e-mail, etc.); (5) receive input of the PIN number at the locker bank; and (6) at least partially in response to receiving input of the PIN number, confirm the identity of the person.

The system may, in particular embodiments, receive the telephone number of the consignee in response to input, by the consignee, of the consignee's telephone number into the system (e.g., using a keypad, touchscreen, or other suitable input device at the location of the locker). In various embodiments, the system is configured to determine identifying information associated with the telephone number by, for example, (1) retrieving directory information associated with the telephone number (e.g., an address, name, and/or other suitable directory information); (2) retrieving billing information associated with an account associated with the telephone number (e.g., the holder of a cell phone account associated with the telephone number, billing address, etc.); (3) retrieving identifying information from one or more social network accounts (e.g., Facebook, Twitter, etc.) with which the telephone number is associated (e.g., such as name, city of residence, etc.); and/or (4) using any other suitable technique.

In various embodiments, the system continues by comparing the identifying information with PLD information associated with the one or more parcels. The system may compare this information in any suitable manner, such as in any manner described above with respect to identity confirmation using an identification card.

In various embodiments, when confirming an identity of an individual using a telephone number (such as a cell phone number), at least partially in response to determining that the identifying information at least partially matches the PLD information, the system provides a PIN number to the person. The system may provide the PIN number to the person via, for example, SMS, text message, e-mail, voice message, etc. In a particular embodiment, the system is configured to provide the PIN number to the individual via the mobile phone number provided by the person as part of the identity confirmation process via any suitable message (e.g., text message, SMS, picture message, etc.). The PIN number may, for example, include any suitable combination of characters (e.g., numbers, letters, symbols, etc.) and have any suitable length.

In particular embodiments, the system may be configured to generate the PIN at least partially in response to determining that the identifying information at least partially matches the PLD information. In other embodiments, the system is configured to generate or retrieve the PIN number at any other suitable time. In a particular embodiment, the system is configured to receive the PIN from a separate system before providing it to the individual retrieving the parcel (e.g., a third party system). In various embodiments, the system may receive the PIN from the third party system and then provide the PIN to both the person and a third party associated with the locker bank (e.g., a third party that owns, operates, or otherwise controls the locker bank). In other embodiments, the third party system may provide the PIN to both the person and the third party directly.

In particular embodiments, the system is configured to, after the PIN number is sent to the individual, receive input of the PIN number from the individual to whom the PIN number was provided. In various embodiments, the system is configured to receive the PIN number from the individual via a computer input device associated with the locker bank. In other embodiments, the system is configured to receive the PIN at an input device associated with the particular locker in which the one or more parcels are stored. In other embodiments, the system is configured to receive the PIN number in any other suitable manner, such as, for example, by scanning a machine readable indicia associated with the PIN. In various embodiments, the system is configured to confirm the identity of the person at least partially in response to receiving input of the PIN number.

Although the above process is described above with reference to providing the individual with a PIN number, it should be understood that any other piece of unique identifying information may be used in place of the PIN number. Such unique identifying information may include, for example, a unique bar code, picture, etc.

C. Identity Confirmation Based on Geographic Location History

In various embodiments, the system may be adapted to confirm the identity of an individual based on stored geographic location information for the individual. For example, the system may be adapted to: (1) receive data regarding the various geographic locations that the individual has been in over a particular period of time (e.g., via geographic data obtained by a portable computing device associated with the individual (e.g., the individual's smart phone, a wearable computing device associated with the individual, etc.)); (2) use the data to determine whether the individual regularly frequents the original intended delivery location of the parcel (e.g., the primary delivery location) to be picked up by the individual (e.g., whether the individual visits the original delivery location more than a predetermined number of times every week or month); and (3) in response to determining that the individual regularly frequents the original intended delivery location of the parcel to be picked up, confirming the identity of the individual as an individual who is authorized to pick up the parcel. In particular embodiments, the original delivery location of the parcel may be, for example, the individual's home, place of business, or a locker bank.

D. Identity Confirmation Based on Current Location of Individual

In various embodiments, the system may be adapted to confirm the identity of an individual based, at least in part, on the current location of the individual. For example, in particular embodiments, the system is adapted to confirm, in any suitable way, that the individual is in an expected physical location (e.g., the individual is currently physically adjacent the locker bank in which a particular parcel is stored). At least partially in response to confirming that the individual is in the expected physical location, the system may confirm the identity of the individual as an individual who is authorized to pick up the parcel.

In a particular embodiment, the system may confirm that the individual is in a particular physical location (e.g., adjacent a particular locker bank) by confirming that a mobile computing device (e.g., a smart phone) associated with a particular individual (e.g., the consignee of a parcel, or an individual authorized to retrieve a parcel by the consignee) is in the particular physical location. For example, in order to confirm the identity of a consignee that has arrived at a locker bank to retrieve a parcel, the system may obtain the consignee's mobile phone number (e.g., from the consignee or from an account associated with the consignee), use the mobile phone number to obtain information regarding the current physical location of the mobile phone, compare the current physical location of the mobile phone with a known location of the locker bank (e.g., a location retrieved from the system's memory), and, at least partially in response to determining that the current location of the consignee's mobile phone is adjacent the locker bank, confirming the identity of the individual as the consignee. Alternatively, the particular individual may use an appropriate application (e.g., app) on their mobile computing device to transmit their current location to the system.

In other embodiments, the system may retrieve the individual's current location from one or more social media sites, such as Facebook or Foursquare. In further embodiments, the system may determine the individual's current location by receiving a local wireless transmission from the individual's mobile computing device (e.g., via near field communication (NFC), Bluetooth, or any other suitable wireless communication protocol).

E. Identity Confirmation Based on Electronic Delivery Notification Device

In various embodiments, the system may be adapted to confirm the identity of an individual by confirming that the individual has, in their possession, an electronic (or non-electronic) delivery notification device that was left at a primary delivery location when a carrier unsuccessfully attempted to deliver a parcel to the primary delivery location. In various embodiments, the electronic delivery notification device may include a screen or other communications mechanism for communicating, to a user, that they have received a parcel and, for example, will need to retrieve the parcel elsewhere (e.g., at a particular locker bank).

The electronic delivery notification device may further include a suitable mechanism for conveying a unique code that may be used to associate the electronic delivery notification device with the particular parcel. In particular embodiments, this unique code is associated with package level detail information for the parcel in the system's memory (e.g., in a suitable database). In various embodiments, the individual may bring the electronic delivery notification device with them to the locker bank storing the parcel when they wish to retrieve the parcel. The system may then confirm that the individual is authorized to retrieve the parcel, at least in part by: (1) receiving the unique code of the electronic delivery notification device (e.g., by electronically reading the code from the surface of the electronic delivery notification device, by receiving a wireless or wired transmission of the code from the electronic delivery notification device, via passive or active RFID technology and/or by any other suitable means); (2) comparing the unique code of the electronic delivery notification device with the unique electronic delivery notification device code that is stored in the system's memory; and (3) at least partially in response to the unique code of the electronic delivery notification device matching the unique electronic delivery notification device code that is stored in the system's memory, confirming the identity of the individual as an individual who is authorized to pick up the parcel.

F. Substantially Automatic Identity Confirmation

In particular embodiments, the system is configured to substantially automatically confirm the identity of the individual requesting retrieval of the one or more parcels (e.g., without requiring the person to provide additional identifying information such as an identification card or telephone number). In particular embodiments, the system is configured to substantially automatically confirm a person's identity based at least in part on receiving the request to retrieve the one or more parcels from a consignee account associated with a carrier, or in response to the system identifying the individual using biometric information, such as the individual's fingerprints, facial structure, or retinal coloration patterns, to identify the individual.

In a particular embodiment, the system is configured to provide a consignee with one or more messages (e.g., e-mails, text messages, etc.) that indicate that a parcel intended for delivery to the consignee has been delivered to a particular locker bank, where the consignee has a consignee account with a carrier handling delivery of the parcel. The one or more messages may include a machine-readable indicia or other code associated with the parcel and the consignee. In response to the consignee (e.g., or another person to whom the consignee has provided the one or more messages) scanning the machine-readable indicia or entering the other code associated with the parcel and the consignee at the locker bank, the system may be configured to substantially automatically confirm the identity of the consignee by virtue of the consignee having the consignee account with the carrier (e.g., because the system may have previously confirmed the consignee's identity as part of the process of opening the consignee account). In certain embodiments, the system is adapted to allow the consignee to forward the one or more messages containing the machine-readable indicia or other code to a friend or relative (e.g., third party or other individual) to enable the friend, relative, or other individual to retrieve the parcel on the consignee's behalf from the locker bank without further authentication.

In other embodiments, the system is configured to confirm the identity of the consignee by receiving input of account information of the consignee. In particular embodiments, the account information may be for an account associated with: (1) the carrier that shipped the one or more parcels; (2) the shipper (e.g., a retail website or other e-commerce site); and/or (3) any other account suitable for confirming the identity of the consignee (e.g., an account associated with one or more social networks, e-mail providers, etc.). In particular embodiments, the account information may comprise a username and password, which the user may enter via any suitable input device at or adjacent the locker bank, or at any other suitable location.

In still other embodiments, the system is configured to confirm the identity of the consignee using any other suitable technique. The system may, for example, confirm that a geographic location of the consignee at the time the consignee requests the one or more parcels is the locker bank from which the consignee is making the request (e.g., by using GPS on a mobile computing device associated with the consignee, near field communications (NFC), Low-Energy Bluetooth (LEB) and/or iBeacon between the mobile computing device associated with the consignee and a second computing device at the locker bank, or other suitable technique). In still another embodiment, the system may confirm the consignee's geographic location history from, for example, a mobile device known to be identified with that consignee. This may be done, for example, to verify that the consignee does, in fact, frequent the GPS location of the original location for delivery. In yet another example, a combination of both the consignee's GPS history and the geographic location of the locker that the consignee is attempting to access may be used to verify the consignee's identity.

II. Release of the Parcel to the Individual

Figure 5:
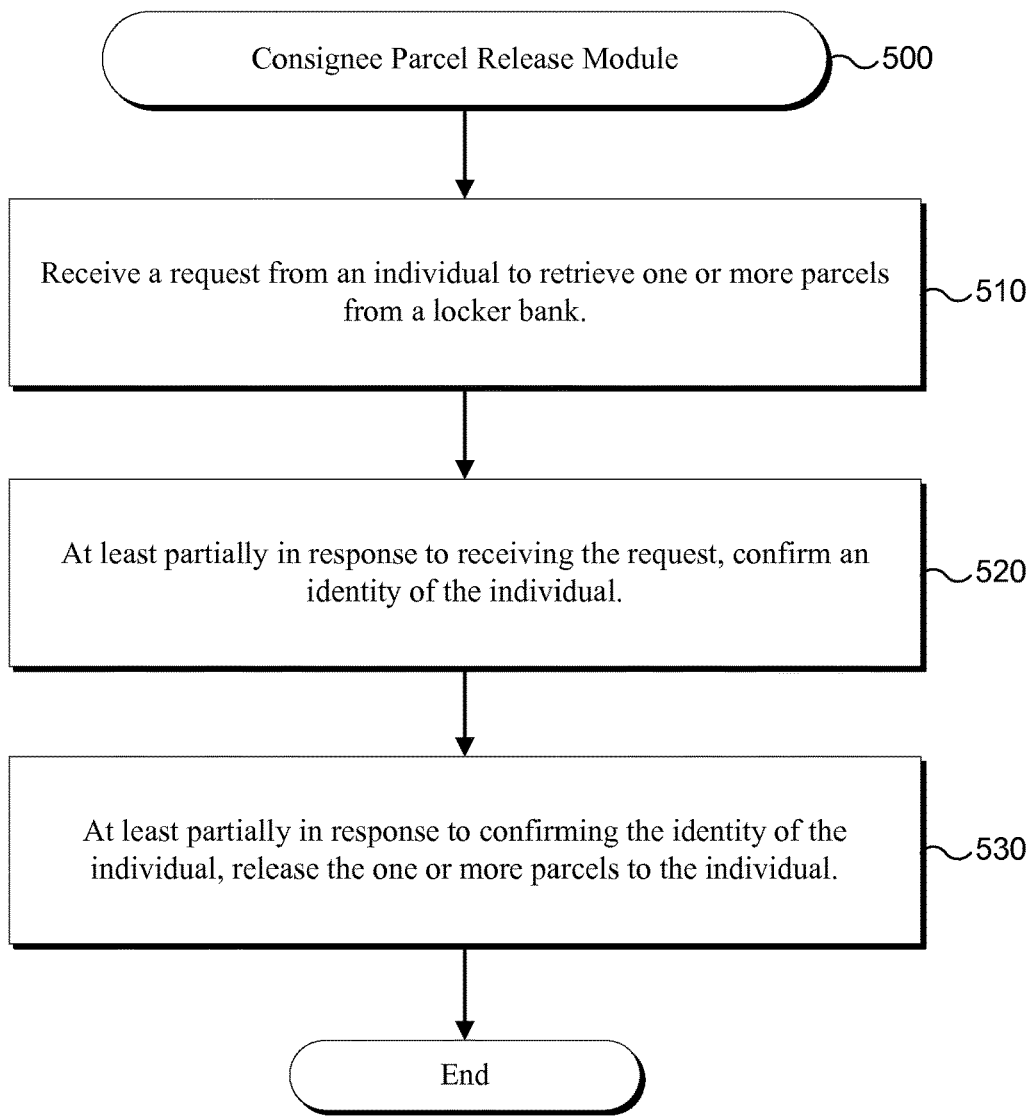
FIG. 5 depicts a flow chart that generally illustrates various steps executed by a Consignee Parcel Release Module that, for example, may be executed by the logistics server of FIG. 1.
Figure 6:
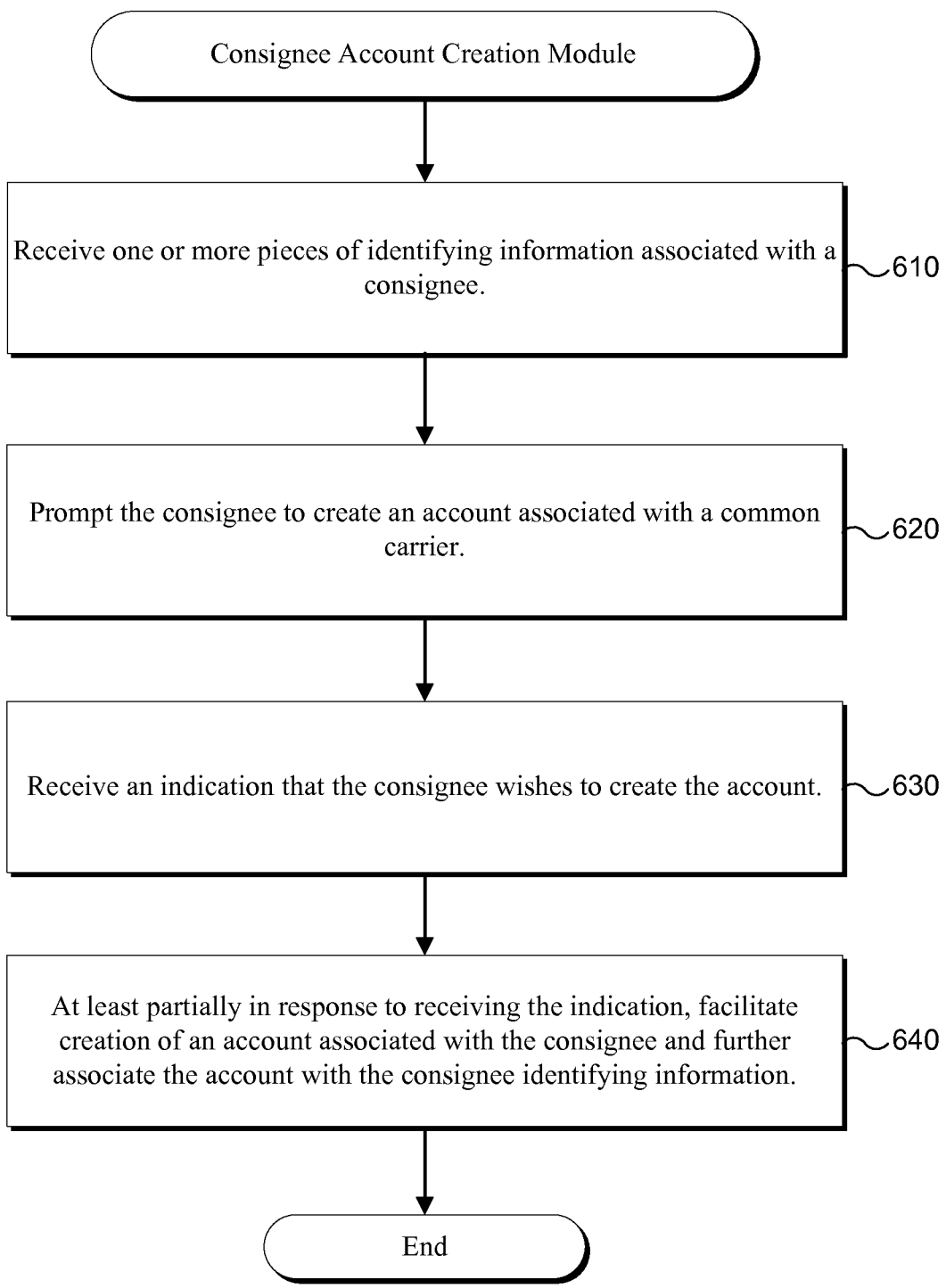
FIG. 6 depicts a flow chart that generally illustrates various steps executed by a consignee account creation module that, for example, may be executed by the logistics server of FIG. 1.

Returning to FIG. 5, at Step 530, the system, at least partially in response to confirming the identity of the individual, releases the one or more parcels to the individual. In various embodiments, the system is configured to obtain a signature of the individual prior to releasing the one or more parcels. In particular embodiments, releasing the one or more parcels comprises substantially automatically unlocking a secure door of the locker containing the one or more parcels to provide the consignee (or other authorized individual) with access to the locker's interior (e.g., so the consignee can retrieve the one or more parcels) and optionally indicating to the individual which locker to retrieve the parcel(s) from. In various embodiments, releasing the one or more parcels further comprises receiving input from the consignee confirming that the one or more parcels being released to the consignee are, in fact, addressed to and intended for delivery to the consignee (e.g., by instructing the consignee to review the delivery information on the one or more parcels and confirm that they are the intended recipient).

In a particular embodiment, the system is further configured to confirm delivery of the parcel to the consignee in response to the consignee's retrieval of the one or more parcels from the locker, and/or the consignee's subsequent closing of the locker. In various embodiments, this confirmation of delivery may involve, for example: (1) updating a database within the system to reflect that the parcel has been delivered; and (2) sending a formal notice to the shipper, consignee, carrier (e.g., common carrier), or other party confirming the delivery.

D. Consignee Account Creation Module

In various embodiments, the system is adapted to allow an "unsubscribed" consignee to use the locker bank to arrange for future notifications (e.g., by the system) of current, past, or upcoming parcel deliveries to the consignee's address as well to allow the consignee to retrieve future parcels from the locker bank without additional identity confirmation. The system may do this, for example, by prompting the consignee (e.g., on a computer display screen associated with the locker bank) to indicate whether the "unsubscribed" consignee wishes to receive electronic or paper notifications of any future parcel deliveries made (e.g., by the carrier) to the consignee's address. In various embodiments, the system may be adapted to send such notifications electronically to the consignee's cell phone via an SMS message (e.g., using the cell phone number that the system has associated with the consignee's address, or the cell phone number that the consignee provided to confirm their identity as described above). Such an approach may allow the "unsubscribed" consignee to receive future notifications of past, current, or upcoming parcel deliveries to the consignee's address without having to formally sign up for such notifications by establishing an account with the carrier.

In a particular embodiment, the system may, in addition, or alternatively, offer to establish an account for the user with the carrier (e.g., common carrier). Such an account (e.g., UPS' MyChoice service) may, for example, help the consignee coordinate more advanced handling of incoming parcels and related logistics services. Various aspects of the system's functionality may be executed by certain system modules, including a Consignee Account Creation Module 600. This module is discussed in greater detail below.

In various embodiments, when executing the Consignee Account Creation Module 600, the system begins, at Step 610, by receiving one or more pieces of identifying information associated with the consignee. The one or more pieces of identifying information may include, for example, any identifying information (e.g., information collected in the context of Step 520 of the Consignee Parcel Release Module 500 discussed above) that may be used to confirm the identity of the consignee. This identifying information may, for example, include the consignee's: (1) first name and/or middle name; (2) last name and/or suffix (e.g., Jr., Sr., III, IV, etc.); (3) zip code; (4) house number; (5) street name; (6) city of residence; (7) state of residence; (8) driver's license number; (9) date of birth; (10) height; (11) weight; (12) eye color; (13) gender; (14) telephone number; (16) e-mail address; and/or (17) any other suitable identifying information associated with the consignee.

Continuing at Step 620, the system prompts the consignee to create an account associated with the carrier. In various embodiments, the carrier is the carrier that facilitated delivery of the parcel. In other embodiments, the carrier is a carrier (e.g., a common carrier) associated with the locker bank. In particular embodiments, the system may be configured to prompt the consignee in any suitable manner, such as, for example, via a computer display at the locker bank, an SMS to the user's mobile computing device, e-mail, etc.

The system continues, at Step 630, by receiving an indication that the consignee wishes to create the account. The system may receive the indication in substantially the same manner in which the system prompted the consignee to create the account (e.g., via SMS, e-mail, Social Network, etc., or via a computer display located at the locker bank). In other embodiments, the consignee may request to create the account on a suitable website.

Next, at Step 640, the system, at least partially in response to receiving the indication, facilitates the creation of an account associated with the consignee and further associates known identifying information about the consignee with the account. In facilitating the creation of the account, the system, in various embodiments, is configured to prompt the consignee to provide any additional information that was not received at Step 610 as identifying information associated with the consignee that the system may require to create the account. For example, the consignee may not have provided a telephone number or e-mail address to the system as part of the identity confirmation process for releasing the parcel from the locker bank. In such an instance, the system may prompt the consignee (e.g., via a suitable display at the locker bank) to provide their telephone number and/or e-mail address (e.g., by entering either or both into an input device at the locker bank). In particular embodiments, the system may further prompt the consignee to establish an account name (e.g., user name) and password for the account, which the consignee may use, for example, to access the account, update account information, track parcels, etc.

In various embodiments, the system is configured to enable the consignee to complete the account creation process at the locker bank (e.g., using a suitable locker bank computer) substantially in real time as the consignee is picking up the one or more parcels from the locker bank. In other embodiments, the system is configured to enable the user to complete the account creation process at a later time and/or at a different location, for example, by logging into a web site associated with the carrier via any suitable computing device, by responding to a message (e.g., SMS, e-mail, etc.) from the carrier and providing the additional required information for account creation, or in any other suitable manner. In some embodiments, the system is configured to prompt the consignee to provide sufficient information at the locker bank to enable the system to follow up with the consignee at a later time to complete the creation of the account. For example, the system may prompt the consignee to provide a mobile telephone number to which the system is configured to send a text message containing a link to a website or other instructions that the consignee can follow to complete the creation of the account. In various embodiments, collecting the additional required information from the consignee at a later time may enable the system to reduce a wait time for other consignees to access the locker bank to retrieve their parcel(s).

In particular embodiments, once the consignee has created an account, the system may be configured to utilize consignee account information when redirecting unsuccessful deliveries and ultimately releasing redirected parcels. In other embodiments, the system may utilize the authorized associated phone number or other information (e.g., social network information, Twitter, e-mail, etc.) to provide various notifications to the consignee when an unsuccessful delivery attempt of a parcel is made to the consignee's address. For example, the system may be configured to notify the consignee via a suitable electronic message (e.g., SMS, text message, e-mail, social network message) that a delivery attempt to the consignee's address was unsuccessful. The message may further include information about an alternate delivery location (e.g., locker bank) to which the parcel was redirected and any other suitable information. This sort of message (e.g., notification) may take the place of or supplement any physical notice (e.g., paper notice) left at the consignee's address upon an unsuccessful delivery. The system may be further configured to provide the consignee with options regarding the parcel such as options to: (1) have the carrier hold the parcel for a later delivery attempt; (2) authorize release of the parcel (e.g., without a signature); (3) re-direct the parcel to a different address; and/or (4) execute any other suitable delivery option.

Exemplary User Experience

Figure 7:
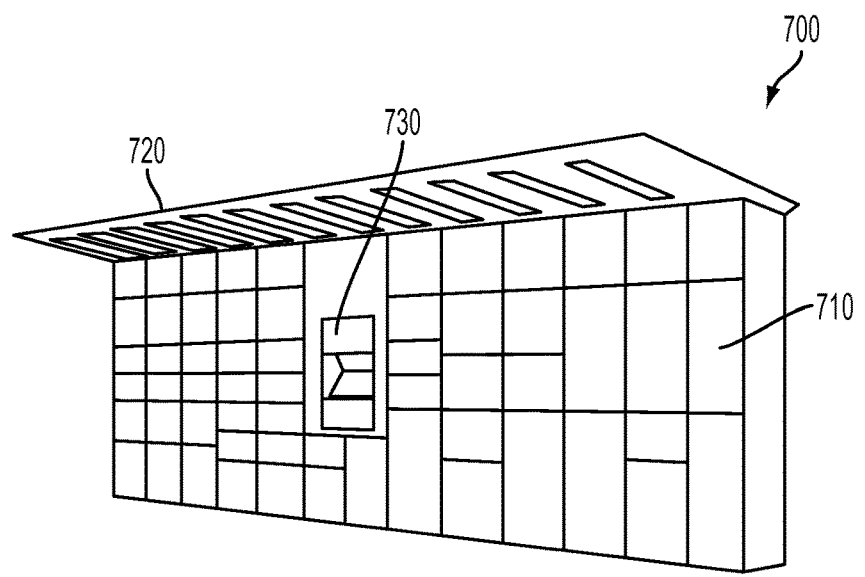
FIG. 7 is a perspective view of a locker bank according to a particular embodiment.

FIG. 7 depicts an exemplary locker bank 700 from which a consignee may retrieve one or more parcels that have been at least temporarily stored in one or more particular lockers in the locker bank, for example, following an unsuccessful delivery of the one or more parcels to the consignee's home address. As shown in this figure, a locker bank 700, according to a particular embodiment, comprises a plurality of lockers 710 of varying sizes (e.g., small, medium, large, etc.). The locker bank 700 further comprises an awning 720 that extends outwardly from an upper portion of the locker bank 700 and may provide at least partial protection to consignees from various weather conditions such as rain, snow, wind, and sun when the consignees are retrieving parcels from the locker bank 700. In the embodiment shown in this figure, the locker bank 700 further comprises a locker bank computer 730 that consignees may use to facilitate the retrieval of their one or more parcels from the locker bank 700, for example, in any manner described in this disclosure or in any other suitable manner.

Figure 8:
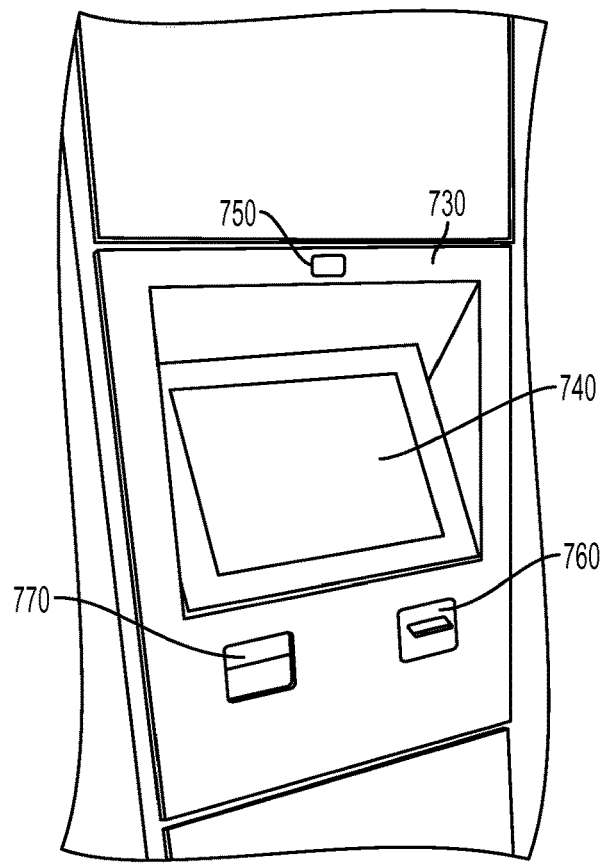
FIG. 8 is an exemplary locker bank computer, such as the locker bank computer shown in FIG. 7, which a delivery driver or other user may utilize in the delivery or pick up of one or more parcels at a locker bank.
Figure 9:
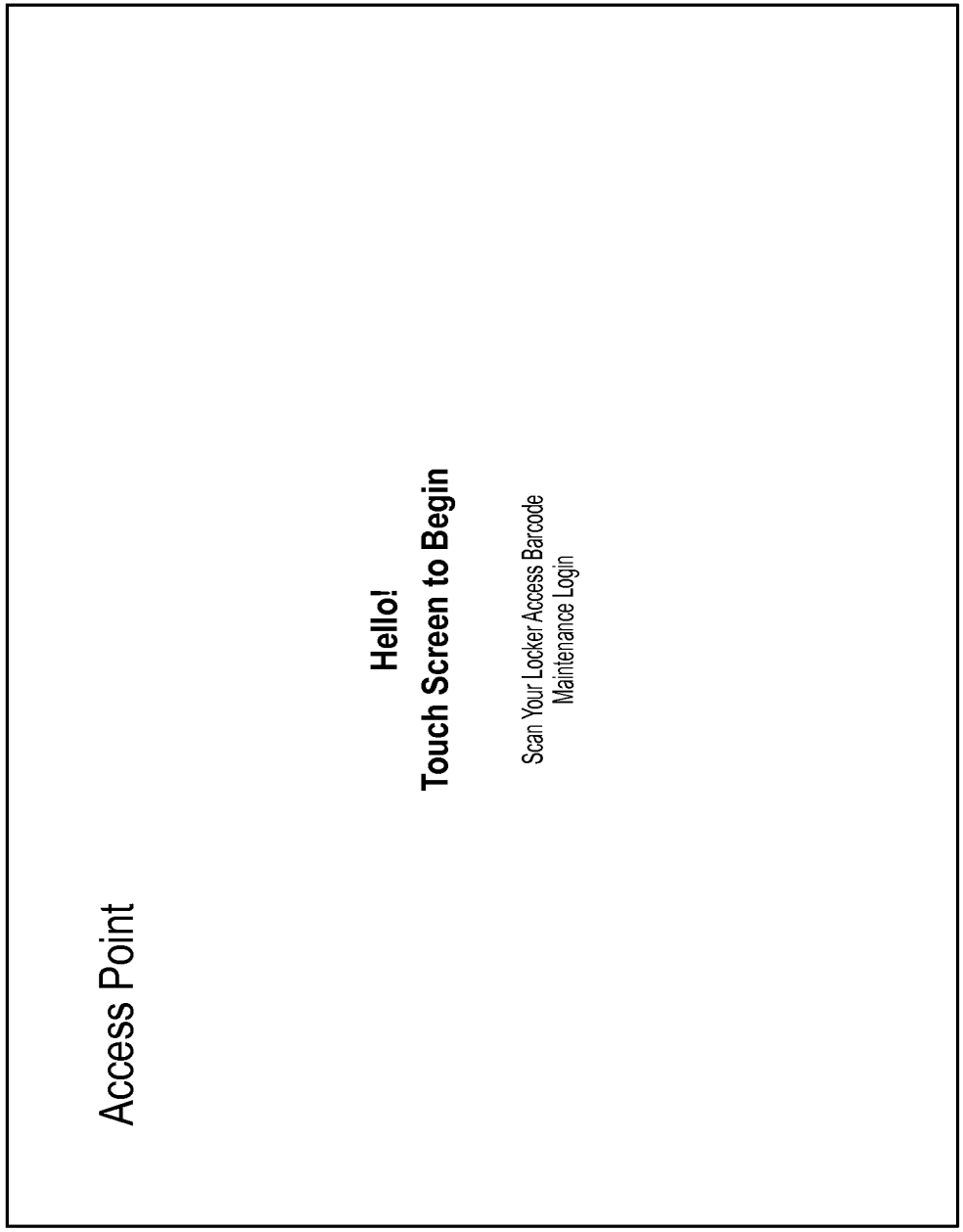
FIGS. 9-21 are screen shots of exemplary user interfaces that a delivery driver or other user may use when delivering and/or retrieving parcels to or from a particular locker bank.

FIG. 8 depicts the locker bank computer 730 from FIG. 7. As shown in this figure, the locker bank computer 730, in a particular embodiment, comprises a touchscreen display 740, one or more imaging devices 750 (e.g., one or more cameras), a card reader 760, and a machine-readable indicia scanner 770 (e.g., a barcode scanner). As may be understood from this disclosure and FIGS. 7 and 8, a delivery driver that is delivering or picking up one or more parcels from the locker bank 700 or a consignee (e.g., or other person on behalf of the consignee) desiring to retrieve one or more parcels from the locker bank would first approach the locker bank computer 730. FIG. 9 depicts an exemplary screen display that a user (e.g., a delivery driver or consignee) would be greeted with when they approached the locker bank computer 730. As shown in this figure, the welcome screen includes instructions for a delivery driver (e.g., "Scan Your Locker Access Barcode") and a consignee (e.g., "Scan or Enter Your Locker Access Barcode") as well as a selectable indicia for a maintenance technician to login to the locker bank computer 730 in order to perform maintenance (e.g., cleaning, software updates, etc.). An exemplary user experience for a delivery driver and consignee are described more fully below.

Exemplary Delivery Driver Experience

Figure 10:
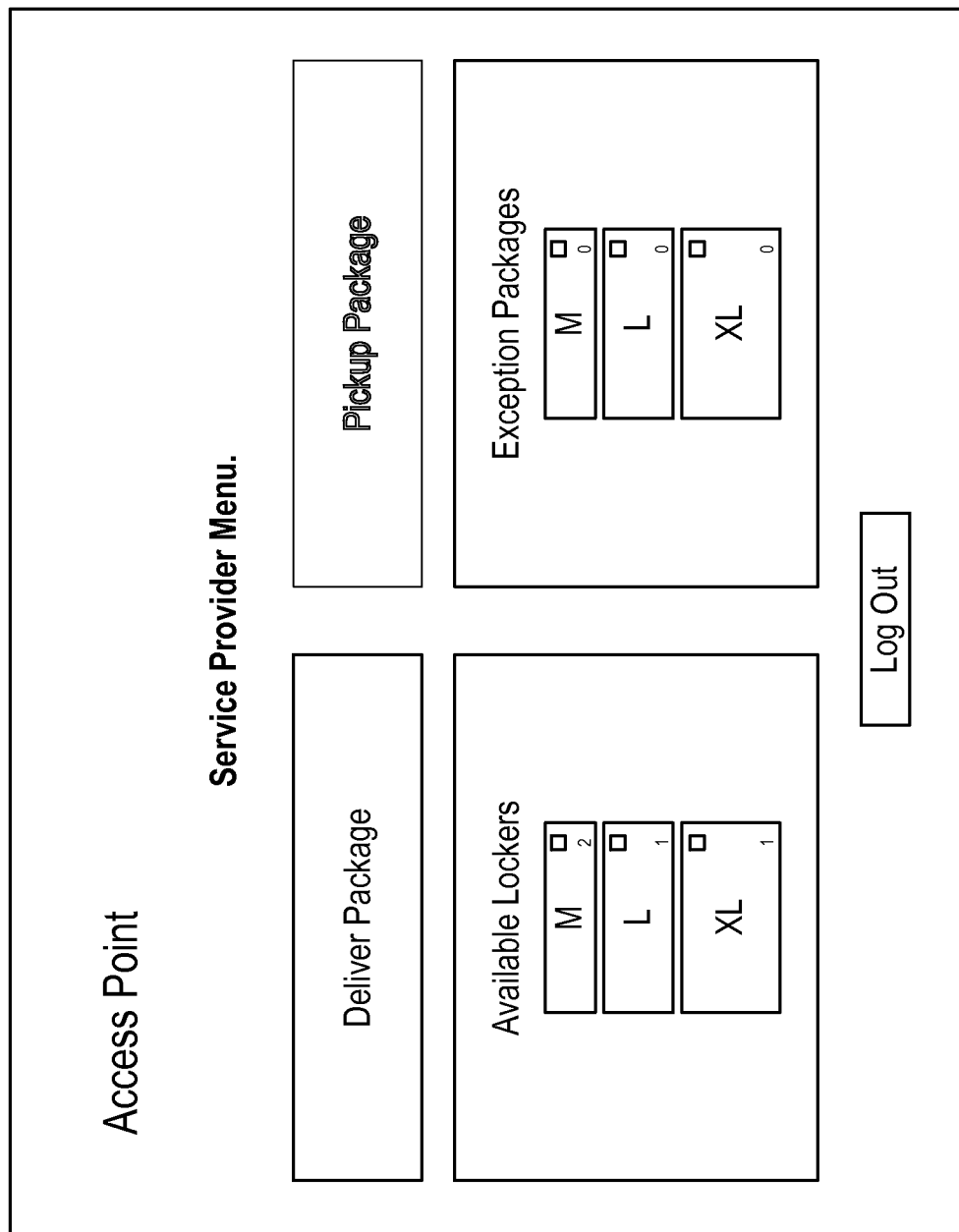

In a particular embodiment, the delivery driver scans a machine-readable indicia located on the driver's DIAD (e.g., or on another mobile computing device associated with the delivery driver or his ID card) using the locker bank computer's machine-readable indicia scanner 770 (e.g., bar code scanner). In response to the delivery driver scanning the machine-readable indicia, the system is configured to log the delivery driver into the locker bank computer 730 and display a service provider menu as shown in FIG. 10. As may be understood from this figure, the Service Provider Menu enables the delivery driver to deliver or pick up packages by selecting the associated indicia from the touchscreen display 740. The Service Provider Menu further displays a number of available lockers for each particular size locker in the locker bank. The system further displays a number of Exception Packages, which may, for example, include one or more packages for which the consignee has requested delivery to another location, packages that have been stored at the locker bank beyond a pickup deadline, etc. As shown in FIG. 10, in this Exemplary Delivery Driver Experience, two medium lockers are available, one large locker is available, and one extra-large locker is available, and there are no Exception Packages that require pickup by the delivery driver.

Figure 11:
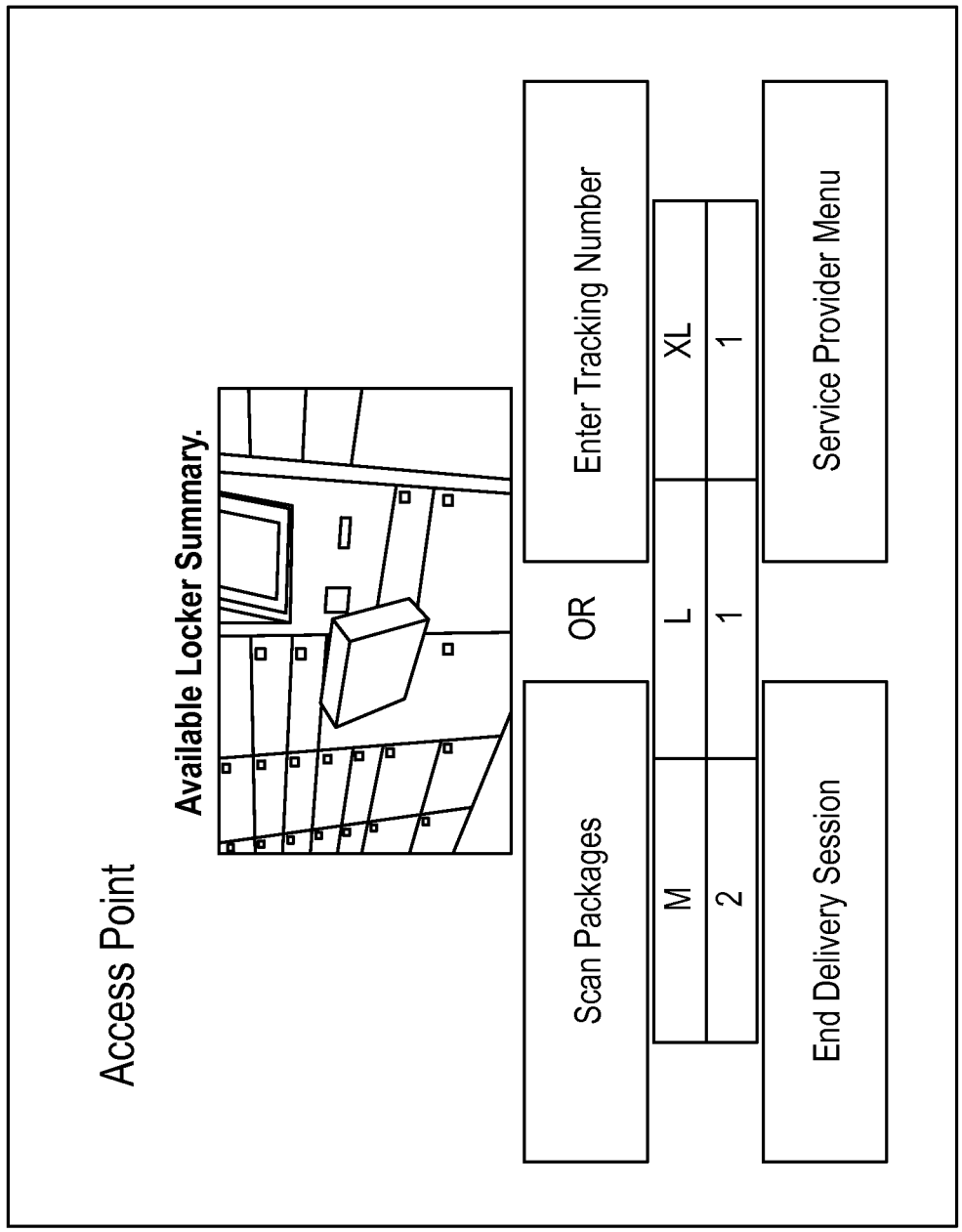

Because there are no exception packages for the delivery driver to retrieve in this example (the number of exception packages is shown as 0), the delivery driver would select the "Deliver Package" indicia in FIG. 10 to initiate the package delivery process. At least partially in response to selection, by the delivery driver, of the "Deliver Package" indicia in FIG. 10, the system, in this embodiment, is configured to display a detailed Available Locker Summary to the delivery driver as shown in FIG. 11. The Available Locker Summary displays a number of available lockers in each size for the locker bank and enables the delivery driver to initiate delivery of a package to the locker bank by: (1) scanning the package (e.g., scanning a machine-readable indicia such as a barcode on the package or on the package shipping label); or (2) otherwise entering the Tracking Number for the package (e.g., entering the tracking number manually).

Figure 12:
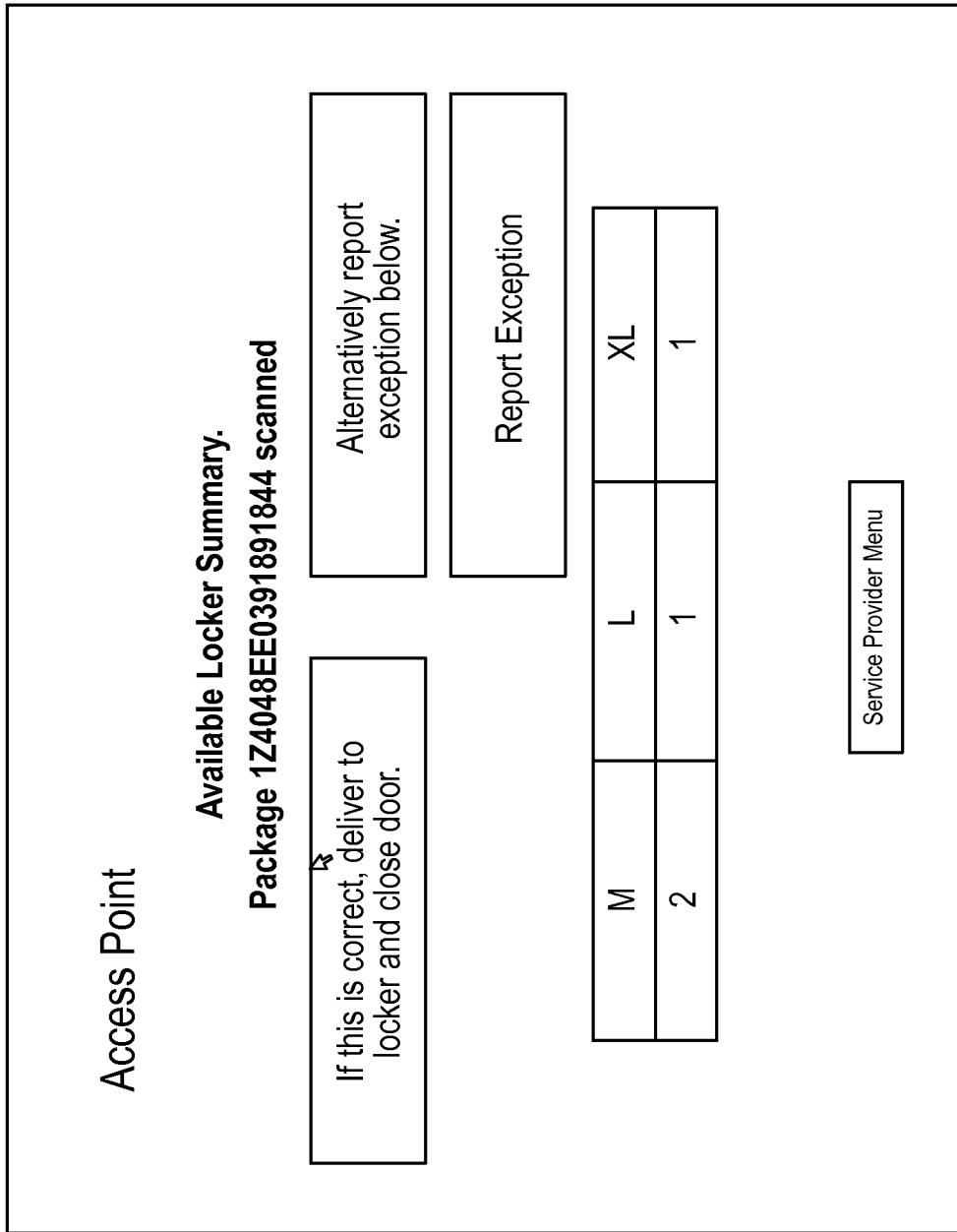
Figure 13:
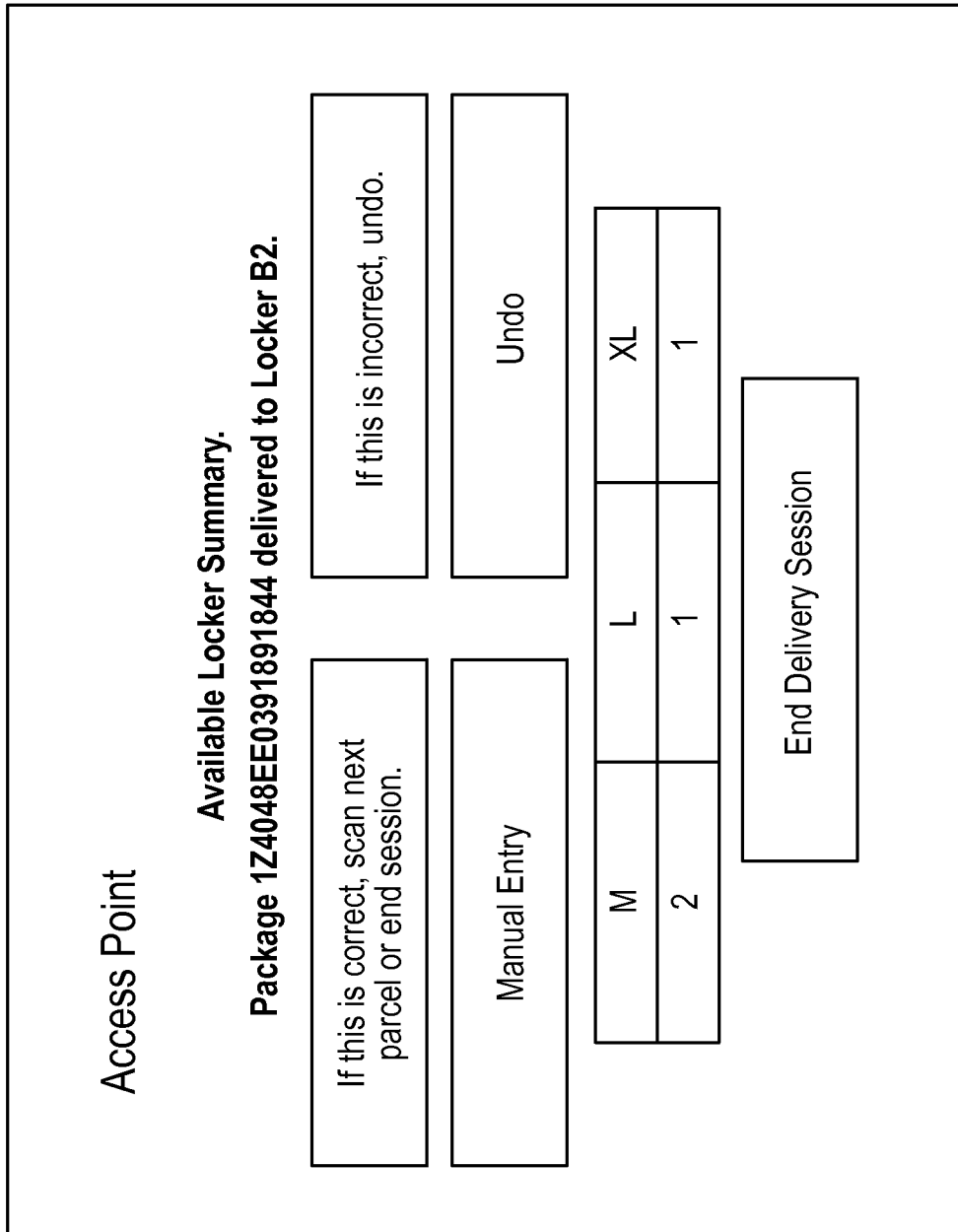

The delivery driver then scans the package's barcode using the machine-readable indicia scanner 770. In response to receiving the scan of the package's barcode, the system then substantially automatically provides the driver access to one locker in each available size (e.g., the system opens a door to a medium locker, a large locker, and an extra-large locker), retrieves information associated with the scanned package, and displays the package's tracking number to the delivery driver as well as instructions to deliver the package to a locker and close the locker door as shown in FIG. 12. The delivery driver then selects the smallest of the three open lockers that the package fits in, places the package in the selected locker, and closes the door. In response to the delivery driver closing the locker door, the system associates the package with the selected locker in the system's memory.

After placing the package in the locker and closing the door, the delivery driver returns to the locker bank computer 730 and confirms the locker in which the package was placed. The delivery driver may optionally manually enter a correct locker identifier if the system is displaying the incorrect locker identifier for the package, or undo the action if there is a problem (e.g., if the delivery driver inadvertently closed a locker door without placing the package inside). If the delivery is successful, the delivery driver may scan another package and repeat the delivery process, or end the delivery session if he has no more parcels to deliver.

Figure 14:
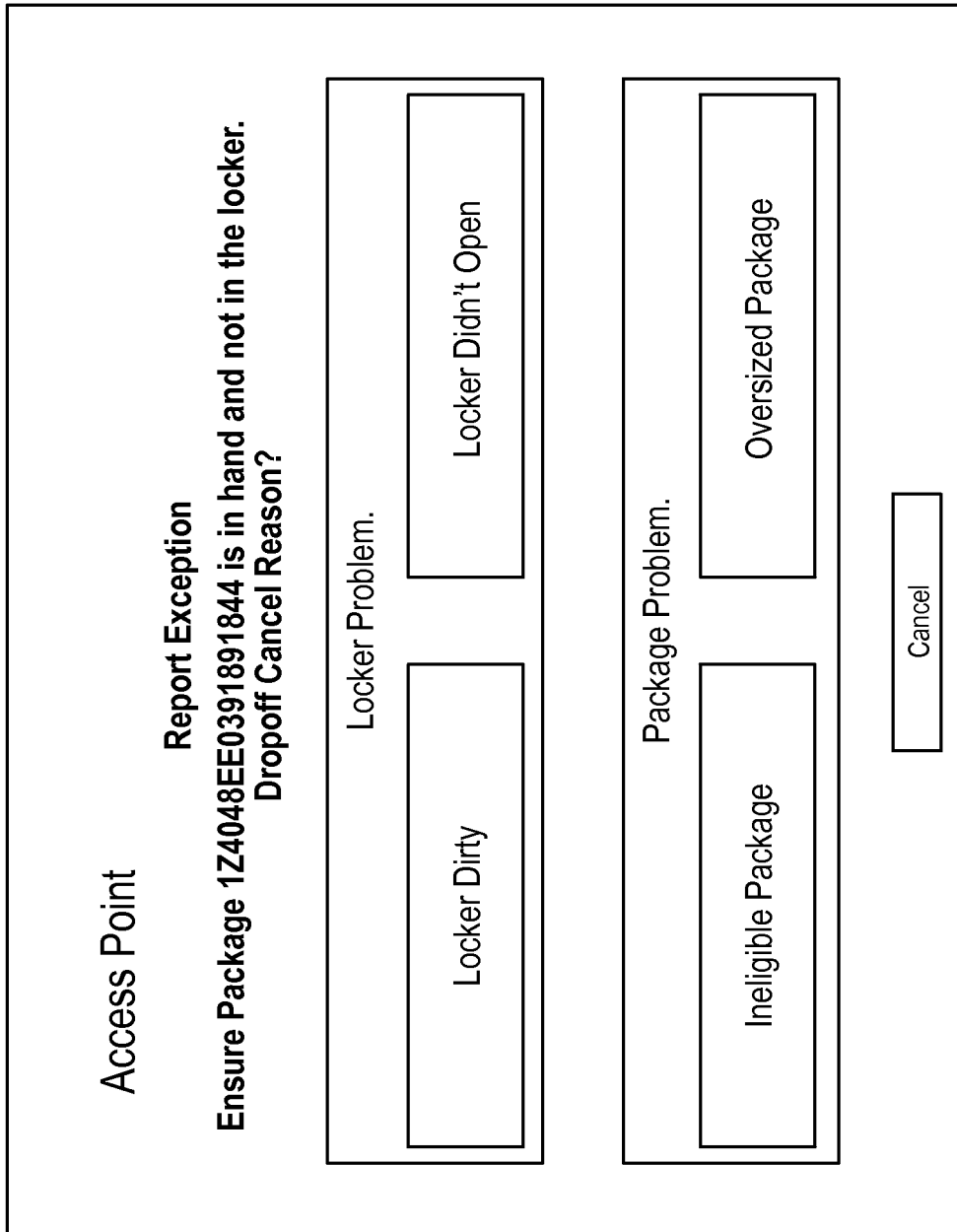

If there is an issue when the delivery driver is attempting to deliver the package to a locker, the delivery driver can report an exception using the locker bank computer 730 via the Report Exception screen display shown in FIGS. 12 and 14. The delivery driver may be unable to deliver the package to a locker for any suitable reason such as, for example, the locker being dirty (e.g., has trash or liquid that would make the locker unsuitable for storage of a parcel), a locker having malfunctioned and having failed to open or lock closed, the package not fitting in any of the available lockers, etc. The delivery driver may provide the system with information via the display in FIG. 14 by selecting the indicia associated with the issue. The system may then provide the driver with further instructions depending on the type of issue (e.g., may instruct the delivery driver to deliver the package to a different, clean locker, etc.).

Exemplary Consignee Experience

Figure 15:
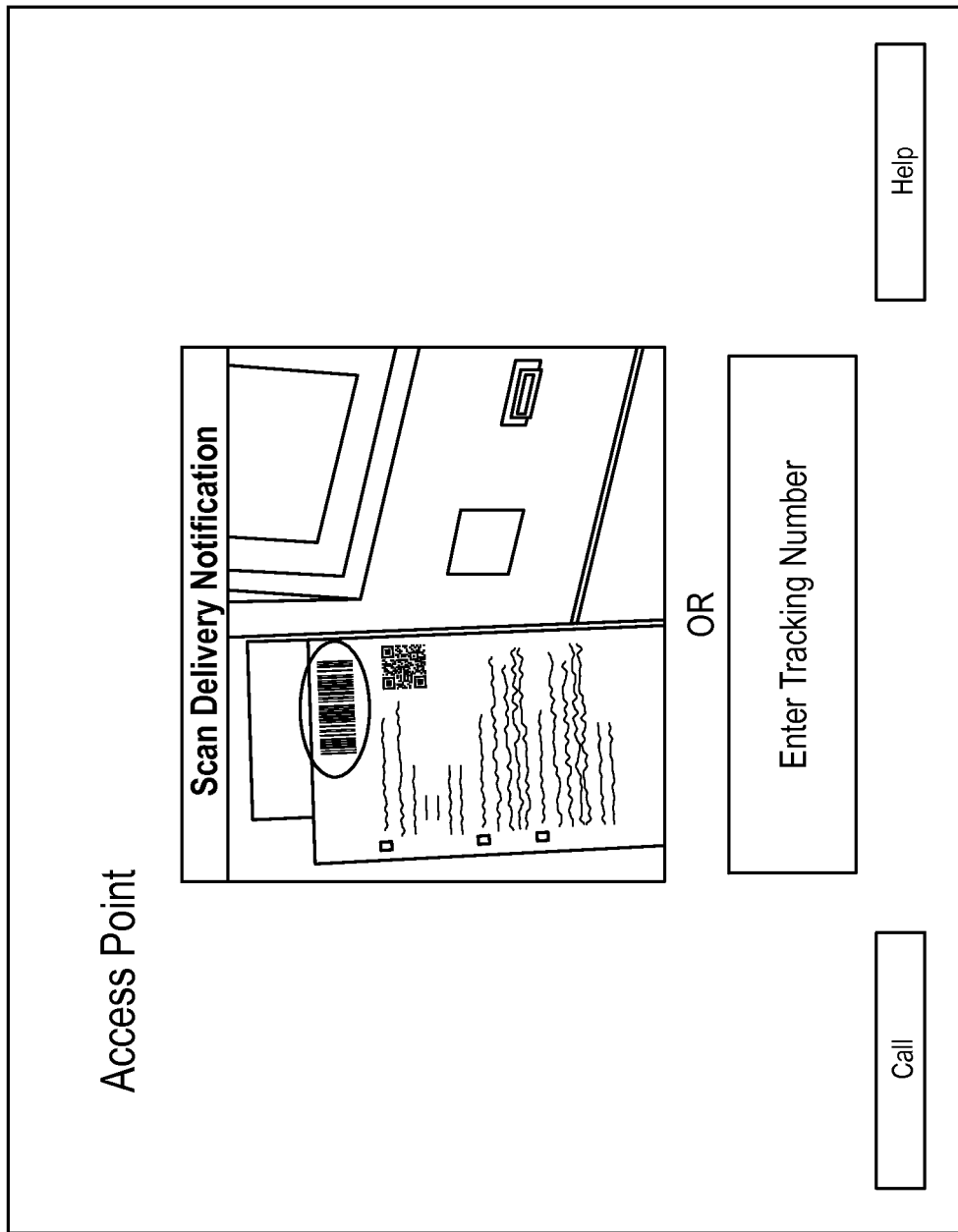
Figure 16:
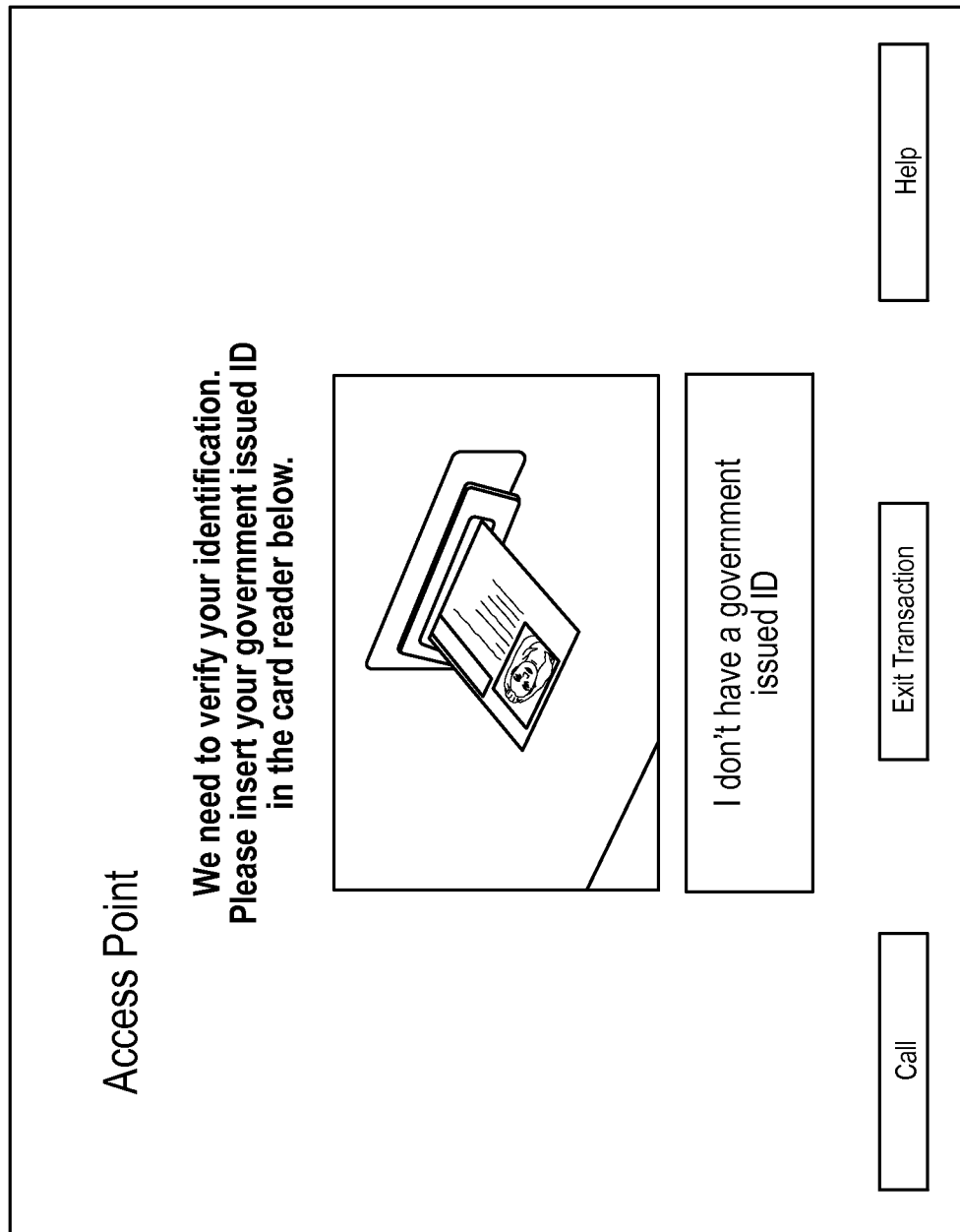

In a particular embodiment, when arriving at the locker bank 700 to retrieve a parcel, the consignee may scan their "Information Notice" (e.g., which was left at their residence, or other delivery address, following the unsuccessful delivery attempt) using the locker bank computer's machine-readable indicia scanner 770. Alternatively, the consignee may enter a Tracking Number (e.g., at least a portion of the tracking number) manually by selecting the appropriate indicia on the display shown in FIG. 15. In response to the consignee scanning their "Information Notice," the system retrieves information associated with the information notice and prompts the consignee to insert a government-issued ID into the card reader 760 in order to verify the consignee's identity as shown in FIG. 16.

Figure 17:
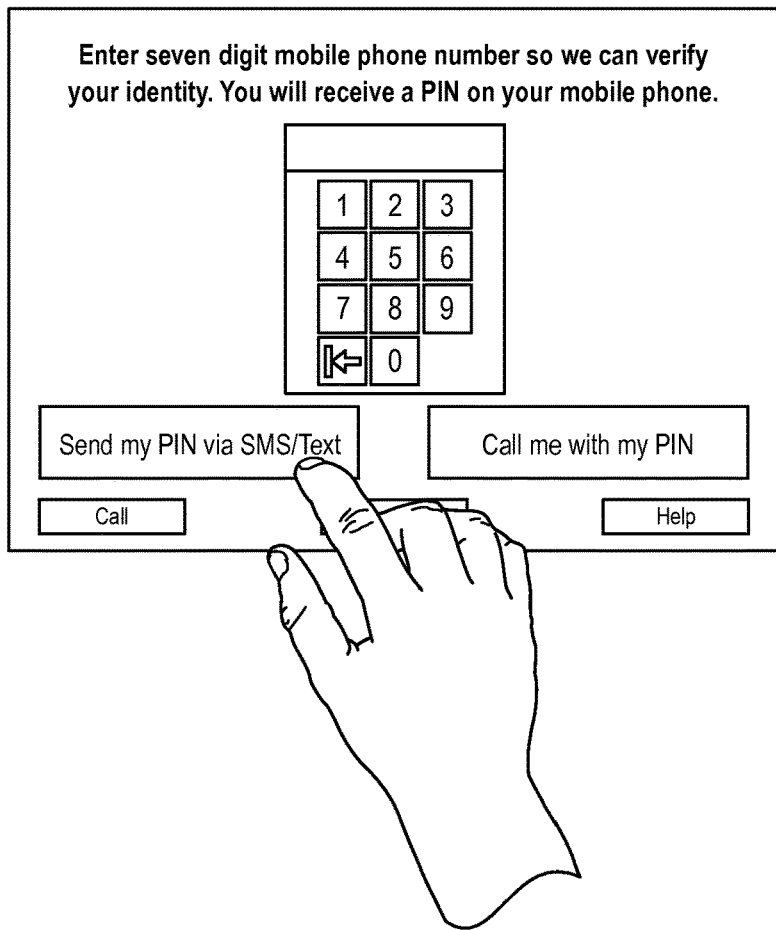
Figure 18:
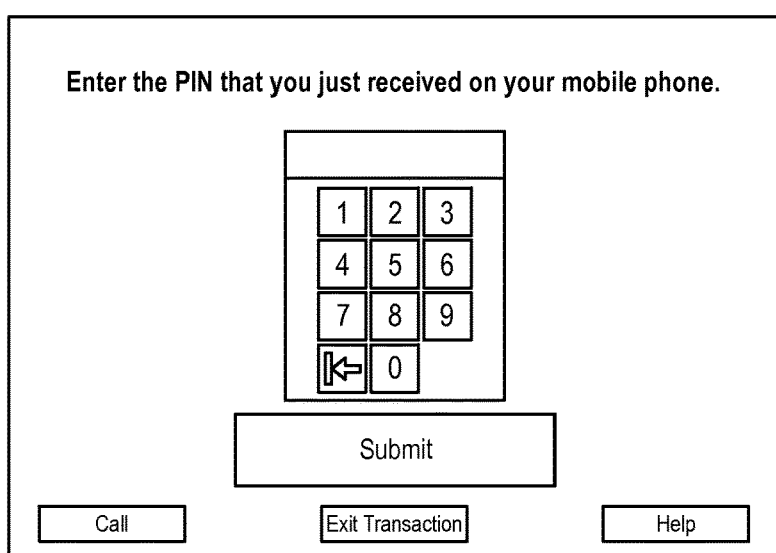

If the consignee does not have a suitable government issued ID, the consignee may select an indicia to indicate this and enter their mobile phone number as shown in FIG. 17. After the consignee enters their mobile phone number into the system, the system confirms the consignee's identity based on their mobile phone number and then provides a PIN number to the consignee (e.g., via SMS/Text, or via telephone call) via the mobile phone number provided. The consignee then enters the PIN number that they received on their mobile phone via the exemplary screen display depicted in FIG. 18.

Figure 19:
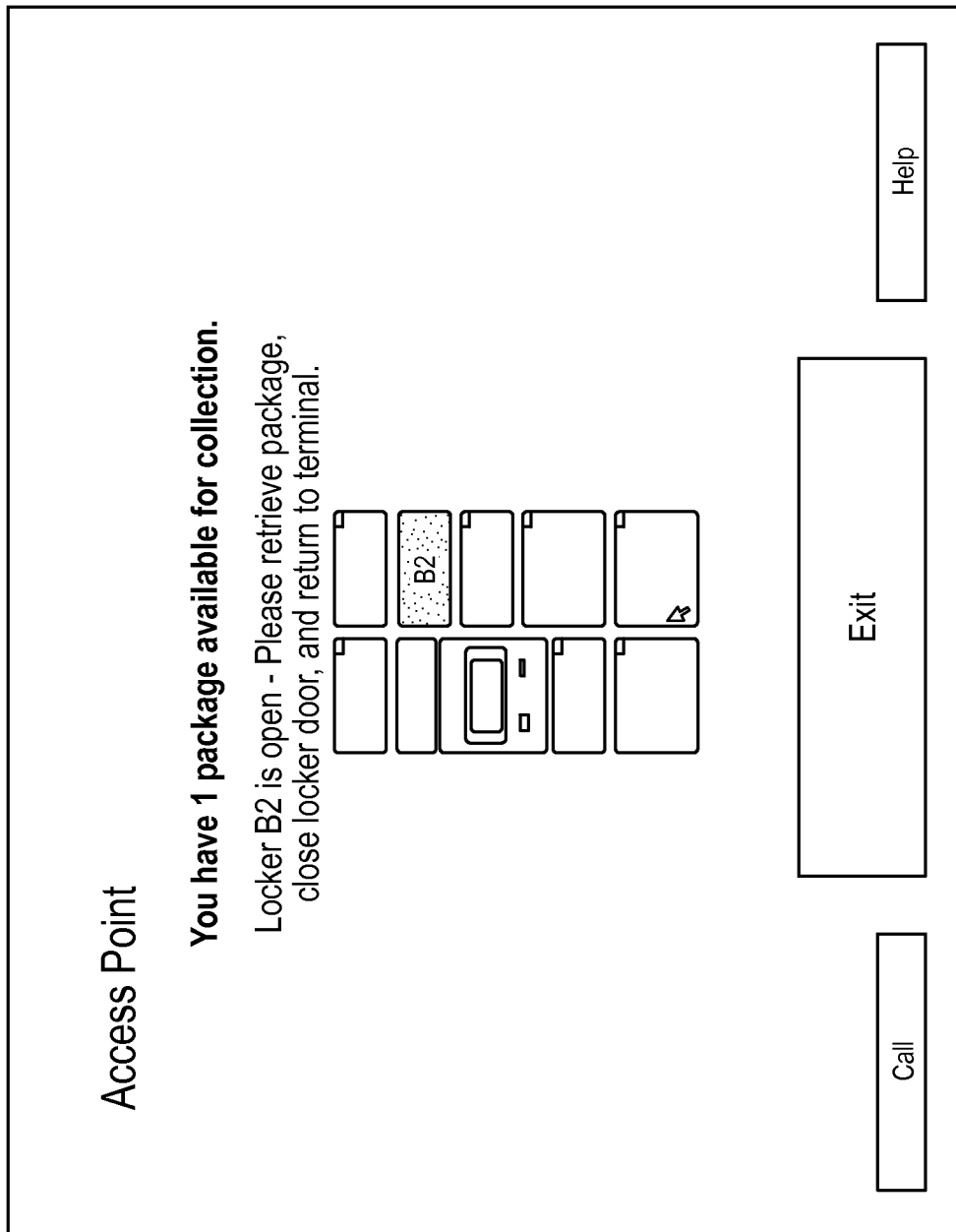
Figure 20:
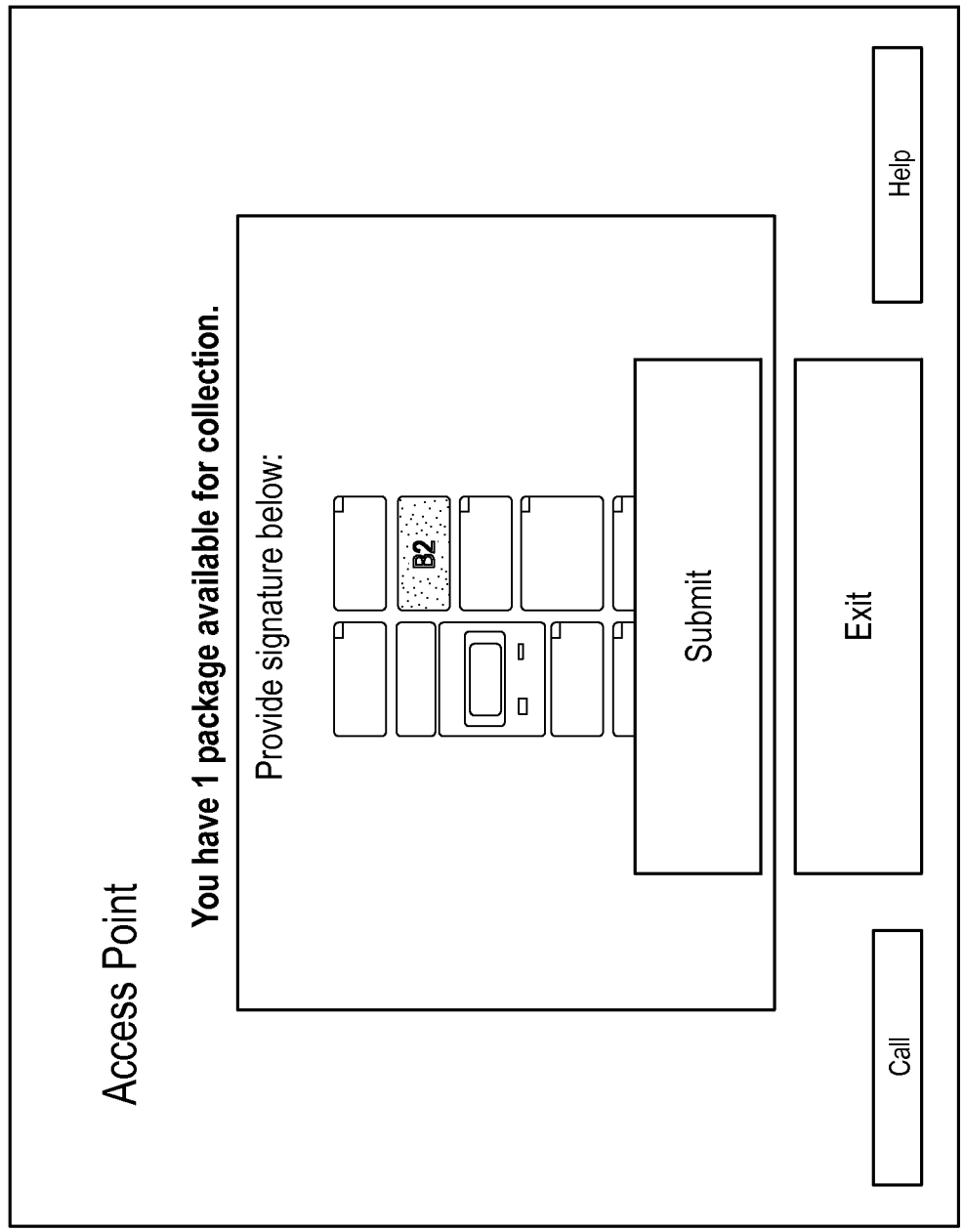
Figure 21:
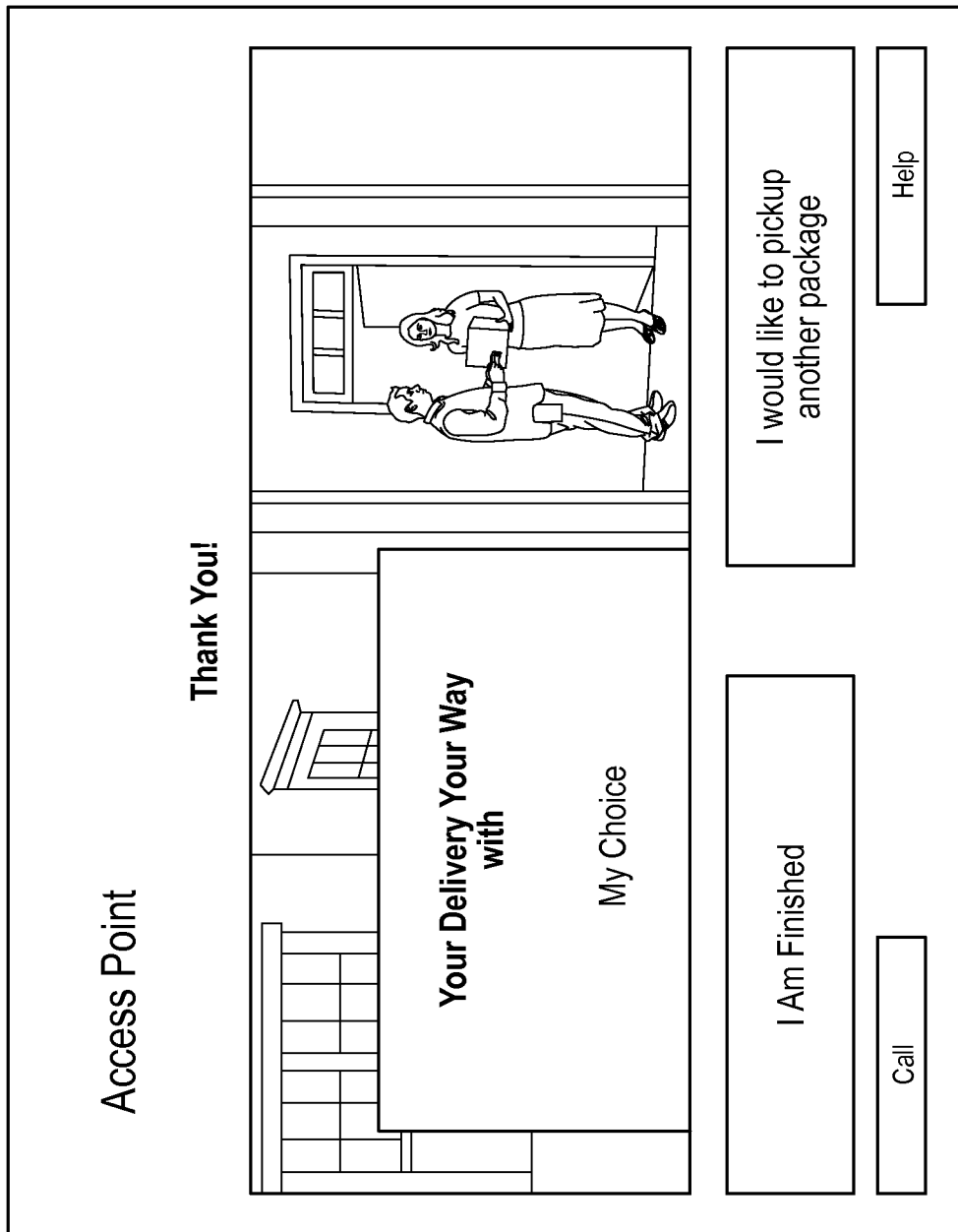

Following the identity verification via ID scan or phone number, the system, as shown in FIG. 19: (1) displays to the consignee a number of packages available for collection by the consignee; (2) opens the locker in which the package is stored; and (3) instructs the consignee to retrieve the package, close the locker door, and return to the locker bank computer 730. The consignee may then retrieve their package from the opened locker (Locker B2), return to the locker bank computer 730, and sign for the package using the touchscreen display as shown in FIG. 20. The system then displays a "Thank You" screen to the consignee as shown in FIG. 21, from which the user can select to pick up another package (e.g., and repeat the process above) or complete their transaction.

As may be understood from FIGS. 15-21, a consignee may elect to call the carrier at any time during the package pickup process if they have an issue or difficulty, or view a help menu for additional information. If the consignee elects to call the carrier, the system, in various embodiments, initiates a call to the carrier via the locker bank computer 730 and enables the consignee to speak to a customer service agent or other representative via two way voice, video, or other communication means. In particular embodiments, a consignee may initiate communication with a customer service agent, for example, to report a problem with the locker bank (e.g., to report a malfunctioning locker bank computer), to report a problem retrieving a parcel (e.g., due to user error or for any other reason), report an issue or difficulty with the identity confirmation process described above, or for any other suitable reason. In various embodiments, the system is configured to enable the customer service agent to remotely control one or more features of the locker bank (e.g., providing access to the one or more lockers, etc.)

In particular embodiments, the system is configured to enable the customer service agent to manually confirm an identity of the consignee by: (1) capturing one or more images of the consignee's identification card; (2) displaying the one or more captured images to the customer service agent; (3) displaying one or more substantially current images (e.g., one or more photographs or video images taken by the system with the one or more imaging devices 750) of the consignee to the customer service agent; and (4) enabling the customer service agent to visually confirm the identity of the consignee and provide the system with confirmation of the agent's visual confirmation of the consignee's identity.

Alternative Embodiments

Various embodiments of a system for delivering parcels to locker bank and other locations may include features in addition to those discussed above. Various alternative embodiments are described below.

Delivery and Pickup of Age-Restricted Items at Locker Banks

In various embodiments, the system is configured to redirect undeliverable parcels containing items that are age restricted (e.g., such as alcohol, tobacco, pharmaceuticals, firearms, etc.) to a suitable locker bank. These age restricted items may include items which would otherwise require a person of at least a particular age to be present to sign for the items at delivery. In such embodiments, when a consignee requests to retrieve the age-restricted item from the locker bank, the system may be configured to verify an age of the consignee before releasing the item to the consignee. For example, the system may determine and verify the consignee's age based at least in part on a date of birth listed on the consignee's ID card used by the system in verifying the consignee's identity as described above. In other embodiments, the system may be configured to initiate a one-way or two-way video call between the consignee and a representative of the carrier to enable the carrier's representative to visually confirm the consignee's age by inspecting the consignee's ID card and an image of the consignee before providing authorization for the system to release the item. In still other embodiments, the system may be configured to confirm the age of the consignee in any other suitable manner.

CONCLUSION

Many modifications and other embodiments of the invention will come to mind to one skilled in the art to which this invention pertains having the benefit of the teachings presented in the foregoing descriptions and the associated drawings. While examples discussed above cover the use of various embodiments in the context of the delivery of one or more parcels to a locker bank, various embodiments may be used in any other suitable context. For example, the various techniques used to identify individuals described herein may be used in any applicable context such as, for example, confirming the identity of an individual at an attended parcel pickup location, an ATM machine, a ticket vending machine, or in any other situation in which confirmation of an individual's identity would be advantageous. Similarly, while various techniques described herein are described in conjunction with facilitating delivery of a parcel that was not successfully delivered on a first delivery attempt, such techniques may also be applicable in delivering parcels directly to a primary delivery location, such as a locker bank. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented method for directing one or more parcels to a suitable locker bank location and facilitating a release of the one or more parcels from the suitable locker bank location, the method comprising:
   receiving, by a locker bank computing device associated with a locker bank location, a first request to deliver one or more parcels to the locker bank location;
   providing access to one or more lockers at the locker bank location, each of the one or more lockers having an interior storage volume;
   receiving a first indication that the one or more parcels have been placed in a particular one of the one or more lockers;
   associating the one or more parcels with the particular one of the one or more lockers;
   receiving, from an individual at the locker bank computing device, a second request to retrieve the one or more parcels from the particular one of the one or more lockers;
   confirming an identity of the individual as an individual authorized to retrieve the one or more parcels from the particular of the one or more lockers, wherein confirming the identity comprises:
      identifying information comprising a current physical location of a portable computing device associated with the individual and using the current physical location of the portable computing device associated with the individual to confirm the individual is at the locker bank location;
      associating the one or more parcels with the identity of the individual; and
      facilitating, releasing of the one or more parcels from the interior storage volume of the particular one of the one or more lockers, wherein facilitating the release of the one or more parcels from the particular one of the one or more lockers to the individual comprises automatically unlocking a secure door of the particular one of the one or more lockers containing the one or more parcels to provide the individual with access to an interior of the particular one of the one or more parcels.

2. The computer-implemented method of claim 1, further comprising:
   receiving, from a consignee, a third request to view tracking information associated with the one or more parcels; and
   displaying the tracking information and a location of the locker bank to the consignee.

3. The computer-implemented method of claim 2, wherein:
   the consignee is associated with a consignee account associated with a carrier responsible for handling the one or more parcels; and
   the method further comprises notifying the consignee via the consignee account of the delivery of the one or more parcels to the locker bank location.

4. The computer-implemented method of claim 3, wherein:
   the notification to the consignee comprises a machine-readable indicia, the machine-readable indicia being associated with the one or more parcels and the consignee account;
   receiving the second request comprises receiving information derived from a reading, by a machine-readable indicia reading device, of the machine-readable indicia at the suitable locker bank location; and
   confirming the identity of the individual further comprises substantially automatically confirming the identity of the individual based at least in part on receiving the information.

5. The computer-implemented method of claim 4, wherein the individual is selected from a group consisting of:
   i. the consignee; and
   ii. an individual on behalf of the consignee.

6. The computer-implemented method of claim 1, wherein:

confirming the identity of the individual comprises:
receiving one or more pieces of package level detail information associated with the one or more parcels;
reading, via a card reader associated with the locker box computing device for the particular locker bank location, an identification card associated with the individual;
verifying an authenticity of the identification card;
determining one or more pieces of identifying information associated with the individual; and
comparing the one or more pieces of package level detail information with the one or more pieces of identifying information.

7. The computer-implemented method of claim 6, wherein:
the one or more pieces of package level detail information comprise a first name of the consignee, a last name of the consignee, and an address of the consignee;
the one or more pieces of identifying information comprise a first name of the individual, a last name of the individual, and an address of the consignee; and
the threshold number is two pieces of the one or more pieces of package level detail information and the one or more pieces of identifying information.

8. The computer-implemented method of claim 1, wherein:
confirming the identity of the individual comprises:
receiving, from the individual, a telephone number associated with the individual;
determining, based at least in part on the telephone number, one or more pieces of identifying information associated with the individual;
receiving, one or more pieces of package level detail information associated with the one or more parcels;
comparing the one or more pieces of package level detail information with the one or more pieces of identifying information;
determining whether at least a threshold number of the one or more pieces of identifying information are substantially similar to the one or more pieces of package level detail information; and
confirming the identity of the individual.

9. The computer-implemented method of claim 4, wherein confirming the identity of the consignee comprises:
receiving original delivery location information for the parcel;
receiving geographic history information for the consignee, the geographic history information comprising information regarding one or more locations visited by the consignee in the past on a regular basis;
using the original delivery location information and the geographic history information to determine whether the consignee has visited the original delivery location on a regular basis; and
confirming the identity of the consignee.

10. The computer-implemented method of claim 4, wherein confirming the identity of the consignee comprises:
receiving a current location of the consignee from a social media account associated with the consignee;
using the current location of the consignee to confirm that the consignee is at the suitable locker bank location; and
confirming the identity of the consignee.

11. The computer-implemented method of claim 4, wherein confirming the identity of the consignee comprises:

receiving identifying data from a mobile device associated with the individual, the identifying data being unique to the individual; and
using the identifying data to confirm the identity of the consignee.

12. A non-transitory computer-readable medium storing computer-executable instructions for:
receiving, from an individual at a locker bank computing device, a request to retrieve a parcel from a particular locker bank, the parcel having a consignee and currently being stored in a particular locker at the particular locker bank, the particular locker having an interior storage volume;
retrieving one or more pieces of package level detail information associated with the parcel;
determining whether at least a threshold number of one or more pieces of identifying information associated with the individual are substantially similar to the one or more pieces of package level detail information associated with the one or more parcels;
confirming an identity of the individual as an individual authorized to retrieve the parcel, wherein confirming the identity comprises:
obtaining an individual's mobile phone number and utilizing the individual's mobile phone number to obtain a current physical location of the individual's mobile phone, wherein the current physical location of the individual's mobile phone is compared to the location of the particular locker;
confirming the identity of the individual and associating the one or more parcels with the identity of the individual; and
facilitating a release of the parcel from the interior storage volume of the particular locker, wherein facilitating the release of the parcel from the particular locker to the individual comprises substantially automatically unlocking a secure door of the particular locker containing the parcel to provide the individual with access to the interior storage volume of the particular locker such that the individual can access and retrieve the parcel.

13. The non-transitory computer-readable medium of claim 12, wherein:
the non-transitory computer-readable medium further stores computer-executable instructions for:
receiving, via a card reader associated with the locker bank computing device, input of an identification card associated with the individual, the card reader comprising at least one camera adapted to capture an image of a card and at least one processor adapted to use optical character recognition techniques to read data from the card, in response to receiving the input of the identification card:
verifying an authenticity of the identification card; and
determining, one or more pieces of identifying information associated with the individual; and
confirming the identity of the individual further comprises:
comparing the one or more pieces of package level detail information with the one or more pieces of identifying information.

14. The non-transitory computer-readable medium of claim 12, wherein:
the non-transitory computer-readable medium further stores computer-executable instructions for:

receiving, from the individual, a telephone number associated with the individual;

determining, based at least in part on the telephone number, one or more pieces of identifying information associated with the individual; and confirming the identity of the individual further comprises:

comparing the one or more pieces of package level detail information with the one or more pieces of identifying information;

determining whether at least a threshold number of the one or more pieces of identifying information are substantially similar to the one or more pieces of package level detail information; and confirming the identity of the individual.

15. The non-transitory computer-readable medium of claim 12, wherein:

the individual is the consignee; and the non-transitory computer-readable medium further stores computer-executable instructions for:

determining, based at least in part on the one or more pieces of package level detail information, whether the consignee is associated with a consignee account associated with a carrier responsible for handling the parcel; and automatically confirming the identity of the individual.

16. The non-transitory computer-readable medium of claim 15, wherein:

the non-transitory computer-readable medium further stores computer-executable instructions for notifying the consignee via the consignee account of an availability of the parcel at the particular locker bank for retrieval, the notification comprising a machine-readable indicia associated with the consignee account and the parcel; and the request to retrieve the parcel comprises receiving the request via a machine-readable indicia scanner associated with the particular locker box computing device, of the machine-readable indicia.

17. A computer system for facilitating release of a parcel to a consignee comprising:

at least one processor, wherein the computer system is configured for:

receiving, from the consignee at a locker bank computing device, a request to retrieve the parcel from the particular locker bank, the parcel being associated with the consignee and currently being stored in a particular locker at the particular locker bank, each of the lockers within the particular locker bank having an internal storage volume;

retrieving one or more pieces of package level detail information associated with the parcel;

determining, based at least in part on the one or more pieces of package level detail, whether the consignee is a subscribed consignee having a consignee account associated with a carrier responsible for handling the parcel;

automatically confirming an identity of the consignee if the consignee is a subscribed consignee;

if the consignee is an unsubscribed consignee, prompting the unsubscribed consignee to provide identification;

receiving, the identification from the unsubscribed consignee, wherein the identification comprises receiving identifying information regarding a current location of the unsubscribed consignee's mobile device and using the current location of the unsubscribed consignee's mobile device to confirm the unsubscribed consignee is at the particular locker bank location and is authorized to retrieve the parcel;

determining whether at least a threshold number of one or more pieces of identifying information associated with the unsubscribed consignee are substantially similar to one or more pieces of package level detail information associated with the one or more parcels;

confirming the identity of the unsubscribed consignee;

associating the one or more parcels with the identity of the unsubscribed consignee; and facilitating, a release of the parcel from the internal storage volume of the particular locker, wherein facilitating the release of the parcel from the particular locker to the unsubscribed consignee comprises automatically unlocking a secure door of the particular locker containing the parcel to provide the unsubscribed consignee access to the one or more parcels.

18. The computer system of claim 17, wherein:

the identification comprises an identification card; and the computer system is further configured for:

determining an authenticity of the identification card; and at least partially in response to confirming the authenticity of the identification card, determining the one or more pieces of identifying information from the identification card.

19. The computer system of claim 17, wherein:

the identification comprises a mobile telephone number; and the computer system is further configured for:

providing a PIN number to the consignee by transmitting the PIN number using the mobile telephone number;

receiving input of the PIN number from the consignee; and facilitating the release of the parcel from the particular locker to the consignee.

20. The computer system of claim 19, wherein determining, based at least in part on the identification, the one or more pieces of identifying information comprise:

retrieving billing information associated with the mobile telephone number; and determining the one or more pieces of identifying information based at least in part on the billing information.

* * * * *